United States Patent
Rasmussen

(10) Patent No.: US 7,769,769 B2
(45) Date of Patent: *Aug. 3, 2010

(54) METHODS AND TRANSFORMATIONS FOR TRANSFORMING METADATA MODEL

(75) Inventor: Glenn D. Rasmussen, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 467 days.

This patent is subject to a terminal disclaimer.

(21) Appl. No.: 11/625,365

(22) Filed: Jan. 22, 2007

(65) Prior Publication Data

US 2007/0130180 A1    Jun. 7, 2007

Related U.S. Application Data

(63) Continuation of application No. 09/653,827, filed on Sep. 1, 2000, now Pat. No. 7,185,016.

(51) Int. Cl.
*G06F 17/30* (2006.01)

(52) U.S. Cl. .................................. 707/756; 707/760

(58) Field of Classification Search ........................ None
See application file for complete search history.

(56) References Cited

U.S. PATENT DOCUMENTS

| | | | |
|---|---|---|---|
| 5,499,371 A | 3/1996 | Henninger et al. | |
| 5,550,971 A | 8/1996 | Brunner et al. | |
| 5,555,403 A | 9/1996 | Cambot et al. | |
| 5,761,674 A | 6/1998 | Ito | |
| 5,799,310 A | 8/1998 | Anderson et al. | |
| 5,857,197 A | 1/1999 | Mullins | |
| 5,905,985 A | 5/1999 | Malloy et al. | |
| 5,915,257 A | 6/1999 | Gartung et al. | |
| 5,918,232 A | 6/1999 | Pouschine et al. | |
| 6,094,688 A | 7/2000 | Mellen-Garnett et al. | |
| 6,292,932 B1 * | 9/2001 | Baisley et al. | 717/114 |
| 6,490,590 B1 | 12/2002 | Fink | |
| 6,609,123 B1 | 8/2003 | Cazemier et al. | |
| 6,704,726 B1 | 3/2004 | Amouroux | |
| 6,714,979 B1 * | 3/2004 | Brandt et al. | 709/225 |
| 6,865,573 B1 | 3/2005 | Hornick et al. | |
| 6,871,245 B2 | 3/2005 | Bradley | |

(Continued)

FOREIGN PATENT DOCUMENTS

WO      9924922      5/1999

(Continued)

OTHER PUBLICATIONS

Article in the Electrical Engineering Handbook, CRC Press LLC 1999, entitled "Knowledge Engineering", by M. Abdelguerfi and R. Eskicioglu.

(Continued)

*Primary Examiner*—Baoquoc N To
(74) *Attorney, Agent, or Firm*—Shumaker & Sieffert, P.A.

(57) ABSTRACT

Transformations are provided for transforming a metadata model that contains model objects. The metadata model has a multiple layers including a lower layer containing one or more lower abstraction model objects having a lower abstraction level and a higher layer containing one or more higher abstraction model objects having a higher abstraction level. The transformations transform the model objects from the lower layer to the higher layer.

20 Claims, 34 Drawing Sheets

U.S. PATENT DOCUMENTS

| | | | |
|---|---|---|---|
| 2001/0034686 A1* | 10/2001 | Eder | 705/36 |
| 2003/0200222 A1 | 10/2003 | Feinberg et al. | |
| 2004/0098398 A1 | 5/2004 | Ahn et al. | |
| 2005/0187930 A1 | 8/2005 | Subramanian et al. | |
| 2006/0085438 A1 | 4/2006 | Burst et al. | |

FOREIGN PATENT DOCUMENTS

| | | |
|---|---|---|
| WO | 9926170 | 5/1999 |

OTHER PUBLICATIONS

Cognos Impromptu, Administrator's Guide, entitled "Cognos Enterprise Business Intelligence," published in 1998.

Papazoglou et al.; "A Semantic Meta-Modelling Approach to Schema Transformation;" Article; 1995; pp. 113-121; ACM; Baltimore, MD USA.

Abdelguerfi et al.; "Knowledge Engineering;" 1999; Chapter 94; CRC Press LLC; USA.

Yoo et al., Automatic conversion of MPEG-7 Specification and data into RDF (S) for Semantic Interoperability in Information Retrieval, Computational Intelligence for Modelling, Control and Automation International conference, vol. 1, Nov. 28-30, 2005, pp. 45-50.

Imai et al., RDF model and relational metadata, Advanced Information Networking and Application, 2003, Mar. 27-29, 2003, pp. 534-537.

Li et al., Representing UML snowflake diagram form intergrating XML data using XML Schema, Data Engineering Issues in E-Commerce, 2005, Apr. 9, 2005, pp. 103-111.

Cheung et al., The model-assisted Global query system for multiple databases in distributed enterprises, ACM Transactions on information System (TOIS), vol. 14, Issue 4, 1996, pp. 421-470.

Hong, Shuguang and Maryanski, Fred; "Using a Meta Model to Represent Object-Oriented Data Models;" Online Article; Feb. 5-9, 1990; pp. 11-19; Proceedings of the Sixth International Conference on Data Engineering; IEEE; Computer Science and Engineering Department, University of Connecticut, Storrs, CT 06268; USA.

Gray, Jim et al.; "Data Cube: A Relational Aggregation Operator Generalizing Group-By, Cross-Tab, and Sub-Totals"; Article ISBN 0-8186-7240-4; Feb. 26-Mar. 1, 1996; pp. 152-159; Proceedings of the Twelfth International Conference on New Orleans, LA, USA; IEEE; California; USA.

Gardner, Stephen R.; "The Quest to Standardize Metadata;" Article; Nov. 1, 1997; pp. 47-48; vol. 22, No. 11; www.byte.com; McGraw-Hill Inc.; St. Peterborough, USA.

Bohlen, Michael H. et al.; "Coalescing in Temporal Databases:" Proceeding of the 22nd Vldb Conference; Sep. 3-6, 1996; XP-002256650; Mumbai (Bombay) India.

Scholl, Marc H.; "Theoretical Foundation of Algebraic Optimization Utilizing Unnormalized Relations;" Proceedings of the International Conference on Database Theory; 1986; pp. 380-396; XP008022925; Darmstadt, West Germany.

Gyssens, Marc et al.; "A Foundation for Multi-Dimensional Databases;" Proceedings of the 22nd Vldb Conference; Sep. 3-6, 1996; XP-002256651; Mumbai (Bombay) India.

Examination Report from corresponding European Application Serial No. 00 307 549.6-1527 dated May 20, 2009 (4 pages).

* cited by examiner

Data Access Model Transformations 112

| 112a | Data Access Join Constructing Transformation |
|---|---|
| 112b | Data Access Key Constructing Transformation |
| 112c | Table Extract Constructing Transformation |
| 112d | Data Access Cube Constructing Transformation |

Business Model Transformations 114

| 114a | Basic Business Model Constructing Transformation |
|---|---|
| 114b | Many to Many Join Relationship Fixing Transformation |
| 114c | Entity Coalescing Transformation |
| 114d | Redundant Join Relationship Eliminating Transformation |
| 114e | Subclass Relationship Introducing Transformation |
| 114f | Entity Referencing Transformation |
| 114g | Attribute Usage Determining Transformation |
| 114h | Date Usage Identifying Transformation |

Multidimensional Model Transformations 115

| 115a | Measure Identifying and Measure Dimension Constructing Transformation |
|---|---|
| 115b | Category Dimension and Level Constructing Transformation |
| 115c | Logic Cube Constructing Transformation |

Package Model Transformations 116

| 116a | Basic Package Model Constructing Transformation |
|---|---|
| 116b | Package Constructing Transformation for Cognos Query |

General Transformations 117

| 117a | Name Mutation Transformation |
|---|---|

Fig. 4B

| Prohibit | Object Processed | Parent Relationship Processed | Parent Action | Child Relationship Processed | Child Action |
|---|---|---|---|---|---|
| Yes | Don't Care | Don't Care | Nothing | Don't Care | Nothing |
| No | No | Doesn't Exist | Create new target object and relationship. Mark object and relationship as processed after processing children. | | |
| | | No | Mark object and relationship as processed after processing children. | Doesn't Exist | Create new target object and relationship. Mark object and relationship as processed. |
| | | | | No | Mark relationship as processed |
| | | | | Yes | Nothing |
| | | Yes | Process children. | Doesn't Exist | Create new target object and relationship. Mark object and relationship as processed. |
| | | | | No | Mark relationship as processed |
| | | | | Yes | Nothing |
| | Yes | Doesn't Exist | Nothing | | |
| | | No | Mark object and relationship as processed after processing children. | Doesn't Exist | Create new target object and relationship. Mark object and relationship as processed |
| | | | | No | Mark relationship as processed |
| | | | | Yes | Nothing |
| | | Yes | Process children. | Doesn't Exist | Nothing |
| | | | | No | Mark relationship as processed |
| | | | | Yes | Nothing |

Fig. 7

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
| | | 5 | 4 | 8 | 6 | 4 | 7 | 5 | 4 | 2 | 1 | 5 | 7 | 4 | 4 | 3 | 5 | 5 | 4 |
| Brands | 1 | 1 | | | | | | | | | | | | | | | | | |
| Cities | 4 | | 1 | 1 | | | | | | | | | 1 | | | | | 1 | |
| Countries | 1 | | | 1 | | | | | | | | | | | | | | | |
| Customers | 1 | | | | 1 | | | | | | | | | | | | | | |
| Customer Sites | 2 | | | | 1 | | | | | | | | | | | 1 | | | |
| Inventory | 3 | | | | | 1 | | | | | | | | | | | 1 | | 1 |
| Inventory by Date, Item, Region | 4 | | 1 | | | 1 | 1 | | | | | | 1 | | | | | | |
| Items | 1 | | | | | | 1 | | | | | | | | | | | | |
| Lines | 1 | | | | | | | 1 | | | | | | | | | | | |
| Offices | 1 | | | | | | | | 1 | | | | | | | | | | |
| Orders | 1 | | | | | | | | | 1 | | | | | | | | | |
| Orders by Received Date, Brand, Line and Item | 4 | 1 | | | | | 1 | 1 | | | | 1 | | | | | | | |
| Orders by Received Date, Item, Customer | 3 | | | | 1 | | 1 | | | | | 1 | | | | | | | |
| Orders by Received Date, Office | 2 | | | | | | | | 1 | | | 1 | | | | | | | |
| Orders by Received Date, Sales Region, Customer | 3 | | | | 1 | | | | | | | 1 | | 1 | | | | | |
| Order Details | 2 | | | | | | | | | 1 | 1 | | | | | | | | |
| Regions | 2 | | | 1 | | | | | | | | | 1 | | | | | | |
| Sales Regions | 1 | | | | | | | | | | | | | 1 | | | | | |
| Sales Rep Pictures | 1 | | | | | | | | | | | | | | 1 | | | | |
| Sales Reps | 1 | | | | | | | | | | | | | | 1 | | | | |
| SKU Items | 1 | | | | | | | | | | | | | | | | 1 | | |
| States | 3 | | | 1 | | | | | | | | | 1 | | | | | 1 | |
| Warehouses | 1 | | | | | | | | | | | | | | | | | | 1 |
| Dim-Locations | 7 | | 1 | 1 | | | | | 1 | | | | 1 | 1 | | | | 1 | 1 |
| Dim-Products | 4 | 1 | | | | | 1 | 1 | | | | | | | | | 1 | | |
| Dim-Customers | 2 | | | | 1 | | | | | | | | | | | 1 | | | |
| Dim-Sales Reps | 1 | | | | | | | | | | | | | | 1 | | | | |
| Dim-Date | 1 | | | | | 1 | | | | | | | | | | | | | |
| Fact-Orders | 14 | 1 | 1 | 1 | 1 | | 1 | 1 | 1 | | | 1 | 1 | 1 | 1 | 1 | 1 | 1 | |
| Fact-Inventory | 10 | 1 | 1 | 1 | | 1 | 1 | 1 | | | | 1 | | | | | 1 | 1 | 1 |

Fig. 10

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  |  | 11 | 10 | 14 | 8 | 4 | 10 | 11 | 6 | 2 | 1 | 5 | 13 | 8 | 6 | 5 | 6 | 11 | 4 |
| Brands | 1 | 1 |  |  |  |  |  |  |  |  |  |  |  |  |  |  |  |  |  |
| Cities | 4 |  | 1 | 1 |  |  |  |  |  |  |  |  | 1 |  |  |  |  | 1 |  |
| Countries | 1 |  |  | 1 |  |  |  |  |  |  |  |  |  |  |  |  |  |  |  |
| Customers | 1 |  |  |  | 1 |  |  |  |  |  |  |  |  |  |  |  |  |  |  |
| Customer Sites | 2 |  |  |  | 1 |  |  |  |  |  |  |  |  |  |  | 1 |  |  |  |
| Inventory | 10 | 1 | 1 | 1 |  | 1 | 1 | 1 |  |  |  |  | 1 |  |  |  | 1 | 1 | 1 |
| Inventory by Date, Item, Region | 6 | 1 |  | 1 |  | 1 | 1 | 1 |  |  |  |  | 1 |  |  |  |  |  |  |
| Items | 3 | 1 |  |  |  |  | 1 | 1 |  |  |  |  |  |  |  |  |  |  |  |
| Lines | 1 |  |  |  |  |  |  | 1 |  |  |  |  |  |  |  |  |  |  |  |
| Offices | 6 |  | 1 | 1 |  |  |  |  | 1 |  |  |  | 1 | 1 |  |  |  | 1 |  |
| Orders | 10 |  | 1 | 1 | 1 |  |  |  | 1 | 1 |  |  | 1 | 1 | 1 |  |  | 1 | 1 |
| Orders by Received Date, Brand, Line and Item | 4 | 1 |  |  |  |  | 1 | 1 |  |  |  | 1 |  |  |  |  |  |  |  |
| Orders by Received Date, Item, Customer | 5 | 1 |  |  | 1 |  | 1 | 1 |  |  |  | 1 |  |  |  |  |  |  |  |
| Orders by Received Date, Office | 7 |  | 1 | 1 |  |  |  |  | 1 |  |  | 1 | 1 | 1 |  |  |  | 1 |  |
| Orders by Received Date, Sales Region, Customer | 3 |  |  |  | 1 |  |  |  |  |  |  | 1 |  | 1 |  |  |  |  |  |
| Order Details | 15 | 1 | 1 | 1 | 1 |  | 1 | 1 | 1 | 1 | 1 |  | 1 | 1 | 1 | 1 | 1 | 1 |  |
| Regions | 2 |  |  | 1 |  |  |  |  |  |  |  |  | 1 |  |  |  |  |  |  |
| Sales Regions | 1 |  |  |  |  |  |  |  |  |  |  |  |  | 1 |  |  |  |  |  |
| Sales Rep Pictures | 1 |  |  |  |  |  |  |  |  |  |  |  |  |  | 1 |  |  |  |  |
| Sales Reps | 1 |  |  |  |  |  |  |  |  |  |  |  |  |  | 1 |  |  |  |  |
| SKU Items | 4 | 1 |  |  |  |  | 1 | 1 |  |  |  |  |  |  |  |  | 1 |  |  |
| States | 3 |  |  | 1 |  |  |  |  |  |  |  |  | 1 |  |  |  |  | 1 |  |
| Warehouses | 5 |  | 1 | 1 |  |  |  |  |  |  |  |  | 1 |  |  |  |  | 1 | 1 |
| Dim-Locations | 7 |  | 1 | 1 |  |  |  |  | 1 |  |  |  | 1 | 1 |  |  |  | 1 | 1 |
| Dim-Products | 4 | 1 |  |  |  |  | 1 | 1 |  |  |  |  |  |  |  |  | 1 |  |  |
| Dim-Customers | 2 |  |  |  | 1 |  |  |  |  |  |  |  |  |  | 1 |  |  |  |  |
| Dim-Sales Reps | 1 |  |  |  |  |  |  |  |  |  |  |  |  |  | 1 |  |  |  |  |
| Dim-Date | 1 |  |  |  |  | 1 |  |  |  |  |  |  |  |  |  |  |  |  |  |
| Fact-Orders | 14 | 1 | 1 | 1 | 1 |  | 1 | 1 | 1 |  |  | 1 | 1 | 1 | 1 | 1 |  | 1 |  |
| Fact-Inventory | 10 | 1 | 1 | 1 |  | 1 | 1 | 1 |  |  |  |  | 1 |  |  |  | 1 | 1 | 1 |

Fig. 11

| Table Name | Segment Name | Brand # 11 | City # 10 | Country # 14 | Customer # 8 | Date 4 | Item # 10 | Line # 11 | Office # 6 | Order # 2 | Order Line # 1 | Received Date 5 | Region # 13 | Sales Region # 8 | Sales Rep # 6 | Site # 5 | SKU # 6 | State # 11 | Warehouse # 4 |
|---|---|---|---|---|---|---|---|---|---|---|---|---|---|---|---|---|---|---|---|
| Order Details | 15 | 1 | 1 | 1 | | 1 | 1 | 1 | 1 | 1 | | | 1 | 1 | 1 | 1 | 1 | 1 | |
| Fact-Orders | 14 | 1 | 1 | 1 | 1 | | 1 | 1 | 1 | 1 | | 1 | 1 | 1 | 1 | 1 | 1 | 1 | |
| Inventory | 10 | 1 | 1 | 1 | | 1 | 1 | 1 | | | | | 1 | | | | 1 | 1 | 1 |
| Orders | 10 | | 1 | 1 | 1 | | | 1 | 1 | | | 1 | 1 | 1 | 1 | | | 1 | |
| Fact-Inventory | 10 | 1 | 1 | 1 | | 1 | 1 | 1 | | | | | 1 | | | | 1 | 1 | 1 |
| Orders by Received Date, Office | 7 | | 1 | 1 | | | | | 1 | | | 1 | 1 | 1 | | | | 1 | |
| Dim-Locations | 7 | | 1 | 1 | | | | | 1 | | | | 1 | 1 | | | | 1 | 1 |
| Inventory by Date, Item, Region | 6 | 1 | | 1 | | 1 | 1 | 1 | | | | | 1 | | | | | | |
| Offices | 6 | | 1 | 1 | | | | | 1 | | | | 1 | 1 | | | | 1 | |
| Orders by Received Date, Item, Customer | 5 | 1 | | | 1 | | 1 | 1 | | | | 1 | | | | | | | |
| Warehouses | 5 | 1 | | 1 | | | | | | | | | 1 | | | | | 1 | 1 |
| Cities | 4 | | 1 | 1 | | | | | | | | | 1 | | | | | 1 | |
| Orders by Received Date, Brand, Line and Item | 4 | 1 | | | | | 1 | 1 | | | | 1 | | | | | | | |
| SKU Items | 4 | 1 | | | | | 1 | 1 | | | | | | | | | 1 | | |
| Dim-Products | 4 | 1 | | | | | 1 | 1 | | | | | | | | | 1 | | |
| Items | 3 | 1 | | | | | 1 | 1 | | | | | | | | | | | |
| Orders by Received Date, Sales Region, Customer | 3 | | | | 1 | | | | | | | 1 | | 1 | | | | | |
| States | 3 | | | 1 | | | | | | | | | 1 | | | | | 1 | |
| Customer Sites | 2 | | | | 1 | | | | | | | | | | | 1 | | | |
| Regions | 2 | | | 1 | | | | | | | | | | 1 | | | | | |
| Dim-Customers | 2 | | | | 1 | | | | | | | | | | | 1 | | | |
| Brands | 1 | 1 | | | | | | | | | | | | | | | | | |
| Countries | 1 | | | 1 | | | | | | | | | | | | | | | |
| Customers | 1 | | | | 1 | | | | | | | | | | | | | | |
| Lines | 1 | | | | | | | 1 | | | | | | | | | | | |
| Sales Regions | 1 | | | | | | | | | | | | | 1 | | | | | |
| Sales Rep Pictures | 1 | | | | | | | | | | | | | | 1 | | | | |
| Sales Reps | 1 | | | | | | | | | | | | | | 1 | | | | |
| Dim-Sales Reps | 1 | | | | | | | | | | | | | | 1 | | | | |
| Dim-Date | 1 | | | | | 1 | | | | | | | | | | | | | |

Fig. 12

| | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
| Order Details | 15 | 1 | 1 | 1 | 1 | | 1 | 1 | 1 | 1 | 1 | | 1 | 1 | 1 | 1 | 1 | 1 | |
| Fact-Orders | 14 | 1 | 1 | 1 | 1 | | 1 | 1 | 1 | | | | 1 | 1 | 1 | 1 | 1 | 1 | 1 |

Fig. 13

| | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
| Order Details | 15 | 1 | 1 | 1 | 1 | | 1 | 1 | 1 | 1 | 1 | | 1 | 1 | 1 | 1 | 1 | 1 | |
| Inventory | 10 | 1 | 1 | 1 | | 1 | 1 | 1 | | | | | 1 | | | | 1 | 1 | 1 |

Fig. 14

| Table Name | Segment Name | Brand # | City # | Country # | Customer # | Date | Item # | Line # | Office # | Order # | Order Line # | Received Date | Region # | Sales Region # | Sales Rep # | Site # | SKU # | State # | Warehouse # |
|---|---|---|---|---|---|---|---|---|---|---|---|---|---|---|---|---|---|---|---|
|  | 5 | 4 | 8 | 6 | 4 | 7 | 5 | 4 | 2 | 1 | 5 | 7 | 4 | 4 | 3 | 5 | 5 | 4 |  |
| Brands | 1 | 1 |  |  |  |  |  |  |  |  |  |  |  |  |  |  |  |  |  |
| Cities | 4 |  | 1 | 1 |  |  |  |  |  |  |  |  | 1 |  |  |  |  | 1 |  |
| Countries | 1 |  |  | 1 |  |  |  |  |  |  |  |  |  |  |  |  |  |  |  |
| Customers | 1 |  |  |  | 1 |  |  |  |  |  |  |  |  |  |  |  |  |  |  |
| Customer Sites | 2 |  |  |  | 1 |  |  |  |  |  |  |  |  |  |  | 1 |  |  |  |
| Inventory | 3 |  |  |  |  |  | 1 |  |  |  |  |  |  |  |  |  | 1 |  | 1 |
| Inventory by Date, Item, Region | 4 |  |  | 1 |  | 1 | 1 |  |  |  |  |  | 1 |  |  |  |  |  |  |
| Items | 1 |  |  |  |  |  | 1 |  |  |  |  |  |  |  |  |  |  |  |  |
| Lines | 1 |  |  |  |  |  |  | 1 |  |  |  |  |  |  |  |  |  |  |  |
| Offices | 1 |  |  |  |  |  |  |  | 1 |  |  |  |  |  |  |  |  |  |  |
| Orders | 1 |  |  |  |  |  |  |  |  | 1 |  |  |  |  |  |  |  |  |  |
| Orders by Received Date, Brand, Line and Item | 4 | 1 |  |  |  |  | 1 | 1 |  |  |  | 1 |  |  |  |  |  |  |  |
| Orders by Received Date, Item, Customer | 3 |  |  |  | 1 |  | 1 |  |  |  |  | 1 |  |  |  |  |  |  |  |
| Orders by Received Date, Office | 2 |  |  |  |  |  |  |  | 1 |  |  | 1 |  |  |  |  |  |  |  |
| Orders by Received Date, Sales Region, Customer | 3 |  |  |  | 1 |  |  |  |  |  |  | 1 |  | 1 |  |  |  |  |  |
| Order Details | 2 |  |  |  |  |  |  |  |  |  | 1 | 1 |  |  |  |  |  |  |  |
| Regions | 2 |  |  | 1 |  |  |  |  |  |  |  |  | 1 |  |  |  |  |  |  |
| Sales Regions | 1 |  |  |  |  |  |  |  |  |  |  |  |  | 1 |  |  |  |  |  |
| Sales Rep Pictures | 1 |  |  |  |  |  |  |  |  |  |  |  |  |  | 1 |  |  |  |  |
| Sales Reps | 1 |  |  |  |  |  |  |  |  |  |  |  |  |  | 1 |  |  |  |  |
| SKU Items | 1 |  |  |  |  |  |  |  |  |  |  |  |  |  |  |  | 1 |  |  |
| States | 3 |  | 1 |  |  |  |  |  |  |  |  |  | 1 |  |  |  |  | 1 |  |
| Warehouses | 1 |  |  |  |  |  |  |  |  |  |  |  |  |  |  |  |  |  | 1 |
| Dim-Locations | 7 |  | 1 | 1 |  |  |  |  | 1 |  |  |  | 1 | 1 |  |  |  | 1 | 1 |
| Dim-Products | 4 | 1 |  |  |  |  | 1 | 1 |  |  |  |  |  |  |  |  | 1 |  |  |
| Dim-Customers | 2 |  |  |  | 1 |  |  |  |  |  |  |  |  |  |  | 1 |  |  |  |
| Dim-Sales Reps | 1 |  |  |  |  |  |  |  |  |  |  |  |  |  | 1 |  |  |  |  |
| Dim-Date | 1 |  |  |  |  | 1 |  |  |  |  |  |  |  |  |  |  |  |  |  |
| Fact-Orders | 14 | 1 | 1 | 1 | 1 |  | 1 | 1 |  | 1 | 1 | 1 | 1 | 1 | 1 | 1 |  |  |  |
| Fact-Inventory | 10 | 1 | 1 | 1 |  | 1 | 1 |  |  |  |  | 1 |  |  |  |  | 1 | 1 | 1 |

Fig. 15

| Table | Attributes |
|---|---|
| Brands | Brand # |
| Cities | Country #, Region #, State #, City # |
| Countries | Country # |
| Customers | Customer # |
| Customer Sites | Customer #, Site # |
| Dim-Customers | Customer #, Site # |
| Dim-Date | Date, Day-of-Month, Day-of-Week, Holiday, Quarter #, Week # |
| Dim-Locations | Country #, Region #, State #, City #, Warehouse #, Office #, Sales Region # |
| Dim-Products | Brand #, Line #, Item #, SKU # |
| Dim-Sales Reps | Sales Rep # |
| Fact-Inventory | Date, Country #, Region #, State #, City #, Warehouse #, Brand #, Line #, Item #, SKU #, Quantity on Hand |
| Fact-Orders | Customer #, Site #, Date, Country #, Region #, State #, City #, Office #, Sales Region #, Brand #, Line #, Item #, SKU #, Sales Rep #, Units, Cost |
| Inventory | Warehouse #, SKU #, Date, Quantity on Hand |
| Inventory by Date, Item and Region | Country #, Region #, Item #, Date, Quantity on Hand |
| Items | Brand #, Line #, Item # |
| Lines | Line # |
| Offices | Country #, Region #, State #, City #, Office #, Sales Region # |
| Orders | Order #, Sales Rep #, Customer #, Site #, Office #, Received Date |
| Orders by Received Date, Brand, Line, and Item | Received Date, Brand #, Line #, Item #, Units, Cost |
| Orders by Received Date, Item and Customer | Received Date, Item #, Customer #, Units, Cost |
| Orders by Received Date, Offices | Received Date, Office #, Cost |
| Orders by Received Date, Sales Regions and Customers | Received Date, Sales Region #, Customer #, Cost |
| Order Details | Order #, Order Line #, SKU #, Units, Cost |
| Regions | Country #, Region # |
| Sales Regions | Sales Region # |
| Sales Rep Pictures | Sales Rep # |
| Sales Reps | Sales Rep # |
| SKU Items | Item #, SKU #, Colour, Size |
| States | Country #, Region #, State # |
| Warehouses | Country #, Region #, State #, City #, Warehouse # |

Fig. 16

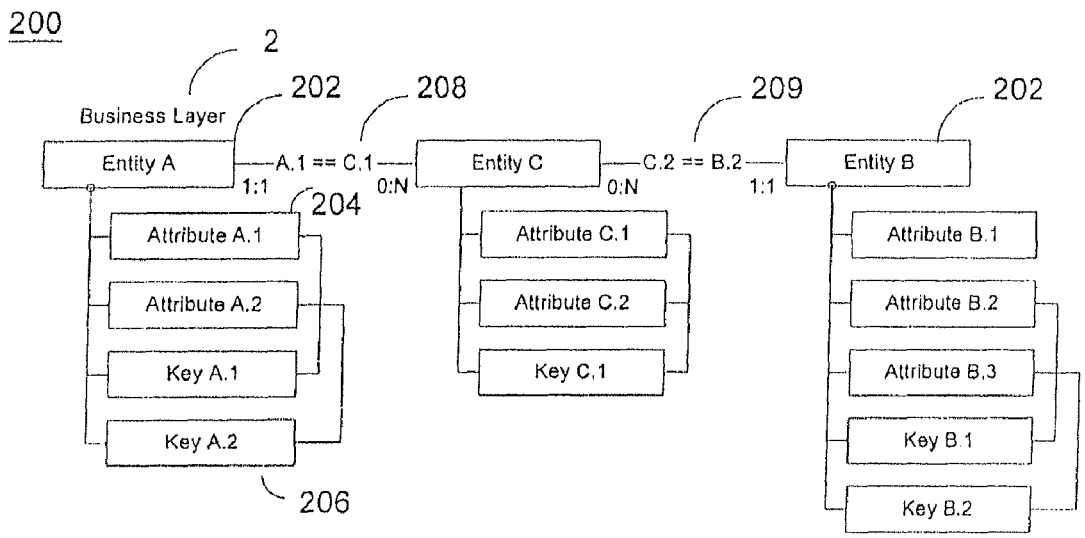
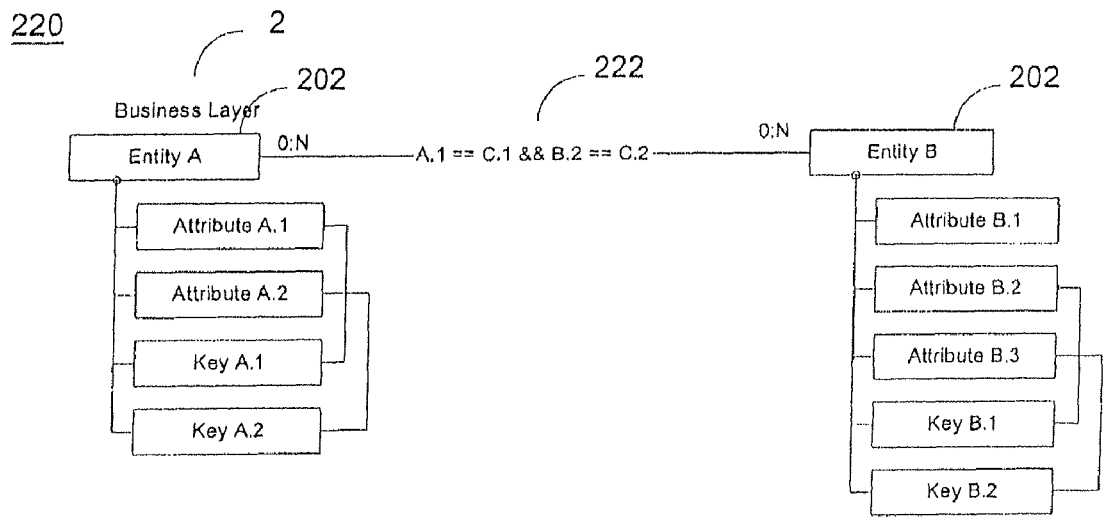
Fig. 18

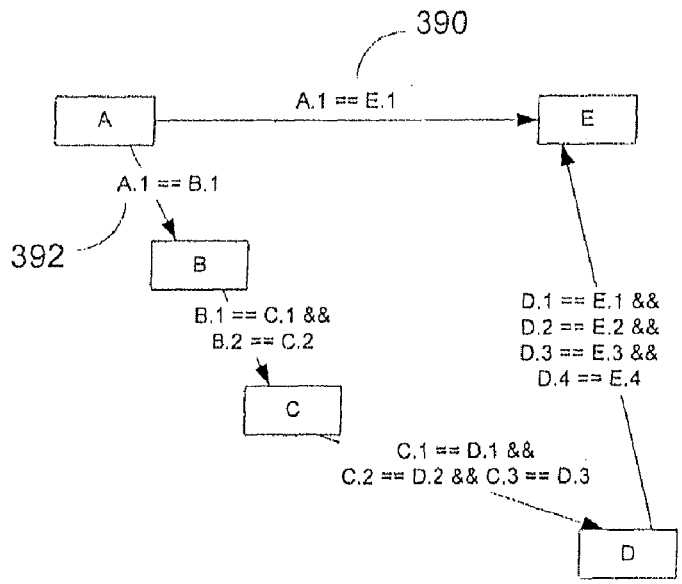
Fig. 25
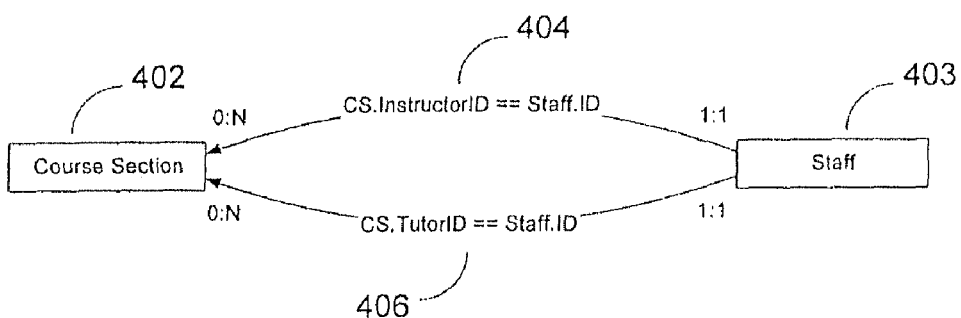
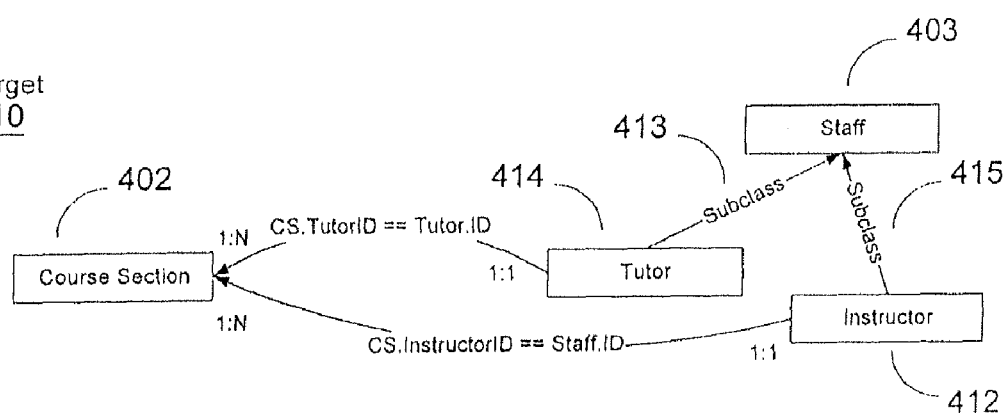
Fig. 26

METHODS AND TRANSFORMATIONS FOR TRANSFORMING METADATA MODEL

This application is a continuation of U.S. application Ser. No. 09/653,827 filed Sep. 1, 2000, which claims the benefit of priority Canadian patent application No. 2,281,331 filed Sep. 3, 1999.

FIELD OF THE INVENTION

The present invention relates generally to methods and transformations for transforming a metadata model, and more particularly to methods and transformations for transforming a metadata model which are suitably used in a reporting system that manages a plurality of relational databases.

BACKGROUND OF THE INVENTION

It is known to use data processing techniques to design information systems for storing and retrieving data. Data is any information, generally represented in binary, that a computer receives, processes, or outputs. A database or data warehouse is a shared pool of interrelated data. Information systems are used to store, manipulate and retrieve data from databases.

Traditionally, file processing systems were often used as information systems. File processing systems usually consist of a set of files and a collection of application programs. Permanent records are stored in the files, and application programs are used to update and query the files. Such application programs are generally developed individually to meet the needs of different groups of users. Information systems using file processing techniques have a number of disadvantages. Data is often duplicated among the files of different users. The lack of coordination between files belonging to different users often leads to a lack of data consistency. Changes to the underlying data requirements usually necessitate major changes to existing application programs. There is a lack of data sharing, reduced programming productivity, and increased program maintenance. File processing techniques, due to their inherent difficulties and lack of flexibility, have lost a great deal of their popularity and are being replaced by database management systems (DBMSs).

A DBMS is a software system for assisting users to create reports from data stores by allowing for the definition, construction, and manipulation of a database. The main purpose of a DBMS system is to provide data independence, i.e., user requests are made at a logical level without any need for knowledge as to how the data is stored in actual files in the database. Data independence implies that the internal file structure could be modified without any change to the users' perception of the database. However, existing DBMSs are not successful in providing data independence, and requires users to have knowledge of physical data structures, such as tables, in the database.

To achieve better data independence, it is proposed to use three levels of database abstraction in "The Electrical Engineering Handbook" Richard C. Dorf, CRCnetBASE 1999, section 94.1. With respect to the three levels of database abstraction, reference is made to FIG. 1.

The lowest level in the database abstraction is the internal level 1. In the internal level 1, the database is viewed as a collection of files organized according to an internal data organization. The internal data organization may be any one of several possible internal data organizations, such as $B^+$-tree data organization and relational data organization.

The middle level in the database abstraction is the conceptual level 2. In the conceptual level 2, the database is viewed at an abstract level. The user of the conceptual level 2 is thus shielded from the internal storage details of the database viewed at the internal level 1.

The highest level in the database abstraction is the external level 3. In the external level 3, each group of users has their own perception or view of the database. Each view is derived from the conceptual level 2 and is designed to meet the needs of a particular group of users. To ensure privacy and security of data, each group of users only has access to the data specified by its particular view for the group.

The mapping between the three levels of database abstraction is the task of the DBMS. When the data structure or file organization of the database is changed, the internal level 1 is also changed. When changes to the internal level 1 do not affect the conceptual level 2 and external level 3, the DBMS is said to provide for physical data independence. When changes to the conceptual level 2 do not affect the external level 3, the DBMS is said to provide for logical data independence.

Typical DBMSs use a data model to describe the data and its structure, data relationships, and data constraints in the database. Some data models provide a set of operators that are used to update and query the database. DBMSs may be classified as either record based systems or object based systems. Both types of DBMSs use a data model to describe databases at the conceptual level 2 and external level 3.

Data models may also be called metadata models as they store metadata, i.e., data about data in databases.

Three main existing data models used in record based systems are the relational model, the network model and the hierarchical model.

In the relational model, data is represented as a collection of relations. To a large extent, each relation can be thought of as a table. A typical relational database contains catalogues, each catalogue contains schemas, and each schema contain tables, views, stored procedures and synonyms. Each table has columns, keys and indexes. A key is a set of columns whose composite value is distinct for all rows. No proper subset of the key is allowed to have this property. A table may have several possible keys. Data at the conceptual level 2 is represented as a collection of interrelated tables. The tables are normalized so as to minimize data redundancy and update anomalies. The relational model is a logical data structure based on a set of tables having common keys that allow the relationships between data items to be defined without considering the physical database organization.

A known high level conceptual data model is the Entity-Relationship (ER) model. In an ER model, data is described as entities, attributes and relationships. An entity is anything about which data can be stored. Each entity has a set of properties, called attributes, that describe the entity. A relationship is an association between entities. For example, a professor entity may be described by its name, age, and salary and can be associated with a department entity by the relationship "works for".

Existing information systems use business intelligence tools or client applications that provide data warehousing and business decision making and data analysis support services using a data model. In a typical information system, a business intelligence tool is conceptually provided on the top of a data model, and underneath of the data model is a database. The data model of existing information systems typically has layers corresponding to the external level 3 and the internal level 1. Some data models may use a layer corresponding to both the external level 3 and the conceptual level 2.

Existing data models are used for the conceptual design of databases. When a system designer constructs an information system, the designer starts from a higher abstraction level 3 and moves down to a lower abstraction level 1, as symbolized in FIG. 1 by arrows.

That is, the system designer first performs logical design. At the logical design stage, the designer considers entities of interest to the system users and identifies at an abstract level information to be recorded about entities. The designer then determines conceptual scheme, i.e., the external level 3 and/ or conceptual level 2 of a data model. After the logical design is completed, the designer next performs physical design. At the physical design stage, the designer decides how the data is to be represented in a database. The designer then creates the corresponding storage scheme, i.e., the structure of a database, and provides mapping between the internal level 1 of the data model and the database.

Existing business intelligence tools thus each provides a different paradigm for retrieving and delivering information from a database. Accordingly, it is difficult to share information in the database among different business intelligence tools.

It is common that in a single organization, each group of users has its own established information system that uses its corresponding database. Thus, the single organization often has multiple databases. Those databases often contain certain types of information which are useful for multiple groups of users. Such types of information may include information about business concepts, data retrieval, and user limits and privileges. However, each information system was designed and constructed in accordance with specific needs of the group, and may use a different business intelligence tool from others. These differences in the information systems and business intelligence tools used do not allow sharing the information already existing in the databases among multiple groups of users.

Accordingly, it is desirable to provide means for building a metadata model which provide information that can be shared by multiple users who use those different business intelligence tools or client applications.

SUMMARY OF THE INVENTION

The present invention uses one or more transformations which transform a metadata model for containing model objects. The metadata model has a multiple layers including a lower layer containing one or more lower abstraction model objects having a lower abstraction level and a higher layer containing one or more higher abstraction model objects having a higher abstraction level. The transformations transform the model objects from the lower layer to the higher layer.

According to one aspect of the present invention, there is provided a metadata model transformer for transforming a metadata model. The metadata model has a lower layer containing one or more lower abstraction model objects having a lower abstraction level and a higher layer containing one or more higher abstraction model objects having a higher abstraction level. The transformer comprises a lower-to-higher transformation. The lower-to-higher transformation has means for obtaining information of a lower abstraction model object from the lower layer; means for abstracting the information by adding business intelligence; and means for creating in the higher layer a higher abstraction model object corresponding to the lower abstraction model object.

According to another aspect of the present invention, there is provided a metadata model transformer for transforming a metadata model that represent one or more data sources having physical data. The metadata model has a data access layer containing data access model objects, a business layer containing business model objects, and a package layer containing package model objects. The transformation comprises one or more data access model transformations for refining description of the physical data in the data source expressed by the data access model objects, one or more data access to business model transformations for constructing business model objects based on the data access model objects, one or more business model transformations for refining the business rules expressed by the business model objects; and one or more business to package model transformations for constructing package model objects based on the business model objects.

According to another aspect of the present invention, there is provided a method for transforming a metadata model for containing model objects. The metadata model has multiple layers including a lower layer containing one or more lower abstraction model objects having a lower abstraction level and a higher layer containing one or more higher abstraction model objects having a higher abstraction level. The method comprises obtaining information of a lower abstraction model object from the lower layer; abstracting the information by adding business intelligence; and creating in the higher layer a higher abstraction model object corresponding to the lower abstraction model object.

According to another aspect of the present invention, there is provided a method for transforming a metadata model that represent one or more data sources having physical data. The metadata model has a data access layer containing data access model objects, a business layer containing business model objects, and a package layer containing package model objects. The method comprises steps of refining description of physical data in the data sources expressed by the data access objects; constructing business model objects based on the data access objects; refining business rules expressed by the business model objects; and constructing package model objects based on the business model objects.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which:

FIG. 4B is tables showing an example of a set of transformations;

FIG. 7 is a chart showing flags used in the metadata model;

FIG. 10 is a table representing the process state;

FIG. 11 is a table showing an example of results of a step of a transformation;

FIG. 12 is a table showing an example of results of a step of the transformation;

FIG. 13 is a part of the table of FIG. 12;

FIG. 14 is a part of the table of FIG. 12;

FIG. 15 is a table showing an example of results of a step of the transformation;

FIG. 16 is an example of tables;

FIG. 18 is a diagram showing examples of source and target of a transformation;

FIG. 25 is a diagram showing relations of objects;

FIG. 26 is a diagram showing examples of source and target of a transformation;

DETAILED DESCRIPTION OF EMBODIMENTS OF THE INVENTION

Figure 2:
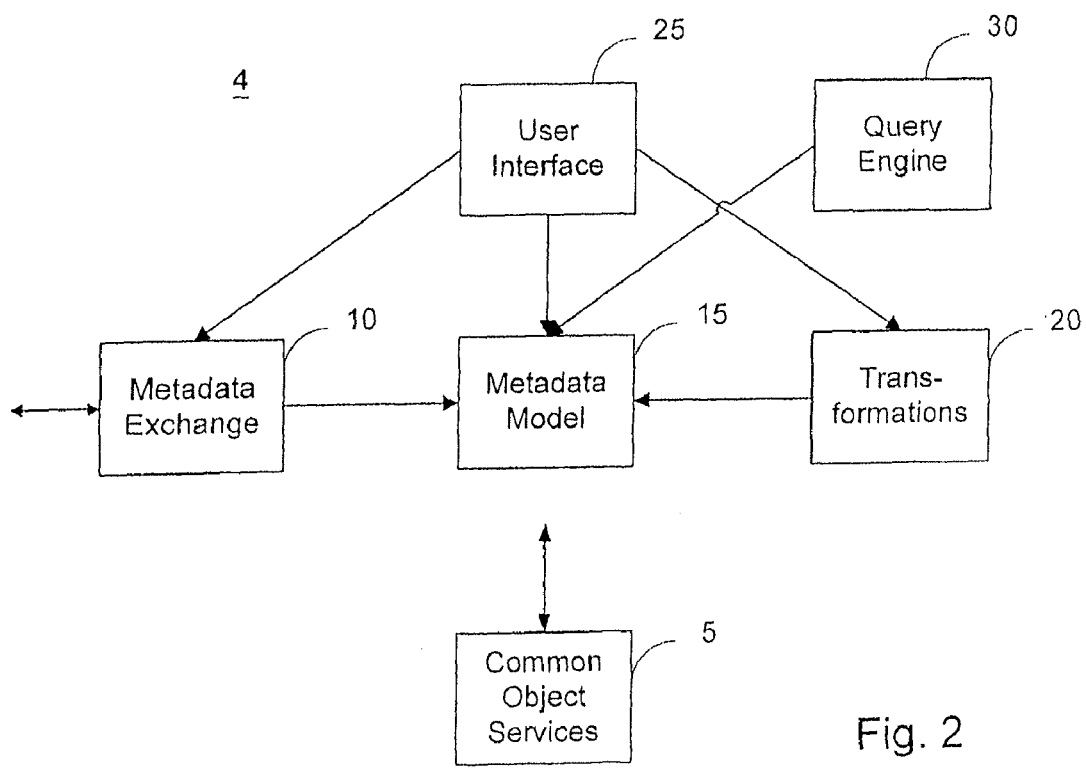
FIG. 2 is a diagram showing a reporting system in accordance with an embodiment of the present invention.

FIG. 2 illustrates a reporting system 4 to which an embodiment of the present invention is suitably applied. The reporting system 4 provides a single administration point for metadata that supports different business intelligence tools or client applications. Thus, it enables different business intelligence tools to extract and interpret data from various data sources in the same way.

The reporting system 4 includes common object services (COS) 5, a metadata exchange 10, a metadata model 15, a metadata model transformer or transformations 20, a user interface 25 and a query engine 30. The fundamental objective of the reporting system 4 is to provide a rich business-oriented metadata model 15 that allows the query engine 30 to generate the best queries of which it is capable, and allows users to build queries, reports and cubes with the aid of the query engine 30 to obtain desired reports from underlying data sources. To this end, COS 5, metadata exchange 10 and transformations 20 are provided.

Prior to describing the metadata model 15 and the transformations 20 in detail, each element of the reporting system 4 is briefly described.

COS 5 defines the framework for object persistence. Object persistence is the storage, administration and management of objects on a physical device and transfer of those objects to and from memory as well as the management of those objects on the physical device. The double head arrow from COS 5 in FIG. 2 represents that COS 5 communicates with all other elements shown in FIG. 2. COS 5 performs functions such as creating new objects, storing them on disk, deleting them, copying them, moving them, handling change isolation (check-in, check-out) and object modelling. COS 5 uses a modelling language, such as Comet Modelling Language (CML) that generates C++ code.

Figure 2A:
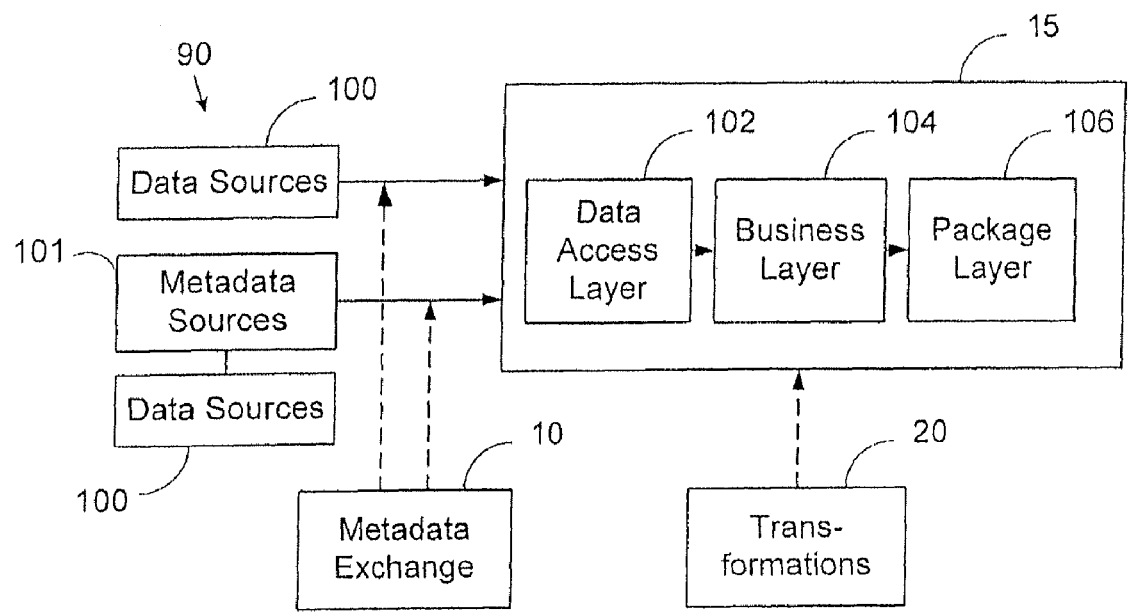
FIG. 2A is a diagram showing functions of the metadata exchange and transformations shown in FIG. 2.

The metadata exchange 10 is used to obtain metadata from external physical sources. Metadata is obtained from one or more external sources of metadata. As shown in FIG. 2A, external sources of metadata may be one or more data sources 100 and/or one or more metadata sources 101. Data sources 100 contain physical data. Examples of data sources 100 include databases and files. Metadata sources 101 contain descriptive information about data sources. Metadata sources 101 are also known as metadata repositories. Metadata repositories may be third party repositories. Metadata sources 101 generally have underlying data sources 100 containing physical data. The metadata exchange 10 facilitates importation of metadata from external sources 100 and 101 into the metadata model 15. Also, the metadata exchange 10 may facilitates exportation of metadata from the metadata model 15 to external metadata repositories.

Figure 1:
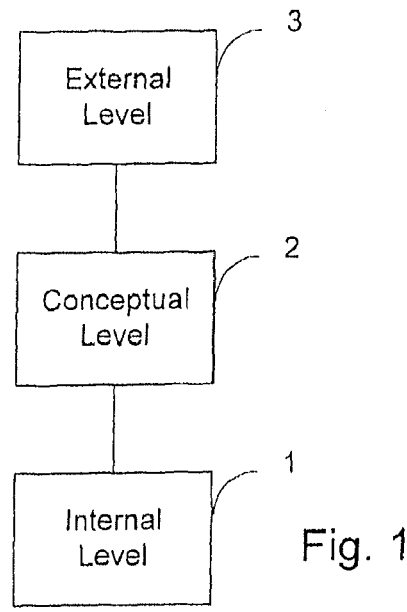
FIG. 1 is a diagram showing a structure of metadata model.

The metadata model 15 stores metadata about its underlying one or more data sources 100. It is used to provide a common set of business-oriented abstractions of the underlying data sources 100. The metadata model 15 defines the objects that are needed to define client applications that users build. The metadata model 15 provides three layers to realize three levels of abstractions of data sources 100 as described above referring to FIG. 1. The three layers are a physical layer or data access layer 102, a business layer 104 and a presentation layer or package layer 106.

Transformations 20 are used to complete the metadata model 15. For example, when a database is introduced to the reporting system 4, metadata is imported from the database into the metadata model 15. Metadata may also be imported from one or more metadata repositories or other data sources. Sufficient metadata may be imported from a database that would build only a small number of the objects that would actually be needed to execute queries. However, if such metadata does not have good mapping to the metadata model 15, then the transformations 20 can be used to provide the missing pieces to complete the metadata model 15.

The user interface 25 is layered on top of the metadata model 15 as a basic maintenance facility. The user interface 25 provides users with the ability to browse through the metadata model 15 and manipulate the objects defined thereby. The user interface 25 is also a point of control for the metadata exchange 10, for executing transformations 20, and for handling check-in, check-out of model objects, i.e., changed information, as well as a variety of other administrative operation. The user interface 25 allows users for the performance of basic maintenance tasks on the objects in the metadata model 15, e.g., changing a name, descriptive text, or data type. The user interface 25 is a mechanism that involves the capabilities of the metadata exchange 10 and the transformations 20. The user interface 25 has the ability to diagram the metadata model 15, so that the user can see how objects are related.

The query engine 30 is responsible for taking the metadata model 15 and a user's request for information, and generating a query that can be executed against the underlining data sources, e.g., a relational database. The query engine 30 is basically the reason for the existence of the rest of the blocks. The objective of the query engine 30 is to function as efficiently as possible and to preserve the semantics of the original question. A user may ask a question that is not precise. The request may be for something from "customers" and something from "products". But these may be related in multiple ways. The query engine 30 needs to figure out which relationship is used to relate "customers" and "products" to provide the user with information requested.

Figure 3:
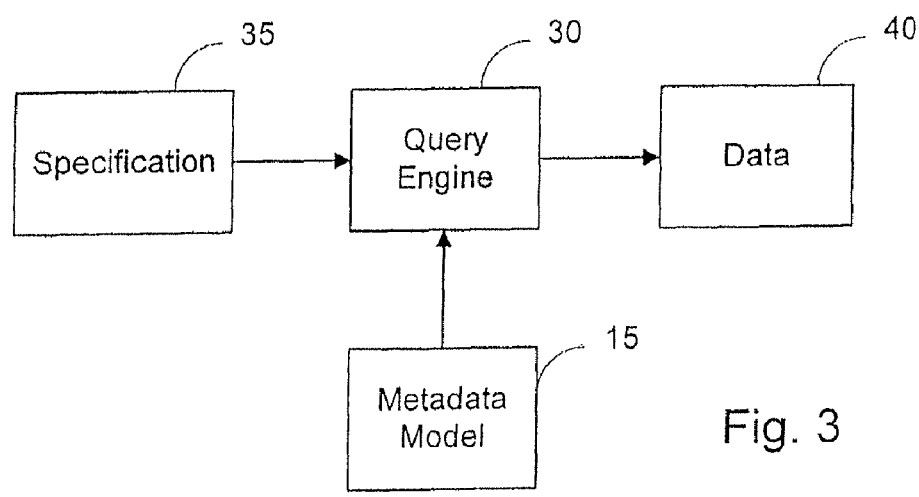
FIG. 3 is a diagram showing an example of a query engine shown in FIG. 2.

The use of the metadata model 15 by the query engine 30 is briefly described with reference to FIG. 3. A user uses a business intelligent tool or client application (not shown) to generate a user's request for information. Upon the receipt of the user's request, the client application generates an initial specification 35 based on the request. The specification 35 may be ambiguous. Also, it may not be in a form that can be applied to the data sources directly. Using the information that is built in the metadata model 15, the query engine 30 makes the specification 35 unambiguous and builds a query in terms of the data access layer 102 for the specification 35. This intermediate formulation of the query is also called a physical query and is subsequently translated into a data source specification language. The data source specification language may be Structured Query Language (SQL). A query in a data source specification language can be executed on the data sources. Thus, the correct data 40 may be obtained.

Metadata Model 15

The metadata model 15 is a tool to supply the common metadata administration tool, unified and centralized modelling environment, and application program interfaces for business intelligence tools. The architecture of the metadata model 15 will now be described in further detail.

Metadata contained in the metadata model 15 is also called model objects. The metadata model 15 is organized as a single containment tree or a series of containment trees. A containment tree starts at the highest level with a model object. The model object itself is at the root of the tool, and all other objects, except the relationship objects, are contained within this root object.

Figure 2B:
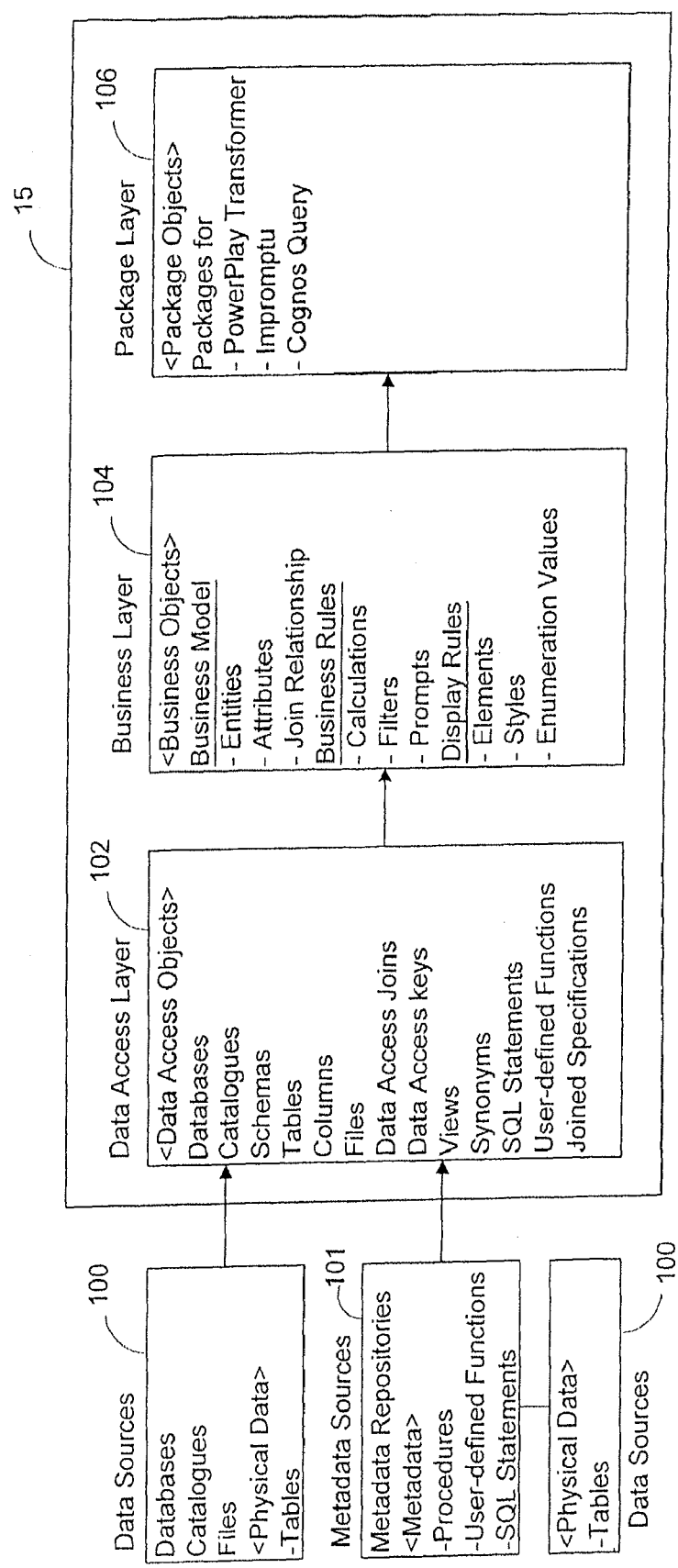
FIG. 2B is a diagram showing examples of objects contained in the metadata model shown in FIG. 2.

FIG. 2B shows the architecture of the metadata model 15. The metadata model 15 is composed of several layers, namely, a physical layer or data access layer 102, a business layer 104 and a presentation layer or package layer 106. These layers correspond to those abstraction levels shown in FIG. 1.

The model objects contained in a higher abstraction layer include objects which are constructed from a lower abstraction layer to the higher abstraction layer The data access layer 102 contains metadata that describes how to retrieve physical data from data sources 100. It is used to formulate and refine queries against the underlying data sources 100. The underlying data sources 100 may be a single or multiple data sources, as described above. Examples of data sources 100 include relational databases, such as Oracle, Sybase, DB2, SQL Server and Informix.

The data access layer 102 contains a part of the model objects that directly describe actual physical data in the data sources 100 and their relationships. These model objects may be called data access model objects. The data access model objects may include, among other things, databases, catalogues, schemas, tables, files, columns, data access keys, indexes and data access joins. Each table has one or more columns. Data access joins exist between tables. A data access key corresponds to a key in the data sources 100 that references one or more column names whose composite value is distinct for all rows in a table. A data access join is a relationship between two or more tables or files. Also, the data access model objects may include views, function stored procedures and synonyms, if applicable.

The data access model objects in the data access layer 102 are metadata, which are created as a result of importing metadata from data sources 100 and metadata sources 101 provided by users. Examples of metadata sources 101 include Impromptu Catalogue and Impromptu Web Query 2.12. The information of some data access objects may be available from the underlying data sources 100. Information for join relationships are not available from the underlying data sources 100. The user can customize some objects in the data access layer 102 in order to create data access joins, i.e., relationships between objects that were imported from various data sources. Also, the transformations 20 may transform the data access layer 102 to complete it.

Also, the data access layer 102 may allow users to define therein data source queries, such as SQL queries. Data source queries return a result set of physical data from underlying data sources 100. Those created data source queries are treated as objects in the data access layer 102 like tables. After data source queries are defined, a set of columns objects is generated for each data source query by the query engine 30 based on the SQL statement. Users may also define stored procedures and/or overloaded stored procedures, rather than importing them from metadata sources 101.

The business layer 104 describes the business view of the physical data in the underlying data sources 100. It is used to provide business abstractions of the physical data with which the query engine 30 can formulate queries against the underlying data sources 100.

The business layer 104 contains a part of the model objects that can be used to define in abstract terms the user's business entities and their inter relationships. These model objects may be called business model objects. The business model objects are reusable objects that represent the concepts and structure of the business to be used in business intelligence environments. They represent a single business model, although they can be related to physical data in a number of different data sources 100.

The business model objects consist of a business model, business rules and display rules. The business model may include entities, attributes, keys and joins. Joins may be also called join relationships. The user interface 25 can provide a view of the business model as an entity-relationship diagram.

The business rules may include calculations, filters and prompts. The display rules may include elements, styles and enumeration values.

The business model objects are closely related to the data access model objects in the data access layer 102. For example, entities in the business layer 104 are related to tables in the data access layer 102 indirectly; and attributes in the business layer 104 correspond to columns in the data access layer 102. Business joins exist between entities. Each business model object has a partner in the data access layer 102, i.e., a relationship exists between a table and an entity. While the tables in the data sources 100 store data access layer objects in accordance with the design of its underlying data sources 100, the entities in the business layer 104 hold the metadata representing the business concept. Entities are collections of attributes.

Attributes of entities in the business layer 104 contain expressions related to columns of tables in the data access layer 102. An attribute is usually directly related to a single column of the data access layer 102. For example, the entity "customer" could have attributes "customer name", "customer address", and the like. In the simplest case, all the attributes of an entity in the business layer 104 are related one-to-one to the columns of a single table in the data access layer 102. However, the relationship is not always a one-to-one relationship. Also, an attribute may be expressed as a calculation based on other attributes, constants and columns. For example, an attribute may be a summary of data in other attributes, e.g., a total amount of all the orders placed by customer.

In the business layer 104, entities are related to other entities by joins. Joins are classified as one of containment, reference or association. A containment join represents a strong relationship between entities. For example, an entity OrderDetail would have no meaning without an entity OrderHeader. Thus, the entity OrderDetail is containment of the entity OrderHeader.

A reference join indicates that one entity acts as a lookup table with respect to the other. For example, OrderDetail and Products are related via a relationship. In this case, Products acts as a lookup table so the relationship is marked as a reference relationship.

An association join represents relationships between entities which are not categorised as containment or reference joins.

It is advantageous to categorize the joins into these three types because they should be treated differently when query paths are considered. For example, a reference join should not be taken as a query path because if multiple entities reference to an entity, the referenced entity could incorrectly relate the unrelated multiple entities to each other by a query path through the referenced entity. By identifying reference joins as such, query paths can easily avoid these joins.

In addition, an entity may inherit information from another entity using a technique called subtyping. A subtype entity may be specialization of its supertype entity. For example, an entity Employee is a supertype entity for a subtype entity Salesman. Generally, a subtype entity has more attributes than its supertype. In the above example, the entity Employee may have attributes EmployeeNumber, Name, and Salary; and the entity Salesman may have attributes Quota, Sales and Commission in addition to EmployeeNumber, Name, and Salary.

Entities and attributes in the business layer 104 are given user friendly meaningful names. For example, the column named CUSTNAM from the CUST table in the data access layer 102 could be mapped to Customer Name attribute contained in the Customer Entity in the business layer 104.

The ways of use of entity relationships in the metadata model 15 are different from those in conventional modelling tools. For example, in most Entity-Relationship (ER) modelling tools, the ER concept is used to provide an abstraction for defining a physical database, i.e., it is a different "view" of the physical database. Within the metadata model 15, the business layer 104 is used to provide an abstraction for reporting data from physical data sources 100.

The information of the objects of the business model in the business layer 104 is not generally available in underlying data sources 100. Usually available information in metadata sources 101 is associated with the data access layer 102, rather than the business layer 104. One thing that may be available in external metadata repositories 101 is the business names for objects in the metadata model 15. However, again these business names tend to be provided for the physical tables and columns. If they can be mapped to the appropriate business entity or attribute, they may be used.

The business rules are used to develop business intelligence applications. Calculations use a combination of attributes and expression components, and make them available to report so that the up-to-date and consistent definitions are used to execute reports.

Filters and prompts are used to restrict queries. Applying a filter to an entity or attribute limits the scope of data retrieval for all users who work with this entity or attribute. Applying a filter to an entity or attribute in conjunction with a user class limits the scope of data retrieval for the user class. Elements and styles are used to associate presentation information with an attribute.

The package layer 106 contains a part of the model objects that describe subsets of the business layer 104. These model objects may be called package model objects. These are used to provide an organized view of the information in the business layer 104. The information is organized in terms of business subject areas or by way in which it is used.

The package model objects in the package layer 106 include presentation folders and/or subjects. Each subject in the package layer 106 contains references to a subset of the business model objects that are interested in a particular group or class of users. The subset of the business model objects are reorganized so that they can be presented to the group of users in a way suitable to the group of users. Also, a user can combine references to the business model objects available from the business layer 104 into combinations that are frequently used in the user's business. User defined folders that contain these combinations of references are called user folders or presentation folders.

Presentation folders and subjects contain references to objects in the business layer 104, including entities, attributes, filters and prompts. Presentation folders create packages of information for the end user. Each package is defined for a specific purpose, e.g., one or more business intelligence applications. Designers can combine them, by functions of subjects or by group of users, in order to organize business model objects into collections of most frequently used objects, or in order to support various business intelligent tools or client applications using the reporting system 4 of the present invention as a metadata provider.

The information of the objects in the package layer 106 is not generally available in external data sources 100. The concept of organized business subject areas may exist in external metadata repositories 101. The metadata model 15 may use such a concept in the business layer or data access layer.

For all objects in the data access layer 102 and the business layer 104, business descriptive metadata may also be included. Business descriptive metadata is used to help understand the source and the meaning of the data which is being manipulated. Business descriptive metadata may include lineage, accuracy, description and refresh rules. Lineage is a history of source and processing steps used to produce data set. Refresh is update rules for refreshing aggregated or submitted data for reporting. Business descriptive metadata is used by an end user and an application designer to understand the source of the information. Business descriptive metadata includes such things as descriptions and stewards. A steward is a person or group that manages the development, approval, creation, and use of data within a specified functional area. Business descriptive metadata may also include information that can be used to relate the objects to information in external repositories 101.

Business descriptive metadata may exist in many forms in external repositories 101. General purpose repositories and business information directories collect this information as that is their raison d'etre. Warehouse Extract-Transform-Load (ETL) tools collect this information as a result of collecting the ETL specifications. The information may be duplicated or collected from a variety of sources in the metadata model 15 so that it is available directly to the user as metadata. The metadata model 15 may also include context information which can be used to retrieve information from external repositories 101.

Most objects in the metadata model 15 may be organized in a tree. Some objects model relationships between other objects. As described above, each business model object in the business layer 104 has a partner in the data access layer 102. This relationship provides the context for processing all the related information of the tables in the data access layer 102. For example, if a particular column has not been processed, transformations 20 process the column in the context of a parent relationship, i.e., build an attribute and put under the entity.

The metadata model 15 may be built using CML files. CML files are compiled into C++ code which is then compiled in the reporting system 4 to build the metadata model 15.

Transformations 20

The transformations 20 are performed to automatically construct portions of the common metadata model 15 based on the objects contained in another portion of the metadata model 15.

The transformations 20 contain a plurality of different transformations, as described below. Early in the lifecycle of a metadata model 15, the model designer will likely choose to use all or most of the transformations 20 to develop a standard model 15. As the model 15 progresses through the lifecycle, however, the number of transformations 20 used by the designer is likely to decrease as the model 15 is customized to suit the particular needs of the application of the users.

The model designer may also determine that a transformation is not applicable to a particular metadata model. Applying this knowledge to selecting a subset of transformations 20 to execute can considerably reduce the amount of processing.

Figure 5:
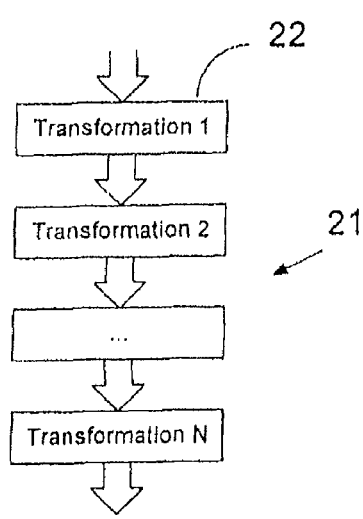
FIG. 5 is a diagram showing concept of the transformations.

In order to facilitate these demands, it is desirable that each transformation 20 is coded as independently as possible. In the simplest of scenarios, as shown in FIG. 5, the architecture of the transformations 20 could be thought of as a pipeline 21 with a number of pumping stations en route. Instead of transporting oil or natural gas, the metadata model flows through the pipeline 21. A pumping station represents a transformation step 22. Each transformation step 22 is constructed to suit the requirements of the scenario. As new transformations are constructed, they can be added to the pipeline 21 as required. Obsolete transformation steps may be removed from the pipeline 21.

Figure 6:
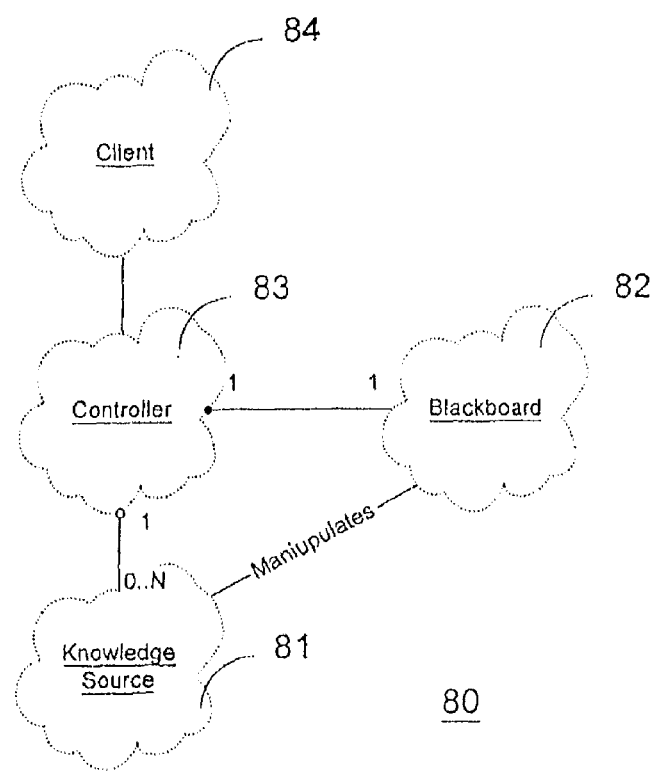
FIG. 6 is a diagram showing an implementation structure.

However, as development of the transformations 20 has progressed, a number of relationships have been developed between the transformations 20. Data about the model 15 that is constructed during the processing of some transformations 20 sometimes can be used by later transformations 20. The "Blackboard" pattern 80 shown in FIG. 6 ("Pattern-Oriented Software Architecture A System of Patters" by Buschmann, et. al., published by John Wiley & Sons 1996, pages 71-95) matches the requirements. The pattern 80 uses the term "Knowledge Source" 81 as the actor that manipulates the objects on a blackboard 82. The knowledge source 81 and the blackboard 82 are controlled by a controller 83 which presents results to a client 84. Each transformation 20 would be a Knowledge Source 81. The use of the pattern 80 preserves the independence of the transformations 20 as much as possible, yet recognizes that the transformations 20 are linked together by the data stored on the blackboard 82. The controller 83 is responsible for scheduling the execution of the knowledge sources 81, i.e., transformations 20.

Figure 4:
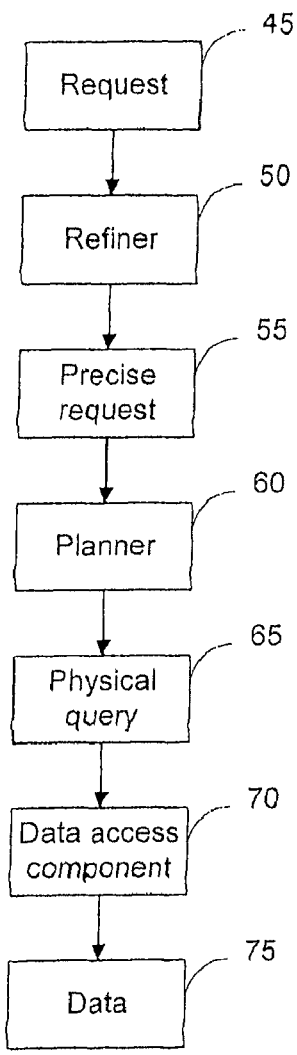
FIG. 4 is a diagram showing an example of functions of the query engine.
Figure 4A:
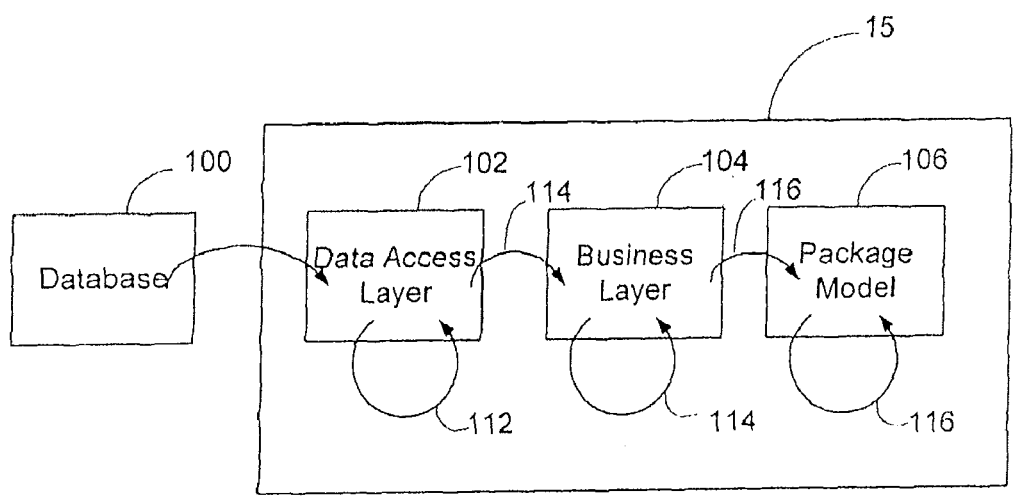
FIG. 4A is a diagram showing an example of functions of the transformations shown in FIG. 2.

Referring to FIG. 4A, the basic functions of the transformations 20 are described.

The metadata model 15 has the three layers: data access layer 102, business layer 104 and package layer 106, as described above. The transformations 20 also has three kinds: data access (physical) model transformations 112, business model transformations 114, package (presentation) model transformations 116. The transformations 20 transform metadata from the lower abstraction level 102 to the higher abstraction level 106.

A data source 100 is a source of physical definitions of physical data, i.e., a source of metadata. A data source 100 may be one or more database or other data sources. When the data source 100 is introduced into the reporting system 4, the physical definitions of the data source 100 are extracted from the data source 100 into the data access layer 102 in the metadata model 15 by the metadata exchange 10, as described above referring to FIG. 2A. The reporting system 4 may also import metadata from other metadata sources using the metadata exchange 10. Thus, data access layer objects are built in the data access layer 102 in the metadata model 15. These data access layer objects represent a solid picture of what exists in the data source 100.

However, these imported data access layer objects are inadequate to provide reports to users, i.e., the metadata model 15 is incomplete with only those imported data access layer objects and cannot be used to build reports. That is, the imported data access layer objects may not be enough to form a complete business layer 104. In order to improve the data access layer 102, the data access model transformations 112 take the data access layer objects that exist in the data access layer 102, and make changes to them and/or add new objects to complete the data access layer 102.

Then, the business model transformations 114 take the data access layer objects from the data access layer 102 and build their corresponding business model objects in the business layer 104. However, these business model objects that are transformed from the data access layer 102 are often inadequate to provide reports to users. In order to improve the business layer 104, the business model transformations 114 take the business model objects that exist in the business layer 104, and make changes to apply some business intelligence to them.

The package model transformations 116 take the business model objects from the business layer 104 and build their corresponding package layer objects in the package layer 106. Then, the package model transformations 116 prepare the package layer objects suitable for corresponding client applications. The package model transformations 116 take the package layer objects that exist in the package layer 106, and make changes to them to complete the package layer 106. The package layer objects in the package layer 106 may then be used to build reports to users by the client applications.

Thus, by the transformations 20, a physical database design is converted into a logical database design, i.e., the transformations 20 deduce what the logical intent of the model was.

The transformations 20 may also include multidimensional model transformations and general transformations as described below.

Transformation Data Recorded in the Model

Each transformation 20 records in the model 15 information about changes made during execution of the transformation 20 to avoid repeating the same activity in subsequent executions. Every object class that can be modified by the transformations 20 preferably supports an additional interface to store the transformation information.

When one object leads to the creation of another, a new relationship is created between the two objects. Transformations use the source and target object identifiers to identify the original set of objects and the resulting set of objects. Each transformation also uses two status flags. These flags are used to determine the processing flow for each object and to control the execution of a transformation over the relationship.

The first flag is a prohibit flag. If the prohibit flag is set, the transform will not modify the object during the execution of the transformation. The second flag is a processed flag. This flag records whether the transform has ever processed the object.

Data Access (Physical) Model Transformations 112

Referring to FIG. 4B, the data access model transformations 112 include a data access (physical) join constructing transformation 112a, a data access (physical) key constructing transformation 112b, a table extract constructing transformation 112c and a data access (physical) cube constructing transformation 112d.

Data Access (Physical) Join Constructing Transformation 112a

Referring to FIG. 4B, when the data source 100 contains physical tables having indexes, the metadata exchange 10 imports the physical definitions of the physical tables into the data access layer 102 of the metadata model 15. An index is a database structure used to optimize query performance by organizing the contents of specified columns into structures that facilitate quick searching.

Thus, the data access layer 102 contains the definitions of the physical tables, i.e., data access layer table objects 122 in the data access layer 102. The table objects 122 in the data access layer 102 may be called "data access layer tables". The data access layer tables 122 have indexes imported with the definitions of the physical tables from the data source 100.

The data access join constructing transformation 112a constructs join relationships 123 between the data access layer tables 122 based on the contents of their indexes. That is, the data access join constructing transformation 112a first finds columns used in the indexes in each data access layer table 122, and then for each pair of the data access layer tables 122, searches a best match of columns used in the indexes. The best match is defined primarily as the match with the largest number of matching columns. In case of ties, the match that uses the largest index wins. Columns match if their names are identical. The names are usually compared as being case insensitive. In all cases, one set of columns is a subset of the other column set as defined by the indexes of the tables. That is, one set of column names is wholly contained within the other set.

If a match is found between columns, the data access join transformation 112a joins the tables by constructing a new data access layer join relationship. The join's expression requires that the values of like named columns from the aforementioned column sets are equal.

The following shows an example of the operation of the data access join constructing transformation 112a. Herein, a unique index is an index that contains unique values.

I. For each non-prohibited data access layer table:
   A. Construct TableInfo:
      1. Get list of columns in table and sort by name.
      2. For each index:
         a) Construct IndexInfo
            (1) Record columns used in index, whether index is unique.
            (2) Sort column list based on name.
      3. Sort IndexInfo objects based on uniqueness of index, number of columns.
      4. For each index:
         a) If the columns of the index are not all contained within an IndexInfo object representing a unique index already associated with the TableInfo object:
            (1) Add the IndexInfo object to the TableInfo object
            (2) Remove columns used in index from TableInfo column list.
II. For each non-prohibited views and files:
   A. Construct TableInfo:
      1. For each non-prohibited view, file and stored procedure;
         a) Get list of columns in table and sort by name.
III. For each TableInfo pair {T1, T2}:
   A. If either T1 or T2 has not been processed by this transformation:
      1. Compare unique indexes {I1 from T1, I2 from T2} to determine best match.
      2. If a match is found:
         a) Build a join using the matching columns.
      3. Else
         a) Compare unique indexes from one table with non-unique indexes from the other table {I1 from T1, I2 from T2} to determine the best match.
         b) If a match is found:
            (1) Build a join using the matching columns.
         c) Else
            (1) Compare unique indexes from one table with column list from the other table {I1 from T1, C from T2} to determine the best match.
            (2) If a match is found:
               (a) Build a join using the matching columns.
IV. Mark each table as transformed.

The Following Table Shows the Status Flag Usage.

| Object Class | Prohibit | Processed |
| --- | --- | --- |
| Table<br>View | Do not process the instance. | When performing pair-wise comparisons, avoid pairs |

| Object Class | Prohibit | Processed |
|---|---|---|
| Binary File | | with both objects marked as processed. |
| Ranged Binary File | | |
| Delimited Text File | | |
| Fixed Text File | | |

Data Access (Physical) Key Constructing Transformation 112*b*

The data access key constructing transformation 112*b* uses unique indexes in the data access layer tables 122. It constructs data access keys for the data access layer tables 122 based on the unique indexes.

The data access key constructing transformation 112*b*, for each data access layer table 122, builds a data access key for each unique index, and adds a relationship between the index and the data access key. The data access key constructing transformation 112*b* adds each column in the index to the data access key if the column does not exist in the data access key. It removes each column from the data access key if the column does not exist in the index. Thus, for each data access layer table 122, a data access key having columns common in all indexes of the data access layer table 122 is constructed for each unique index.

The following shows an example of the operation of the data access key constructing transformation 112*b*:

I. For each non-prohibited table:
  A. For each unique index:
  B. If index has already been transformed:
    1. Attempt to locate target key.
  C. Else
    1. Build key
    2. Mark index as transformed
    3. Add relationship between index and key.
  D. If key built or found:
    1. For each column in index:
      a) If column does not exist in key:
        (1) Add column to key.
    2. For each column in key:
      a) If column does not exist in index
        (1) Remove column from key.

The Following Table Shows the Status Flag Usage.

| Object Class | Prohibit | Processed |
|---|---|---|
| Table | Do not process this instance. | |
| Index | Do not process this instance. | Update this instance. |

Table Extract Constructing Transformation 112*c*

For the purposes of this transformation, a table, view and file are all considered equivalent. For example, an aggregate table described below may contain data derived from a query executed against a view.

As described above, the data access layer 102 contains a set of data access layer tables 122 that describe the physical tables in the data source 100. The physical tables may include aggregate tables. An aggregate table is contains summarized data or a subset of data that is used for faster reporting. When a data access layer table 122 is created based on an aggregate table, the data access layer table 122 is identified as such to avoid creating multiple entities for the same data.

The reporting system has data source specific language statements, such as SQL statements, in the metadata model 15. These statements are statements to populate tables and are supplied externally. A set of data source specific language statements 124 contain a query that populates a subset of the data access layer tables 122 in the data access layer 102. These statements may be available in a number of forms, such as a set of text files.

The table extract constructing transformation 112*c* uses the set of data source specific statements 124, and constructs metadata required to mark, as extracts, data access layer tables 122 that contain aggregate data. Extracts typically contain pre-computed summary values. The extract tables 122 can be used to return query results in less time than would be required if the query was executed against the physical tables in the data source 100.

Figure 8:
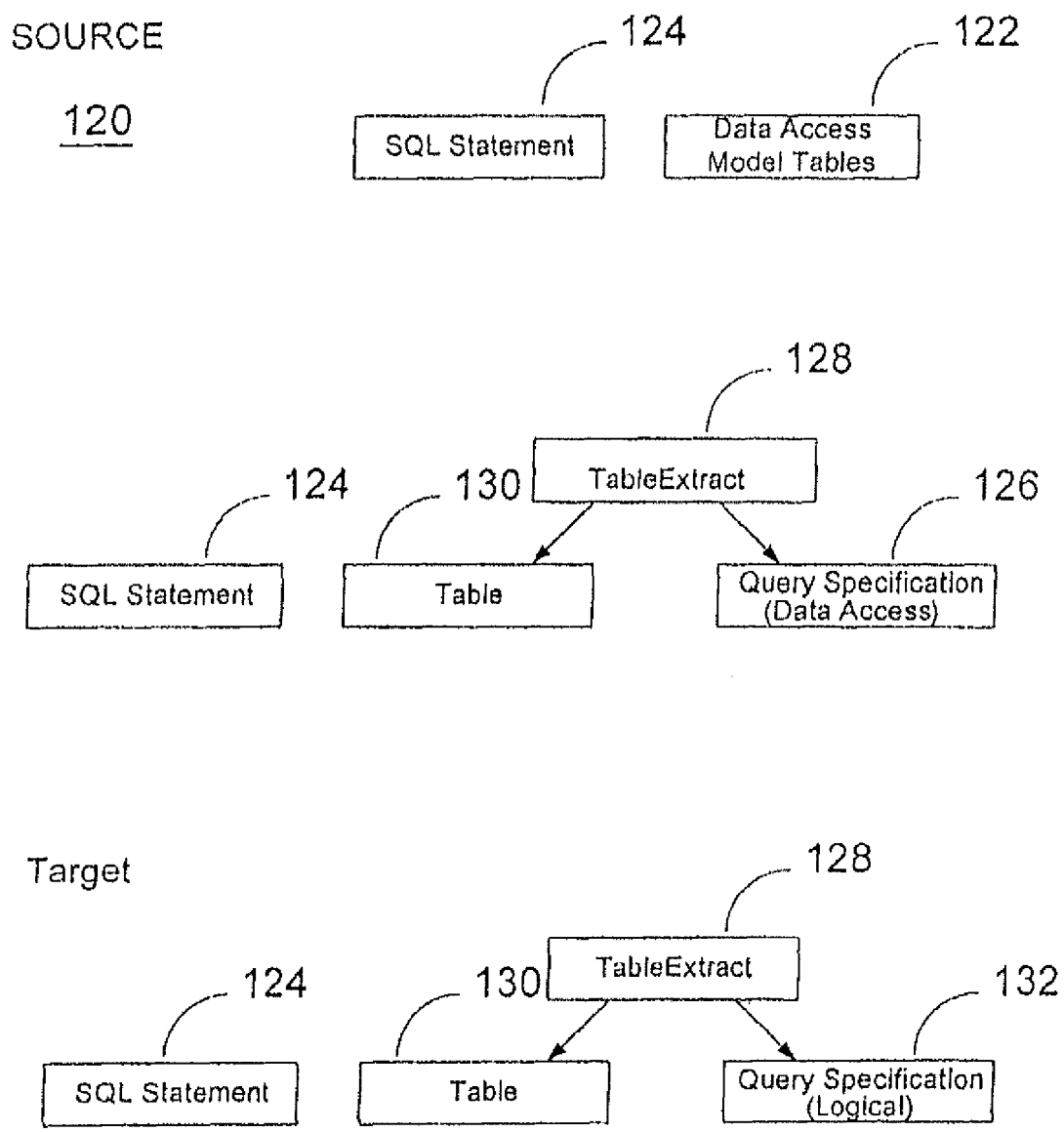
FIG. 8 is a diagram showing examples of source and target of a transformation.

As shown in FIG. 8, the table extract constructing transformation 112*c*, using the SQL statements 124, constructs query specifications 126 that reference data access layer tables 122 and other data access model objects.

When an SQL statement 124 is expressed as a query specification and references data access layer tables 122 and columns that are known to the data access layer 102, the table extract constructing transformation 112*c* builds a corresponding query specification query 126 in terms of data access layer tables 122 and columns, and also builds a table extract object 128 that references a destination table 130 and the newly constructed query specification query 126.

Then, the table extract constructing transformation 112*c* converts the reference to the data access layer tables 122 and other data access model objects in the constructed query specification queries 128 into logical objects 132. For example, a column in the table extract is replaced with a corresponding attribute. Thus, the table extract 128 is completely constructed.

The operation of the table extract constructing transformation 112*c* is as follows:

I. For each SQL statement:
  A. If a query specification query can be constructed from the SQL statement (i.e. the statement can be expressed as a query specification query and only references tables and columns that are known to the model) and the target tables and columns are known to the model:
    1. Build the corresponding query specification query in terms of physical tables and columns.
    2. Build an I_TableExtract object that references the destination table and the newly constructed query.
II. For each constructed table extract:
  A. Replace each reference to a physical object (column) with its corresponding logical object (attribute).

As clearly seen in the above operation, the implementation of the table extract constructing transformation has two distinct steps. Since there may be other transformations executed against the logical model, such as an E/R model, there would be an additional amount of bookkeeping required to reflect these logical model manipulations in the constructed queries. Implementing the transformation as two distinct steps avoids the bookkeeping.

The first step of the table extract constructing transformation 112*c* may be implemented in the following alternate way.

The table extract constructing transformation 112*c* may analyze keys and columns of the physical tables in the data source 100, as well as the relationships that those physical tables with other physical tables, and determine which physical tables contain aggregate data.

The analysis of keys and columns of the physical tables is carried out by building a list of extended record identifiers for the physical tables, and then determining a relationship between the extended record identifiers. An extended record identifier contains key segments from higher level keys. If the extended record identifier of physical table A is a subset of the extended record identifier of physical table B, then the table extract constructing transformation 112c determines that the data in the physical table A is an aggregate of data in the physical table B.

This alternate first step of the table extract constructing transformation 112c is described using an example.

Figure 9:
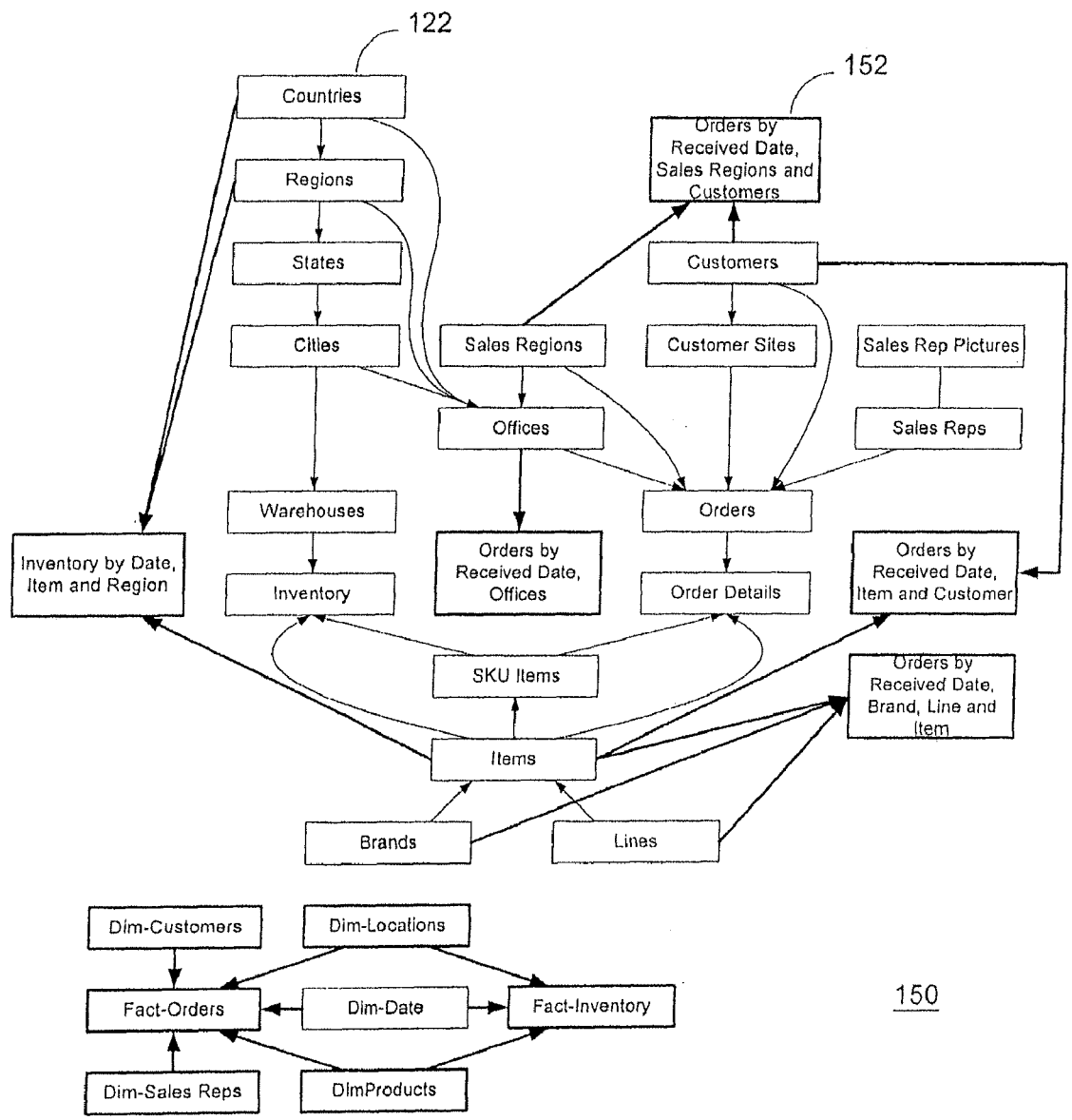
FIG. 9 is a diagram showing an example of a data access layer.

As a source of the table extract constructing transformation 112c, a data access model 150 shown in FIG. 9 will be considered. In FIG. 9, each box represents a data access layer table 122. The bold boxes 152 represent data access layer tables 122 that contain aggregated data. In this example, the data access layer tables 122 contain columns as shown in FIG. 16. In FIG. 16, key columns are shown bolded. A key column is a column that is used by a key. Each data access layer table 122 may have more columns.

The target of the table extract constructing transformation 112c is to recognize the data access model tables represented by the bolded boxes 152 in the source data access model 150 as extract tables.

A query specification for the extract is also constructed by understanding the relationship. The query may be incorrect for the reasons, such that matching of column names may be incorrect; incorrect assumption may be made regarding aggregate expressions, for example, aggregate expression may not be a sum and an aggregation level may not be correct; and missing filter clauses in the query. The extract may be relevant to a subset of the data contained in the base table.

The table extract constructing transformation 112c performs a detailed analysis of the key columns in the physical tables in the data source 100. The table extract constructing transformation 112c first constructs a list of key columns for each physical table in the data source 100. This list may be represented as a grid as shown in FIG. 10. The numbers across the top in FIG. 10 are the number of physical tables using that particular key column. The numbers down the left side of are the number of key columns in that particular physical table.

The table extract constructing transformation 112c then attempts to determine a relationship between data access layer tables 122 based on the extended record identifiers. These relationships are represented in the metadata model 15 as join relationships, which have two cardinality properties. Cardinality is the minimum and maximum number of records in a physical table that a given record can give a physical table on the other side of the relationship. It is shown at the join as {minimum number maximum number}.

The table extract constructing transformation 112c builds extended record identifier lists for the tables by tracing all {0,1}:1-{0,1}:N join relationships, and all {0,1}:1-{0,1}:1 join relationships. Join relationships of cardinality {0,1}:1-{0,1}:N are traced from the N side to the 1 side. As new physical tables are encountered, their key segments are added to the physical table being traced. This may be accomplished by using a recursive algorithm. FIG. 11 shows the results of constructing the extended record identifiers.

The table extract constructing transformation 112c sorts the result table shown in FIG. 11 based on the number of key segments in each physical table. The table extract constructing transformation 112c compares each physical table to determine which table extended record identifier is a subset of the other table extended record identifiers. The table extract constructing transformation 112c only needs to compare those physical tables which are leaf tables. A leaf table is defined such that all of the {0,1}:N cardinalities of all associated joins is associated with the table. FIG. 12 shows the sorted result.

The table extract constructing transformation 112c now turns to the pair-wise comparisons of the leaf tables. The first two physical tables to be compared are Order Details and Fact-Orders, as shown in FIG. 13. The extended record identifiers differ only in the segments Order #, Order Line #, and Received Date. In order to determine the relationship between these two physical tables, the table extract constructing transformation 112c attempts to locate columns that match the unmatched key segments in the physical tables or their parent tables which are the tables at the other end of each 0:1-0:N join.

As shown in FIG. 13, for the first physical table, Order #, the table extract constructing transformation 112c needs to locate a column with the same name in the second physical table, Fact-Orders, or one of its' parent tables. If the table extract constructing transformation 112c can locate one such column, then it can consider the keys matching with respect to this key segment. If not, then the table extract constructing transformation 112c can deduce that the Fact-Orders table is an aggregation of the Order Details table with respect to this key segment. Turning to the sample database, Order # is seen not a column of the Fact-Orders table or any of its parent tables. The same search for Order Line # will also fail. The table extract constructing transformation 112c now locate the Received Date column in Order Details, or one of its parent tables. The table extract constructing transformation 112c finds such a column in the Orders table. It therefore declares that Order Details and Fact-Orders match with respect to this key. In summary, the pair of the tables has a number of key segments which allow the table extract constructing transformation 112c to declare that Fact-Orders is an aggregation of Order Details. Since there are no keys that declare that Order Details is an aggregation of Fact-Orders, the table extract constructing transformation 112c declares that Fact-Orders is an aggregation of Order Details.

The next two physical tables to be compared are Order Details and Inventory as shown in FIG. 14. The table extract constructing transformation 112c begins by attempting to find a column named Customer # in Inventory, or one of its' parents. This search fails, so the table extract constructing transformation 112c deduces that Inventory is a subset of Order Details with respect to this key segment. The next search attempts to locate a column named Date in Order Details. This search fails, so the table extract constructing transformation 112c deduces that Order Details is a subset of Inventory with respect to this key segment. The table extract constructing transformation 112c is now faced with contradictory information, and can therefore deduce that neither table is an aggregate of the other.

The table extract constructing transformation 112c continues the comparisons. At the end of the first pass of the comparisons, the table extract constructing transformation 112c determines the following relationships:

| Table | Relationship |
| --- | --- |
| Order Details | Base Table |
| Fact-Orders | Aggregate of Order Details |
| Inventory | |
| Fact-Inventory | |
| Orders by Received Date, Office | Aggregate of Order Details |
| Inventory by Date, Item, Region | |
| Orders by Received Date, Item, Customer | Aggregate of Order Details |

-continued

| Table | Relationship |
|---|---|
| Orders by Received Date, Brand, Line and Item | Aggregate of Order Details |
| Orders by Received Date, Sales Region, Customer | Aggregate of Order Details |

The table extract constructing transformation 112c can deduce that Inventory is a base table since it is not an aggregate of any other table. For the second pass, the table extract constructing transformation 112c only needs to examine those tables that have not been identified as either base tables or aggregates. The second pass completes the tables as follows:

| Table | Relationship |
|---|---|
| Order Details | Base Table |
| Fact-Orders | Aggregate of Order Details |
| Inventory | Base Table |
| Fact-Inventory | Aggregate of Inventory |
| Orders by Received Date, Office | Aggregate of Order Details |
| Inventory by Date, Item, Region | Aggregate of Inventory |
| Orders by Received Date, Item, Customer | Aggregate of Order Details |
| Orders by Received Date, Brand, Line and Item | Aggregate of Order Details |
| Orders by Received Date, Sales Region, Customer | Aggregate of Order Details |

The table extract constructing transformation 112c can deduce that Order Details is a base table since it is not an aggregate of any other table.

As the table extract constructing transformation 112c performs each pass, it remembers two pieces of information: (a) the table that is the current base table candidate; and (b) the list of tables that are aggregates of the current base table candidate.

Each time an aggregate relationship is determined between two tables, the current base table is adjusted appropriately. The table extract constructing transformation 112c can use the transitivity of the aggregation relationship to imply that if table A is an aggregate of table B and table B is an aggregate of table C, then table A is an aggregate of table C.

The table extract constructing transformation 112c will be completed as follows. Now that the table extract constructing transformation 112c has determined which leaf tables are base tables, it can now turn its attention to the remaining tables in the data source 100. The next phase of the table extract constructing transformation 112c begins by marking each table that is reachable from a base table via a {0,1}:1-{0,1}:N join relationship, traced from the N side to the 1 side, or a {0,1}:1-{0,1}:1 join relationship. This phase results in the following additional relationships:

| Table | Relationship |
|---|---|
| Order Details | Base Table |
| Fact-Orders | Aggregate of Order Details |
| Inventory | Base Table |
| Fact-Inventory | Aggregate of Inventory |
| Orders by Received Date, Office | Aggregate of Order Details |
| Inventory by Date, Item, Region | Aggregate of Inventory |
| Orders by Received Date, Item, Customer | Aggregate of Order Details |

-continued

| Table | Relationship |
|---|---|
| Orders by Received Date, Brand, Line and Item | Aggregate of Order Details |
| Orders by Received Date, Sales Region, Customer | Aggregate of Order Details |
| Orders | Base |
| Dim-Locations | |
| Offices | Base |
| Warehouses | Base |
| Cities | Base |
| SKU Items | Base |
| Dim-Products | |
| Items | Base |
| States | Base |
| Customer Sites | Base |
| Regions | Base |
| Dim-Customers | |
| Brands | Base |
| Countries | Base |
| Customers | Base |
| Lines | Base |
| Sales Regions | Base |
| Sales Rep Pictures | Base |
| Sales Reps | Base |
| Dim-Sales Reps | |
| Dim-Date | |

The table extract constructing transformation 112c still has not determined the status for the some tables, e.g., Dim-Locations. In this case, those tables are all dimension tables. A dimension table is one of a set of companion tables to a fact table. A fact table is the primary table in a dimensional model that is meant to contain measurements of the business.

The next step in the table extract constructing transformation 112c is the construction of the extract objects for those tables that are identified as aggregates. In order to perform this activity, the table extract constructing transformation 112c determines the smallest set of base tables that can provide the required key segments and columns. To do this, the table extract constructing transformation 112c uses the extended record identifier segment grid that was constructed in the first phase of the table extract constructing transformation 112c.

As an example, the aggregate table Inventory by Date, Item and Region are used. FIG. 15 shows the grid with the cells of interest highlighted. The only tables of interest in this phase are base tables; therefore, some tables that have matching key segments are not of interest.

Once all of the tables are marked, the table extract constructing transformation 112c can proceed with matching non-key columns of the aggregate table to non-key aggregates in the highlighted base tables. If a matching column is found, then the table is declared to be required. In this case, the only columns are from the Inventory table.

Once all of the columns have been matched, the table extract constructing transformation 112c can turn its attention to the key segments. The first step is to determine which key segments are not provided by the required tables identified above. The remaining highlighted tables can be sorted based on the number of unmatched key columns that the table could provide if added to the query. The unmatched keys in this example are Country #, Region #, and Item #. The tables Cities and Regions each provide two key segments; Countries, Inventory and Items provide one key segment each.

Processing begins with the tables that have the highest number of matches, in this case, Cities and Regions. Since the key segments provided by these tables overlap, some additional analysis be performed with these two tables. The table extract constructing transformation 112c picks the table that is the closest to the base table (Inventory). In this case, that table is Cities. Once Cities has been added to the query, the only key segment that is unmatched is Item #, which is only provided by Items.

Once the queries for all aggregate tables have been determined, the table extract constructing transformation 112c can turn to the tables that have not yet been assigned a status (in this example, the dimension tables). The same table extract constructing transformation 112c can be used for each of these tables. If the table extract constructing transformation 112c fails to determine a query for the table, the table is deemed to be a base table. In this example, the dimension table Dim-Date is declared to be a base table since a query which provides all of the required columns cannot be constructed from the set of base tables.

Thus, the alternate first step of the table extract constructing transformation 112c is completed.

Data Access Cube Constructing Transformation 112d

The data access layer 102 may contain one or more logical cube. A logical cube is a logical definition of a multidimensional space that may be represented in any number of physical storage formats, including multiple databases The data access cube constructing transformation 112d constructs a set of data access cubes based on the logical cubes in the data access layer 102. The data access cube constructing transformation 112d constructs data access cubes to instantiate the multidimensional space defined by the logical cubes.

The following shows an example of the operation of the data access cube constructing transformation 112d:
1. For each logical cube:
   a) Construct physical cube.
   b) For each dimension in the cube:
      i) Add the "All" view of the dimension to the physical cube.

Business Model Transformations 114

As described above, the business model transformations 114 extract the data access layer objects from the data access layer 102 and transform them to construct the business layer 104, as shown in FIG. 4A.

As shown in FIG. 4B, the business model transformations 114 include a basic business model constructing transformation 114a, many to many join relationship fixing transformation 114b, entity coalescing transformation 114c, redundant join relationship eliminating transformation 114d, subclass relationship introducing transformation 114e, entity referencing transformation 114f, attribute usage determining transformation 114g; and date usage identifying transformation 114h.

In a simple case, there is a 1:1 mapping between the data access layer 102 and the business layer 104, e.g., for every data access model table in the data access layer 102, there is an entity in the business layer 104; and for every column in the data access layer 102, there is an attribute in the business layer 104. More complicated business model transformations 114 will manipulate the business layer 104 and make it simpler and/or better.

Basic Business Model Constructing Transformation 114a

The basic business model constructing transformation 114a constructs a business model that is similar to the existing data access layer 102.

The basic business model constructing transformation 114a uses eligible or acceptable objects in the data access layer 102. A table or view is eligible if it is not associated with a table extract and has not been transformed. A stored procedure result set call signature is eligible if it has not been transformed. A join is eligible if it has not been transformed, is not associated with a table associated with a table extract, and both tables have been transformed. A synonym is eligible if the referenced object has been processed by this transformation and the synonym has not been processed. A synonym for a stored procedure is eligible only if the stored procedure has a single result set call signature.

Figure 17:
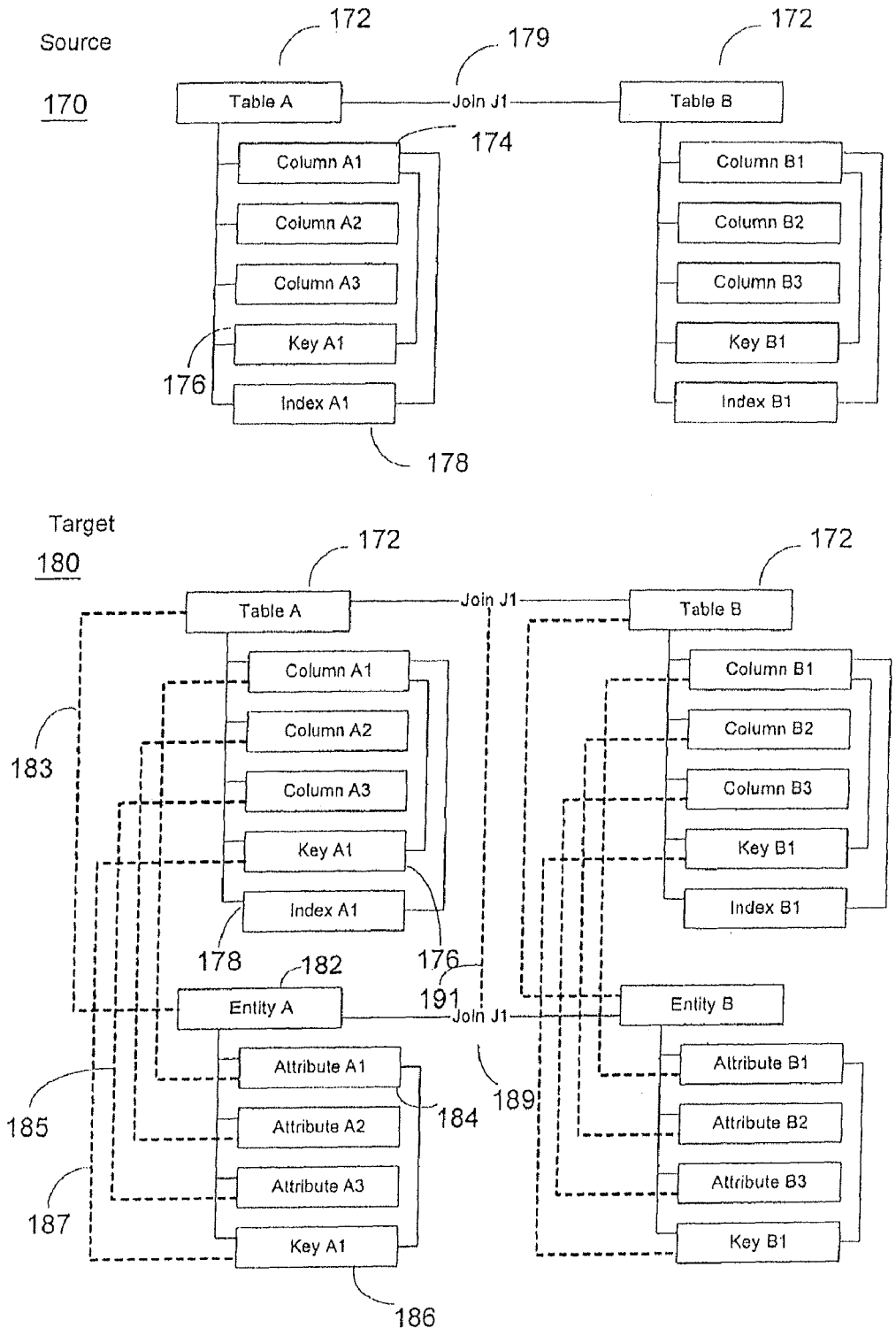
FIG. 17 is a diagram showing examples of source and target of a transformation.

FIG. 17 shows an example of a source data access model 170. The basic business model constructing transformation 114a constructs a target business model 180 from the source data access model 170. The source data access model 170 has two data access model tables 172. The data access model tables 172 have columns 174, keys 176 and indexes 178. The tables 172 have a data access join 179.

The basic business model constructing transformation 114a builds an entity 182 in the business model 180 for each acceptable data access model table 172 in the data access model 170, and adds the relationship 183 between the table 172 and the entity 183 to the business model 180. For each entity 182 built, the basic business model constructing transformation 114a builds an attribute 184 in the entity 182 for each column 174 of the data access model table 172, and adds the relationship 185 between the column 174 and the attribute 184 to the entity 182. The basic business model constructing transformation 114a also builds a key 186 in the entity 182 for each data access key 176 in the data access model table 172, and adds the relationship 187 between the key 186 in the business layer 104 and the data access key 176 to the entity 182. When the key 186 is built in the business layer 104, the basic business model constructing transformation 114a adds attribute to the key 186 for each column in the data access key 176 if the column has been transformed and the attribute is found but not in the key 176.

Similarly, the basic business model constructing transformation 114a builds an entity with columns, attributes and relationship for each non-prohibited view, for each non-prohibited file and for each non-prohibited stored procedure result set call signature. For each non-prohibited synonym, the basic business model constructing transformation 114a builds an entity and marks it as a subtype of an entity corresponding to the object referenced by the synonym. It also maps a business join in the business model 180 for each join 179 in the data access model 170 and constructs a new business join 189. The expression is copied from the join 179 in the data access model 170 and is modified to refer to corresponding elements from the business model 180, i.e. an expression referring to a column is replaced with an expression referring to an attribute. The choice of attribute is determined by examining the transformation relationship information stored in the model.

The following shows an example of the operation of the basic business model constructing transformation 114a:
1. For each non-prohibited table:
   a) If table has already been transformed:
      i) Attempt to locate target entity.
   b) Else
      i) Build entity.
      ii) Mark table as transformed.
      iii) Add relationship between table and entity.
   c) If entity built, or found:
      i) For each column in table:
         a) If column has not been transformed yet:
            (1) Build attribute
            (2) Mark column as transformed
            (3) Add relationship between column and attribute ii) For each physical key in table:
  a) If physical key has already been transformed:
    (1) Attempt to locate key
  b) Else
    (1) Build key
    (2) Mark physical key as transformed
    (3) Add relationship between physical key and key
  c) If key built or found:
    (1) For each column in physical key:
      (a) If column has been transformed:
        (i) Attempt to locate attribute:
        (ii) If attribute found and attribute not in key:
          a) Add attribute to key
2. For each non-prohibited view:
  a) If view has already been transformed:
    i) Attempt to locate target entity.
  b) Else
    i) Build entity.
    ii) Mark view as transformed.
    iii) Add relationship between view and entity.
  c) If entity built, or found:
    i) For each column in view:
      a) If column has not been transformed yet:
        (1) Build attribute
        (2) Mark column as transformed
        (3) Add relationship between column and attribute
3. For each non-prohibited file:
  a) If file has already been transformed:
    i) Attempt to locate target entity.
  b) Else
    i) Build entity.
    ii) Mark file as transformed.
    iii) Add relationship between file and entity.
  c) If entity built, or found:
    i) For each column in file:
      a) If column has not been transformed yet:
        (1) Build attribute
        (2) Mark column as transformed
        (3) Add relationship between column and attribute
4. For each non-prohibited stored procedure result set call signature:
  a) If signature has already been transformed:
    i) Attempt to locate target entity.
  b) Else
    i) Build entity.
    ii) Mark signature as transformed.
    iii) Add relationship between signature and entity.
  c) If entity built, or found:
    i) For each column in signature:
      a) If column has not been transformed yet:
        (1) Build attribute
        (2) Mark column as transformed
        (3) Add relationship between column and attribute
5. For each non-prohibited and non-processed synonym:
  a) Build entity.
  b) Mark synonym as transformed.
  c) Add relationship between synonym and entity.
  d) Make entity a subtype of entity corresponding to object referenced by synonym. (If the synonym refers to a stored procedure, use the one and only result set call signature of the stored procedure instead.)
6. For each non-prohibited and non-processed join:
  a) Map join expression.
  b) If either cardinality is 0:1 replace with 1:1.
  c) If either cardinality is 0:N replace with 1:N.
  d) Construct new join.

If a source object has been marked as transformed, an attempt is made to locate the target if the source object could contain other objects. If there are no target objects, then processing of the source object halts, but no error is written. In this case, the basic business model constructing transformation 114a assumes that the lack of a target object indicates the administrator's desire to avoid transforming the object.

Many to Many Join Relationship Fixing Transformation 114b

The many to many join relationship fixing transformation 114b seeks out entities that exist as an implementation artifact of a many to many relationship. The transformation 114b replaces business joins associated with entities of this type with a single business join. It also marks these entities so that they will not be considered when the package layer 106 is constructed.

The many to many join relationship fixing transformation 114b may be used when the following conditions are met:
1. An entity (artificial) participates in exactly two join relationships with one or two other entities.
2. The cardinalities of the join relationships are 1:1 and {0,1}:N. The N side of each of the join relationships is associated with artificial-entity.
3. Each attribute of artificial-entity participates exactly once in the join conditions of the join relationships.
4. Artificial-entity has a single key that is composed of all attributes of the entity.
5. The artificial entity does not participate in any subtype, containment or reference relationships.

The operation of the many to many join relationship fixing transformation 114b is divided into two sections. The behaviour of the transform 114b varies for those entities that are related to a single business join only.

The first section of the many to many join relationship fixing transformation 114b deletes an entity that is related to two other entities, and creates a new business join between the two other entities.

FIG. 18 shows an example of a source business model 200 in the business layer 104. The source business model 200 has three entities 202 having attributes 204 and keys 206. The three entities 202 are related to each other by business joins 208 and 209. The middle entity C has attributes C.1 and C.2. The attribute C.1 matches attribute A.1 of entity A. The attribute C.2 matches an attribute B.2 of entity B. Accordingly, entity C is an artificial entity related to two other entities A and B. The first section of the many to many join relationship fixing transformation 114b transforms the source business model 200 to a target business model 220 also in the business layer 104.

The first section of the many to many join relationship fixing transformation 114b creates a new business join 222 that represents union of the two existing joins 208 and 209. The transformation 114b then deletes the existing business joins 208 and 209, and deletes the artificial entity C. Thus, the target business model 220 is created. C.1 and C.2 are now column references derived from the deleted attributes C.1 and C.2.

The second section of the many to many join relationship fixing transformation 114b transforms an entity related to one other entity, and creates a new entity that is a subtype of the other entity.

Figure 19:
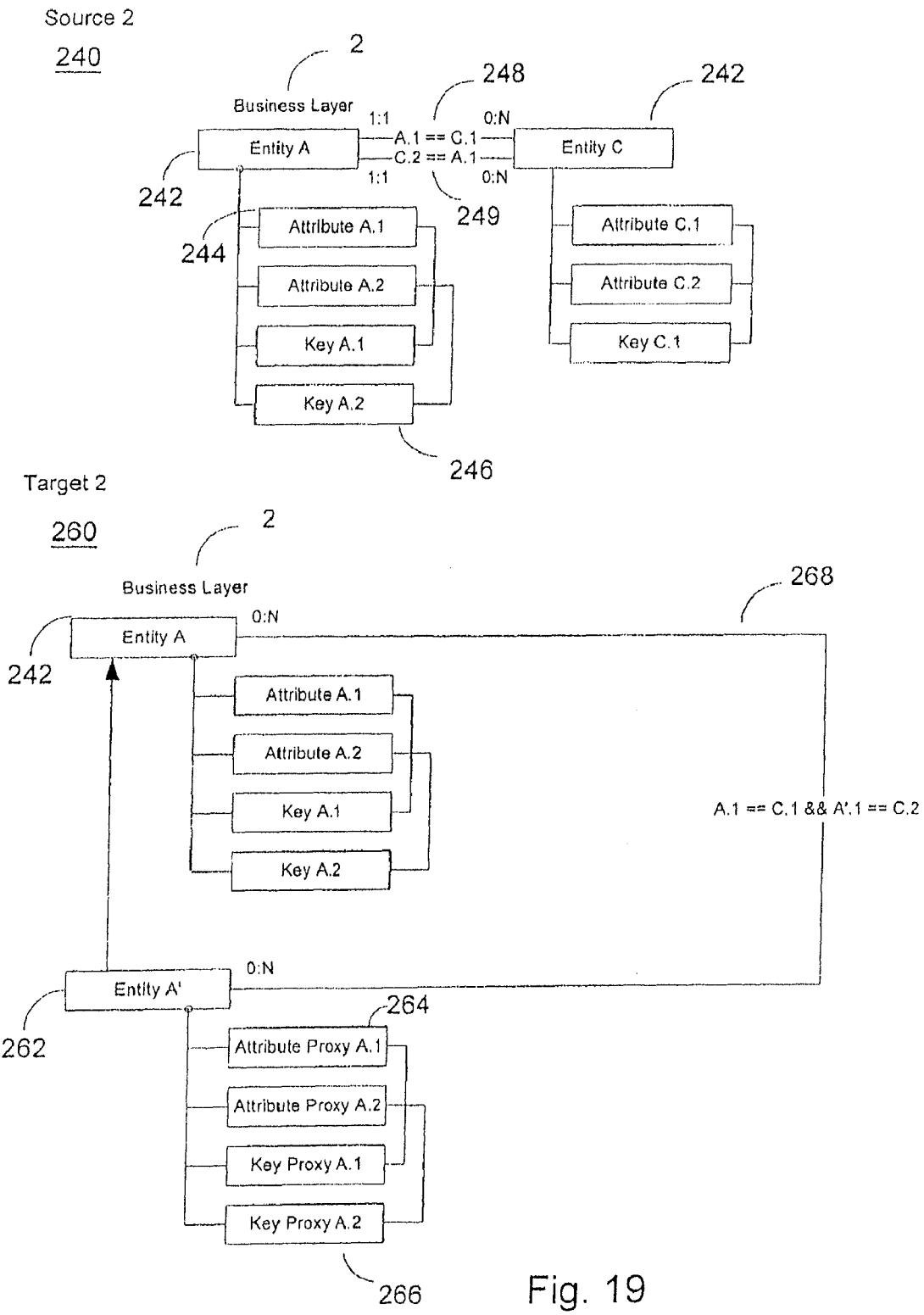
FIG. 19 is a diagram showing examples of source and target of a transformation.

FIG. 19 shows an example of a source business model 240 in the business layer 104. The source business model 240 has two entities 242 having attributes 244 and keys 246. The two entities 242 are related by business joins 248 and 249. Attribute A.1 of entity A matches attribute C.1 of entity C. Attribute C.2 of the entity C matches attribute A.1 of the entity A. Accordingly, entity C is an artificial entity related to one other entity A. The second section of the many to many join relationship fixing transformation 114b transforms the source business model 240 to a target business model 260 also in the business layer 104.

The second section of the many to many join relationship fixing transformation 114b creates a new entity A' 262 that is a subtype of the entity A 242. The transformation 114b also creates a new business join 268 that represents union of the two existing business joins 248 and 249. The new business join 268 associates the entity A 242 and its new subtype entity A' 262. The transformation 114b deletes existing joins 248 and 249, and also deletes the artificial entity C. Thus, the target business model 260 is created. C.1 and C.2 are now column references derived from the deleted attributes C.1 and C.2. The subtype entity A' 262 has attribute proxies 264 and key proxies 266.

The status flag usage is as follows:

| Object Class | Prohibit | Processed |
|---|---|---|
| Entity | Do not process the instance. | NA |
| Business Join | Do not process the instance. | NA |

Entity Coalescing Transformation 114c

The entity coalescing transformation 114c seeks out entities that are related via a 1:1 join relationship, and coalesces these entities into a single entity. The new entity is the union of the entities participating in the join relationship.

The entity coalescing transformation 114c may be used when the following conditions are met:
1. Two entities (e.g., left and right entities) are related by a single join that has cardinalities 1:1 and 1:1. The join condition consists of a number of equality clauses combined using the logical operator AND. No attribute can appear more than once in the join clause. The join is not marked as processed by this transformation.
2. The entities cannot participate in any subtype or containment relationships.
3. Any key contained within the left-entity that references any left-attribute in the join condition references all left-attributes in the join condition.
4. Any key contained within the right-entity that references any right-attribute in the join condition references all right-attributes in the join condition.

Figure 20:
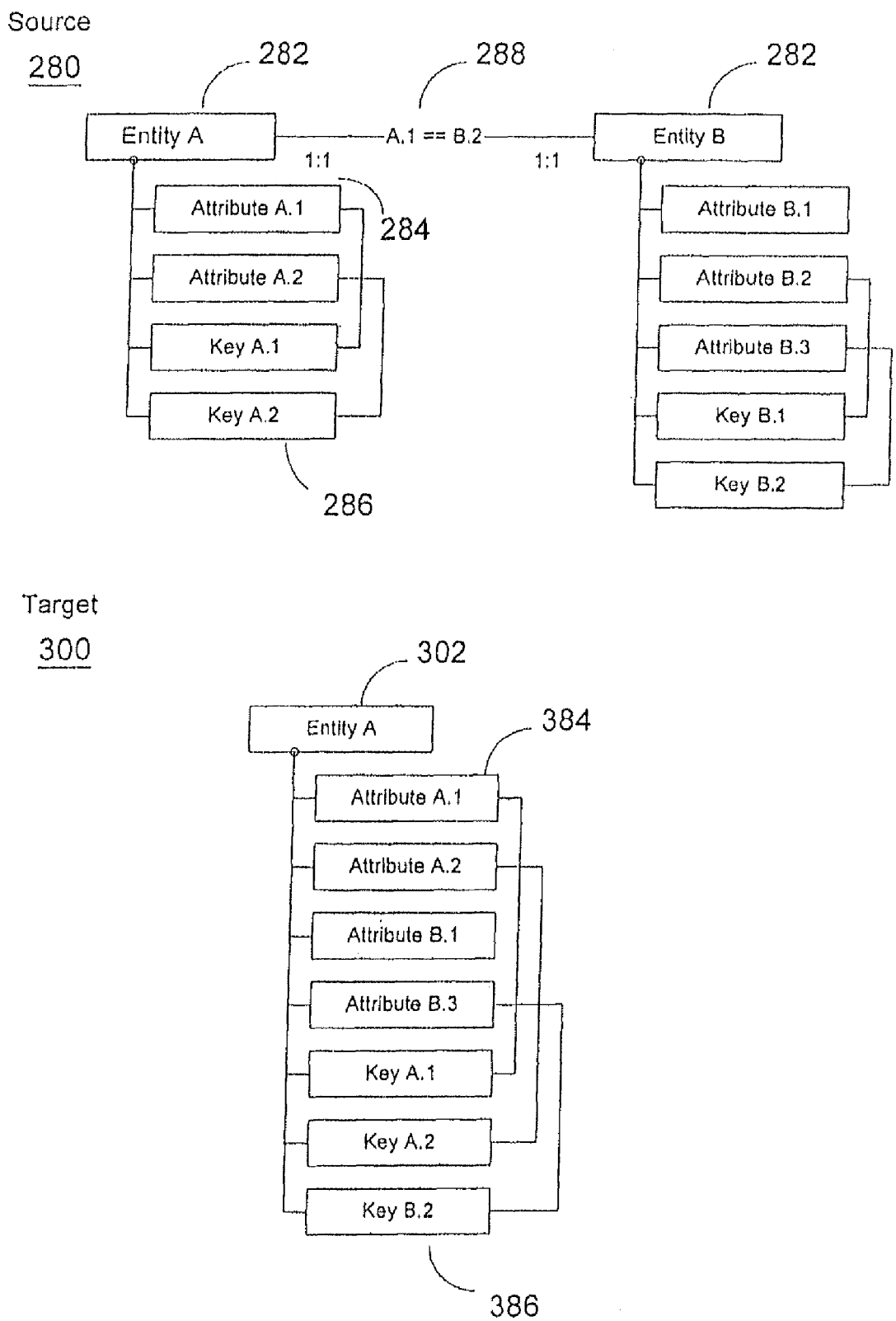
FIG. 20 is a diagram showing examples of source and target of a transformation.

FIG. 20 shows an example of a source business model 280 in the business layer 104. The source business model 280 has two entities 282 having attributes 284 and keys 286. The two entities 282 are related to each other by a business join 288. Attribute A.1 of entity A matches attribute B.2 of entity B. Thus, the entities A and B are related via a 1:1 join relationship 288.

The entity coalescing transformation 114c transforms the source business model 280 to a target business model 300 also in the business layer 104. The entity coalescing transformation 114c coalesces these entities A and B 282 into a single entity 302. The new entity 302 is the union of the entities A and B 282. Key B.1 is removed since its associated attribute B.2 is equivalent to attribute A.1, and is therefore not retained as a key 386 of the new entity 302. Since the attribute B.2 is not retained in the new entity 302, the key B.1 is not retained.

The following shows an example of the operation of the entity coalescing transformation 114c:

1. Scan join clause to construct mapping between left-attributes and right-attributes.
2. Delete right-keys that reference right-attributes in the join clause.
3. Delete right-attributes that occur in the join clause.
4. Move remainder of right-attributes from their presentation folder to left-entity presentation folder.
5. Move remainder of right-attributes and right-keys to left-entity.
6. For each join associated with right-entity (other than join that triggered the transformation):
   a) Build new join between other-entity and left-entity, replacing any right-entity that occurs in attribute map (from step 1) with corresponding left-entity. All other join attributes have the same value.
   b) Delete old join.
7. Delete right-entity.

The processing order is determined by examining all 1:1-1:1 joins and choosing the join that relates the two entities with the fewest number of joins that do not have cardinality 1:1-1:1. The choice of which entity to remove from the model is determined by picking the entity with the fewest number of non 1:1-1:1 joins.

The entity coalescing transformation 114c transforms a set of vertically partitioned tables into a single logical entity.

Redundant Join Relationship Eliminating Transformation 114d

The redundant join relationship eliminating transformation 114d eliminates join relationships that express the transitivity of two or more other join relationships in the business layer 104. That is, when two or more joins have identical start and end points and return the same result set of objects, they are redundant, and the transformation 114d removes the redundancy. Thus, the redundant join relationship eliminating transformation 114d can reduce the number of join strategies that need to be considered during query refinement by the query engine 30.

The redundant join relationship eliminating transformation 114d may be used when the following conditions are met:
1. Two entities (start and end) are related by two join paths that do not share a common join relationship.
2. The first join path consists of a single join relationship.
3. The second join path consists of two or more join relationships.
4. The join relationships all have cardinalities 1:1 and 1:N.
5. The join relationship that forms the first join path has cardinality 1:1 associated with start-entity.
6. The join relationship that forms the second join path has cardinality 1:1 associated with start-entity. The set of join relationships associated with each intermediate-entity in the second join path has a single member with cardinality 1:1 at the intermediate-entity. The other member has cardinality 1:N. (The joins all "point" in the same direction.)
7. Both join paths return the same set of records.
8. All joins are of type association only.

When redundant joins are found, the redundant join relationship eliminating transformation 114d eliminates, a join that passes through the least number of entities.

Figure 21:
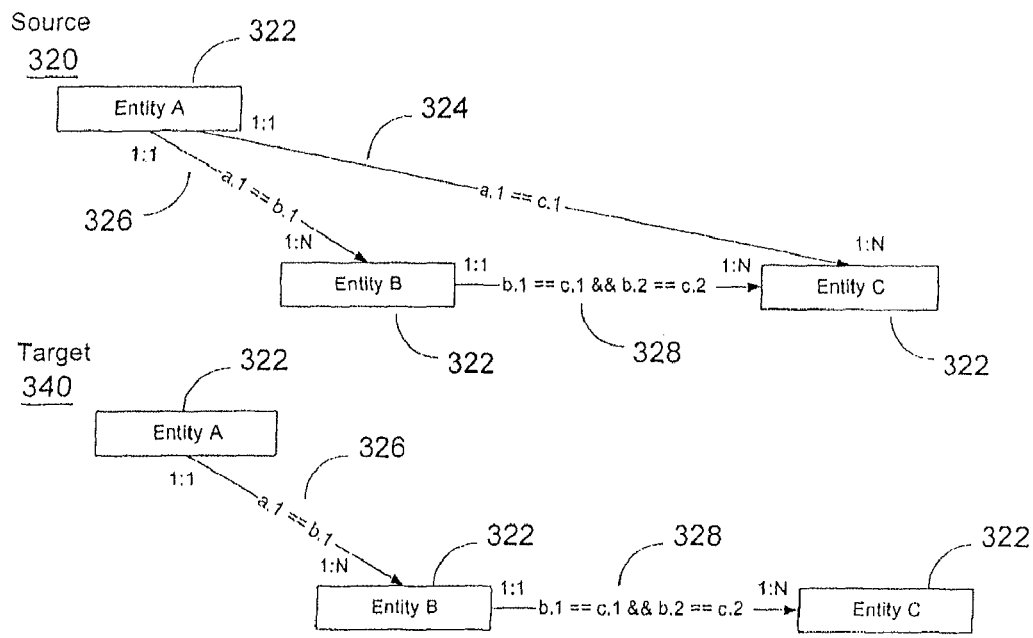
FIG. 21 is a diagram showing examples of source and target of a transformation.

FIG. 21 shows an example of a source 320 of the redundant join relationship eliminating transformation 114d. In the source 320, there are three entities 322, entities A, B and C. Entity A and entity C have redundant join relationships, one through a direct join path 324 and the other through join paths 326 and 328 via entity B. All join relationships 324, 326 and 328 are 1:1-1:N join relationships. The redundant join relationship eliminating transformation 114d deals only 1:1-1:N join relationships.

The redundant join relationship eliminating transformation 114d transforms the source 320 to a target 340. In the target 340, the redundant join path 324 is eliminated, and entity A and entity C have a single join relationship through the join paths 326 and 328 via entity B.

The following shows an example of the operation of the redundant join relationship eliminating transformation 114d:
1. Consider only 1:1-1:N join relationships.
2. Order entities in the business layer 104 using an algorithm to determine strongly connected components. Treat the join relationships as directed edges (from 1:1 end to 1:N end). A directed edge can be traversed in a single direction.
3. Apply a distance to each entity:
   a) For each entity:
      i) distance=distance[entity]+1;
      ii) for each join relationship leaving this entity:
         a) distance[otherEntity]=max(distance[otherEntity], distance)
4. For each entity:
   a) For each join relationship leaving this entity:
      i) If distance[rightEntity]−distance[leftEntity]>1
         a) This join relationship is a candidate for elimination.
         b) Find all alternate join relationship paths from startEntity to endEntity. Note that an alternate path can have no more than distance[rightEntity]−distance[leftEntity] relationships in it.
         c) For all alternate paths:
            (1) If the candidate join relationship is equivalent to the alternate path
               (a) Remove candidate join relationship from model.
               (b) Break. Continue processing at Step 4.

The status flag usage is as follows:

| Object Class | Prohibit | Processed |
| --- | --- | --- |
| Business Join | Do not process the instance. | NA |

Figure 22:
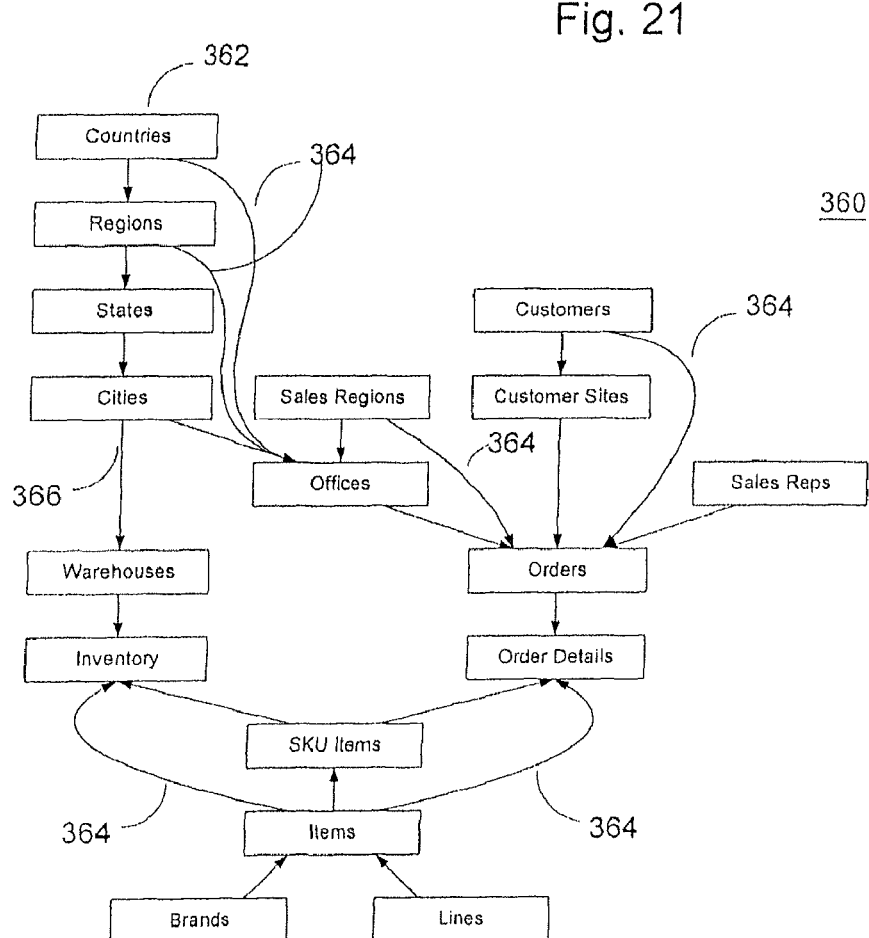
FIG. 22 is a diagram showing an example of a model to which a transformation is applied.

The operation of the redundant join relationship eliminating transformation 114d is further described using an example of a business layer 360 shown in FIG. 22. In FIG. 22, the business layer 360 is illustrated using an entity/relationship diagram or graph. The business layer 360 contains a number of redundant join relationships 364 between some entities 362. These redundant join relationships 364 shown in the curved lines in FIG. 22 are eliminated using the redundant join relationship eliminating transformation 114d.

Figure 23:
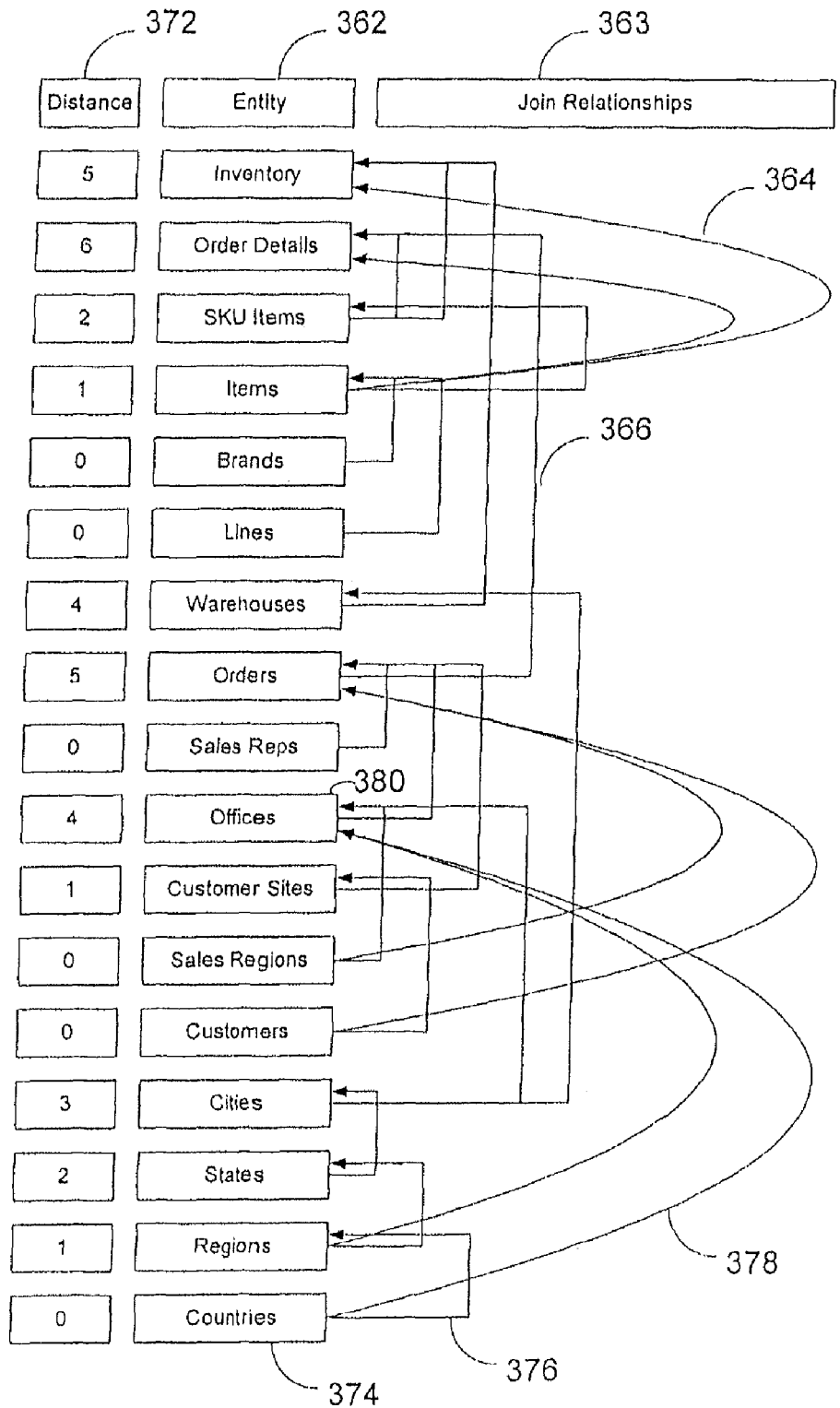
FIG. 23 is a diagram showing an example of a process state.
Figure 24:
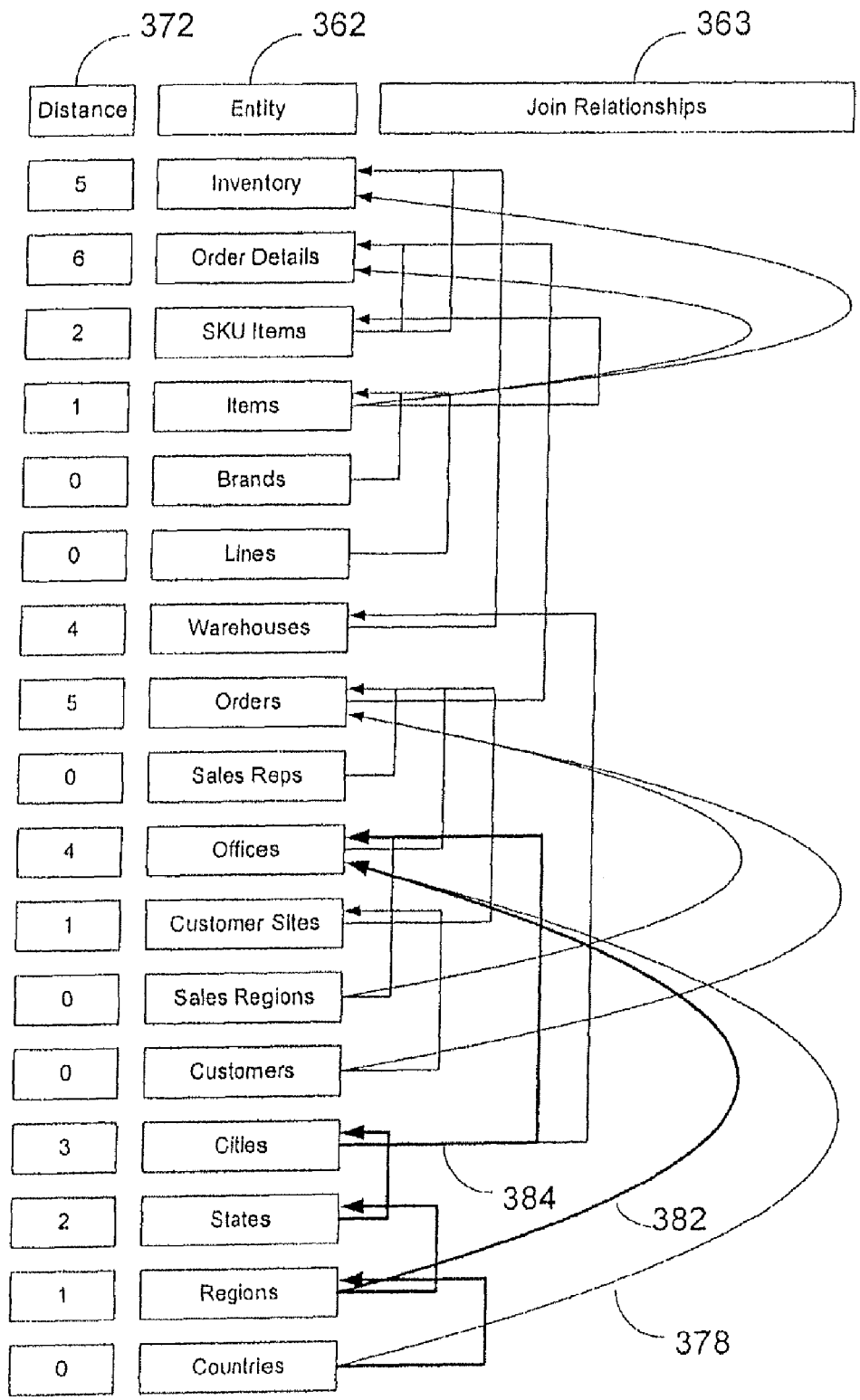
FIG. 24 is a diagram showing an example of a process state.

The operation is described using the graph manipulations referring to FIGS. 22-24.

FIG. 23 shows a graph 370 representing the business model after applying a distance 372 to each entity 362 as described in above step 3 in the algorithm. Consider the processing of step 4 in the algorithm for the first entity "Countries" 374 at the bottom of the graph 370. There are two join relationships 376 and 378 that leave entity "Countries" 374, but only one is a candidate for elimination. The candidate join relationship 378 is represented by the curved line from entity "Countries" 374 to entity "Offices" 380. There are two alternate join paths 382 and 384, as shown in FIG. 24 with thick lines. After analysing the join conditions, the redundant join relationship eliminating transformation 112d determines that the candidate join relationship 378 can be eliminated from the graph 370.

The redundant join relationship eliminating transformation 114d performs the analysis of the join conditions as follows.

Once an alternate path 382 or 384 has been found, the redundant join relationship eliminating transformation 112d compares the path of the candidate join relationship 378 to the alternate path 382 or 384 to determine if they are equivalent.

For example, as shown in FIG. 25, an alternate path 392 involves entities A, B, C, D, and E, and join relationships AB, BC, CD, DE. The candidate path or original path 390 involves entities A, E, and join relationship AE.

The alternate expression describing the alternate relationship consists of the expressions from each of the join relationships AB, BC, CD, DE in addition to the expressions of any filters involving the intermediate entities B, C and D. The expressions from each of the join relationship and the filters from the intermediate entities are all combined using the And operator to form the alternate expression.

The original expression describing the candidate relationship consists of the expression from the join relationship AE.

Using the example expressions shown in FIG. 25, the alternate expression is as follows:

(A.1==B.1)&&(B.1==C.1&&B.2==C.2)&&
(C.1==D.1&&C.2==D.2&&C.3==D.3)&&
(D.1==E.1&&D.2==E.2
&&D.3==E.3&&D.4==E.4)

The redundant join relationship eliminating transformation 114d compares the alternate expression to the original expression as follows:

A.1==E.1

During processing, the redundant join relationship eliminating transformation 114d constructs a map which records equality specifications in the joins 390 and 392. The expressions are then modified using these maps before comparing them. The comparison function simplifies both of these expressions to true, so the join paths 390 and 392 are equivalent. Thus, the redundant join relationship eliminating transformation 114d verifies that the join paths 390 and 392 are equivalent and that the join path 390 is redundant.

Subclass Relationship Introducing Transformation 114e

The subclass relationship introducing transformation 114e eliminates some join ambiguities by introducing new entities and subclass relationships into the business layer 104.

The subclass relationship introducing transformation 114e may be used when the following conditions are met:
1. Two entities (left and right) are related by two join relationships.
2. The cardinalities of the join relationships are identical.
3. The cardinalities of the join relationships associated with each entity are identical.
4. The related entities do not participate in any subtype, containment or reference relationships.
5. The join condition of the join relationships matches. Details of the matching criteria are described below.

FIG. 26 shows an example of a source 400 of the subclass relationship introducing transformation 114e. In the source 400, there are two entities, entity "Course Section" 402 on the left side and entity "Staff" 403 on the right side. The two entities 402, 403 are related by two join relationships 404 and 406. The cardinalities of the join relationships 404 and 406 are both {1:1}-{0:N} and identical. The related entities 402, 403 do not participate in any subtype, containment or reference relationships with other entities.

The subclass relationship introducing transformation 114*e* transforms the source 400 to a target 410. In the target 410, subtype entities 412 and 414 are constructed and subclass relationships 413 and 415 are introduced to the "Staff" entity 403.

The following shows an example of the operation of the subclass relationship introducing transformation 114*e*:
1. Create two new entities (derived1, derived2) based on an entity whose attributes were not substituted (constant) in the matching join conditions (the base entity). If attributes from neither entity are substituted, then create four new entities (two for each base entity).
2. Create subclass relationships.
3. Create new join relationships between other entity and derived entities (or solely from the derived entities). If the join cardinality at either end of the relationship was 0:N, change the cardinality to 1:N (0:1 is changed to 1:1).
4. Add a filter condition to each derived entity. The condition is identical to the join condition of the join constructed in the previous step.
5. Delete old join relationships.
6. Fix up presentation layer by removing folder references that were constructed based on the old joins.

The subclasses in this example represent roles of the original entity 403. A staff member in the entity "Staff" 403 can act as an Instructor or as a Tutor or as a generic staff member. The filter conditions that are assigned to the new entities 412, 414 define the roles. By assigning a filter condition to each derived entity 412, 414, the subclass relationship introducing transformation 114*e* causes the join relationship 413, 415 to be used in queries. Since the join relationships 413, 415 always specify an inner join, the subclass relationship introducing transformation 114*e* restricts the set of records retrieved to suit the role.

In step 1 of the operation, the subclass relationship introducing transformation 114*e* considers two join condition expressions to be matched when the only logical change in the expression is the substitution of attributes of a single entity with other attributes of the same entity. For example, simple rearrangement of expressions such as "a+b" to "b+a" is not considered to be a significant enough change to prevent these expressions from matching. A change such as "(a+b)*c" to "a+(b*c)" does prevent the expressions from matching. The subclass relationship introducing transformation 114*e* may use some form of tree comparison to implement the matching logic.

The following are some examples of matching and non-matching expressions. A and B represents entities and A.1 represents attribute 1 of entity A.

(A.1==B.1) and (B.1==A.2)

These expressions match because the only difference is that A.1 has been replaced with A.2.

(A.1==B.1&&A.2==B.2) and
(A3==B.2&&A.4==B.1)

These expressions match because the only difference is that A.1 has been replaced with A.4 and A.2 has been replaced with A.3.

(A.1==B.1&& A.2==B.2) and
(A.1==B.3&&A.3==B.2)

These expressions do not match because the differences A.2 has been replaced with A.3 and B.1 has been replaced with B.3. Since attributes from both entities have been substituted, these expressions do not match.

(A.1==B.1&&A.1==B.2) and (A.2==B.1 and
A.3==B.2)

These expressions do not match because A.1 has been replaced by both A.2 and A.3.

Entity Referencing Transformation 114*f*

The entity referencing transformation 114*f* eliminates some join ambiguities by changing the association type of business joins to reference type.

The entity referencing transformation 114*f* may be used when the following conditions are met:
1. An entity, which is a reference entity, is related to two or more other entities via a {0,1}:1-{0,1}:N join with the {0,1}:1 end associated with the reference entity.
2. Each join references non-key attributes of the non-reference entities.
3. The reference entity cannot participate in any subtype or containment or reference relationships.

Figure 27:
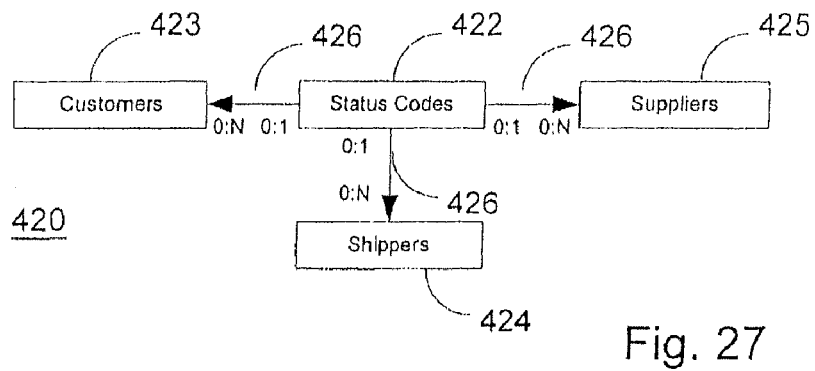
FIG. 27 is a diagram showing an example of relations of objects.

FIG. 27 shows an example of a business layer 420 having a reference entity. The business layer 420 has four entities 422-425. Entity "status Codes" 422 is related to other three entities 423-425 via 0:1-0:N joins 426 with the 0:1 end associated with the entity 422. Accordingly, the entity 422 is a reference entity. The entity referring transformation 114*f* marks the joins 426 as reference relationships on the reference entity side. The reference relationships are represented by arrows from the reference entity 422 in FIG. 27.

The status flag usage is as follows:

| Object Class | Prohibit | Processed |
|---|---|---|
| Entity | Do not process this instance. | Do not process this instance. |
| Business Join | Do not process this instance. | NA |

Introducing the reference relationships into the business layer 104 allows the query engine 30 to avoid joining entities through the reference entity.

For example, an entity "Address" is referenced by both entity "Customers" and "Suppliers". Formulating a report that shows the relationships between customers and shippers with their addresses would prove very difficult without the ability to define an alias in the query definition. Without this capability, the query would likely attempt to join the two entities "Customers" and "Suppliers" via the "Address" entity. It is very unlikely that both a Customer and Shipper would share the same address. Accordingly, by introducing the reference relationships into the business layer 104 allows the query engine refiner to avoid joining the entities "Customers" and "Suppliers" through the "Address" entity. In this case, a user or client application would need to define a query unit for each instance of the "Address" entity required in the query.

Attribute Usage Determining Transformation 114*g*

The attribute usage determining transformation 114*g* determines the usage of an attribute based on how it is used by other model objects.

The following shows an example of the operation of the attribute usage determining transformation 114*g*:

I. For each non-prohibited entity:
  A. For each key
    1. Construct list of attributes (not attribute proxies) as descriptive list
  B. For each join related to this entity
    1. Extract attributes (not attribute proxies) of this entity, add to descriptive list
  C. Add attributes (not attribute proxies) of entity that are not in descriptive list to value list
  D. For each attribute in descriptive list
    1. If attribute usage is unknown && not prohibited && not marked as transformed
      a) set usage to descriptive
      b) mark attribute as transformed
  E. For each attribute in value list
    1. If attribute usage is unknown && not prohibited && not marked as transformed
      a) If attribute is numeric
        (1) set usage to performance indicator
        (2) mark attribute as transformed The status flag usage is as follows:

| Object Class | Prohibit | Processed |
| --- | --- | --- |
| Entity | Do not process the instance, or contained attributes. | |
| Attribute | Do not process the instance. | Do not process the instance. |

Date Usage Identifying Transformation 114*h*

The date usage identifying transformation 114*h* examines model attributes to determine where dates are used in the model. Identifying date sensitive information can assist in the construction of dimensions in subsequent transformations.

The date usage identifying transformation 114*h* builds a date table in the data access layer 102, in addition to the required business model objects to reflect the physical table in the data source 100. The date usage identifying transformation 114*h* is unique in that the database administrator will be required to make changes to the physical database or other data source 100 to use the metadata model 15 to perform queries after the transformation 114*h* has completed. The database administrator will also be required to populate the date table. For these reasons, the date usage identifying transformation 114*h* is always considered as optional.

Figure 28:
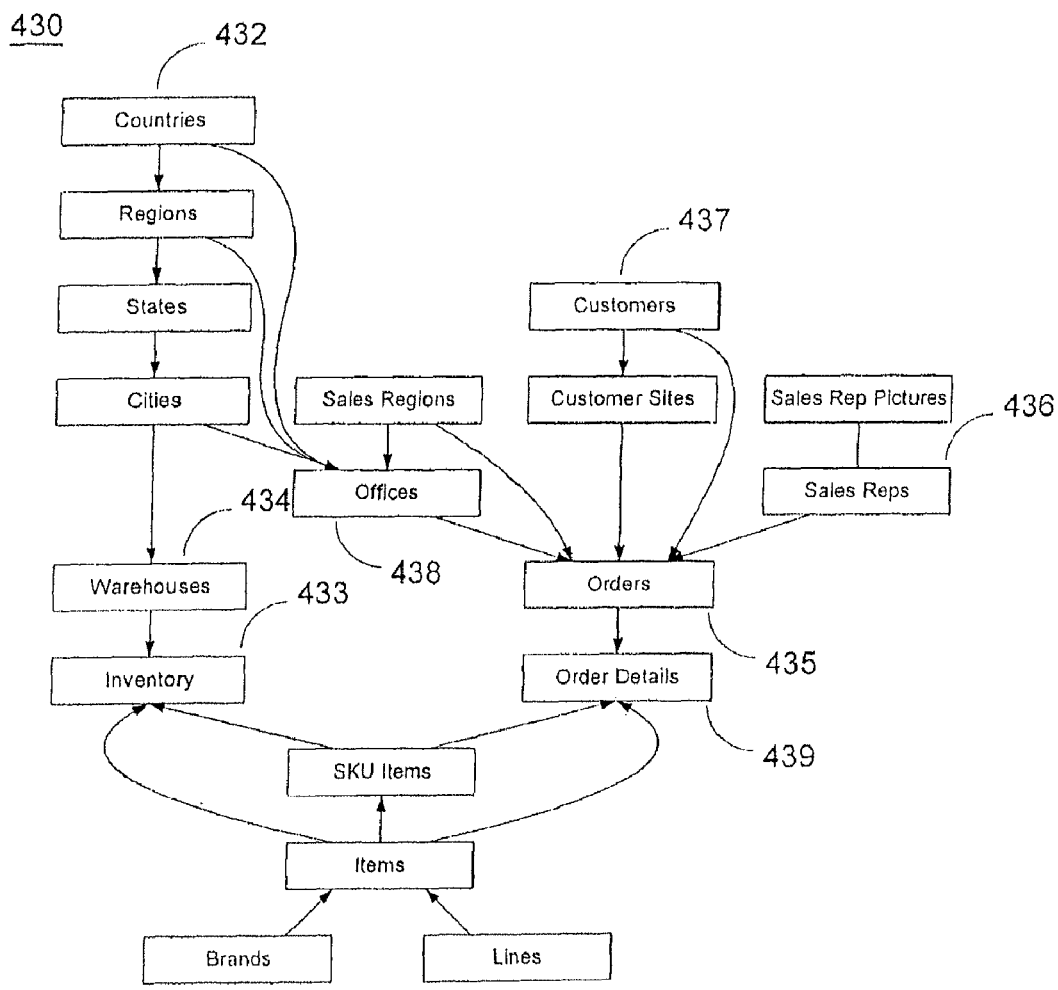
FIG. 28 is a diagram showing an example of source of a transformation.

FIG. 28 shows an example of a source business layer 43 of the date usage identifying transformation 114*h*. In the source business layer 430, there are some entities 432. Among the entities 432, date attributes exist within only some entities, e.g., Inventory 433, Warehouses 434, Orders 435, Sales Reps 436, Customers 437, Offices 438. However, the entity, Order Details 429 does not have any date attribute.

Figure 29:
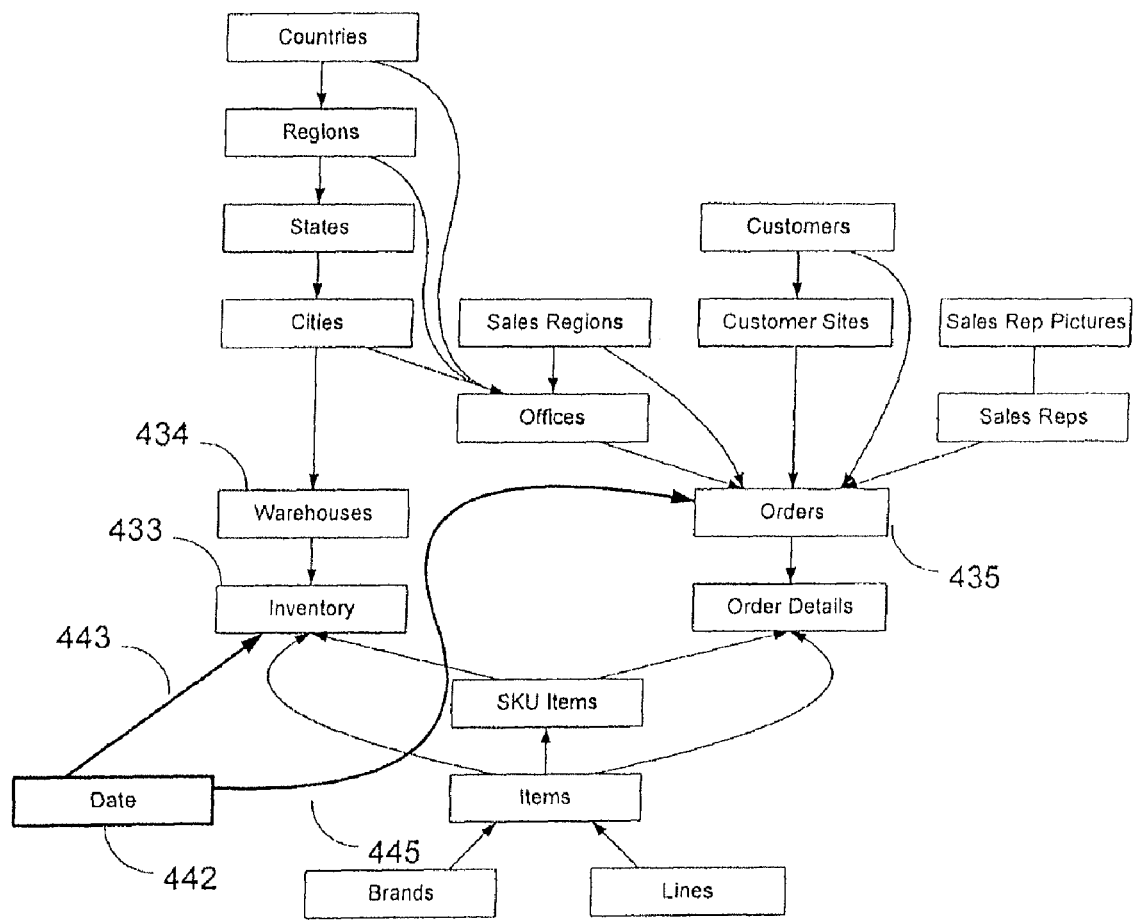
FIG. 29 is a diagram showing an example of target of the transformation.

The date usage identifying transformation 114*h* transforms the source 430 to a target 440 shown in FIG. 29. In this example, the date usage identifying transformation 114*h* creates an entity, Date 442, and its underlying physical objects. It also joins by joins 443, 445 the Date entity 432 to a number of entities, e.g., entities 433 and 435, as shown in bold in FIG. 29. The locations to join to the Date entity 432 is based on the proximity of the date attribute's entity to the "fact" entities, e.g., entities 433 and 435, that participate on the {0,1}:N side of join relationships.

Thus, the date usage identifying transformation 114*h* provides a reasonable set of relationships between the Date entity 442 and other entities 432. The relationships are added in a manner that facilitates the construction of dimensions in later transformations.

The following shows an example of the operation of the date usage identifying transformation 114*h*:
1. Order entities in graph using algorithm to determine Strongly Connected Components. Treat the join relationships as directed edges (from 1:1 end to 1:N end).
2. For each entity (from "deepest" to "shallowest"):
  i) If the entity is not marked and the entity contains a date attribute:
    a) If the transformation has not been run before:
      (1) Create date objects in model.
      (2) Mark model as transformed.
    b) Else
      (1) Locate previously created date entity and attribute.
    c) If date attribute has not been transformed and date entity and attribute exist:
      (1) Create join between the entity's attribute and the date attribute.
    d) Mark all ancestor entities to prevent adding additional joins to Date entity.

Multidimensional Model Transformations 115

The multidimensional model transformations 115 include measure identifying and measure dimension constructing transformation 115*a*, category dimension and level constructing transformation 115*b*, and logical cube constructing transformation 115*c*.

Measure Identifying and Measure Dimension Constructing Transformation 115*a*

The measure identifying and measure dimension constructing transformation 115*a* identifies a reasonable set of measures by analyzing the structure of a source model, e.g., an E/R model, to identify entities that contain measure candidates. An entity contains a measure candidate if all of the considered join relationships terminate at the entity. This transformation 115*a* considers only the join relationships that have cardinalities {0,1}:1-{0,1}:N. A join relationship with these cardinalities can be considered to be directed, beginning at the end with cardinality {0,1}:1 and terminating at the end with cardinality {0,1}:N. The entities suitable for this transformation 115*a* have numeric attributes that do not participate in keys or in any join relationship.

Once the transformation 115*a* discovers a suitable entity, it tests each attribute of the entity to determine if the attribute could be a measure. An acceptable attribute is numeric, and is not a member of a key and is not referenced in any join relationship associated with the entity.

Figure 30:
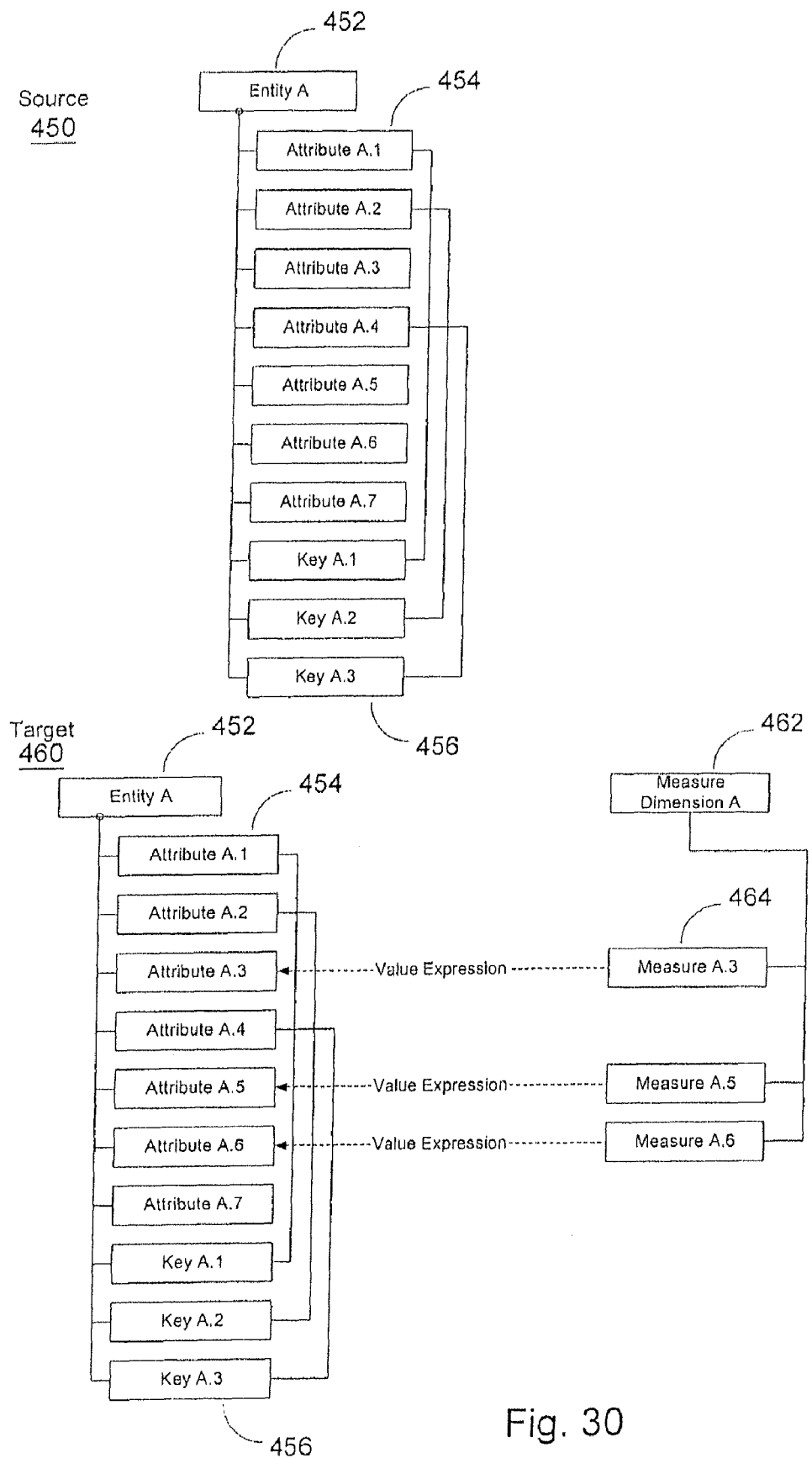
FIG. 30 is a diagram showing examples of source and target of a transformation.

FIG. 30 shows an example of a source 450 of the measure identifying and measure dimension constructing transformation 115*a*. In the source 450, an entity 452 has seven attributes 454 and three keys 456. Attributes A.1, A.2 and A.4 participate in keys A.1, A.2 and A.3, respectively.

The measure identifying and measure dimension constructing transformation 115*a* transforms the source 450 to a target 460. The transformation 115*a* tests each attribute 454 in the entity 452. Attributes A.1, A.2 and A.4 are not suitable to be measures as they participate in keys 456, and attribute A.7 is unacceptable because it is a string. Accordingly, the transformation 115*a* determines attributes A.3, A.5 and A.6 to be measures A.3, A.5 and A.6. Thus, the transformations 115*a* identifies measure dimension 462 having the measures 464.

The measure identifying and measure dimension constructing transformation 115*a* identifies a basic set of measures based on an analysis of the source model. This transformation 115*a* may not identify all of the attributes that could be measures in the model, since only the "fact table" entities are examined for attributes that could be measures.

The following shows an example of the operation of the measure identifying and measure dimension constructing transformation 115a:

1. For each entity:
   a) If all joins with cardinalities {0,1}:1, {0,1}:N terminate at this entity:
      i) If entity has been marked as transformed:
         a) Attempt to locate measure dimension.
      ii) If measure dimension found or entity not marked as transformed:
         a) For each attribute in entity:
            (1) If attribute has not been transformed, not used by any key or join, and is numeric:
               (a) Build measure
               (b) If entity has not been transformed:
                  (i) Build measure dimension
                  (ii) Mark entity as transformed.
                  (iii) Add relationship between attribute and measure.
               (c) Add measure to measure dimension.

Category Dimension and Level Constructing Transformation 115b

The category dimension and level constructing transformation 115b analyzes a source model, e.g., a business layer, and constructs dimensions and levels for the source model. The transformation 115b creates, if necessary, additional Date entities to maintain the consistency of the model.

The category dimension and level constructing transformation 115b may be used when the following conditions are met:
1. The source model contains at least one entity whose associated {0,1}:1-{0,1}:N join relationships terminate at the entity.
2. Entities that are keyed with an attribute of type date only participate on the {0,1}:1 side of all associated join relationships.
3. The category dimension and level constructing transformation 115b has not been run against this model before.

Figure 31:
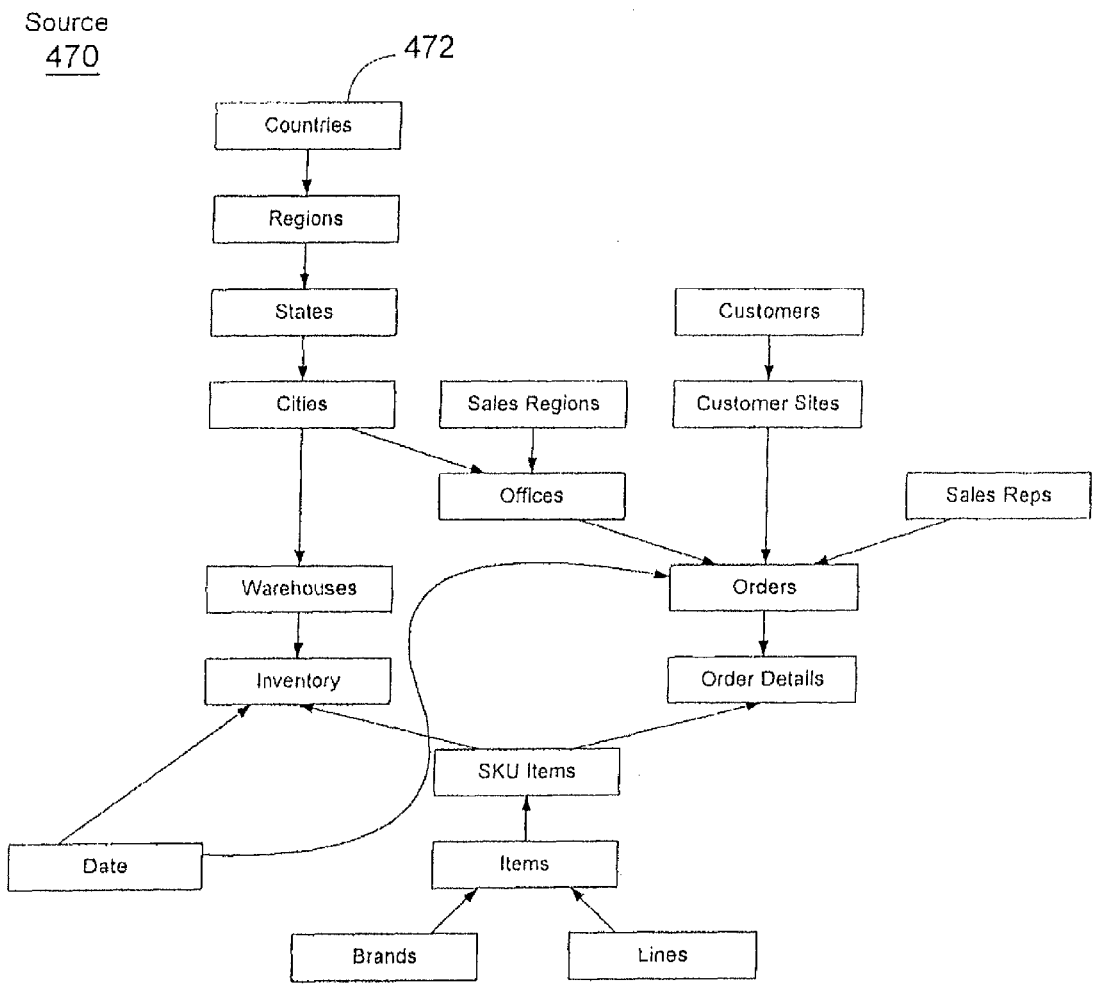
FIG. 31 is a diagram showing an example of source of a transformation.

FIG. 31 shows an example of a source model, an business layer 470, of the category dimension and level constructing transformation 115b. The model 470 has multiple entities 472 joined as shown in FIG. 31. The transformation 115b identifies "fact tables" and dimensions in the model 470.

Figure 32:
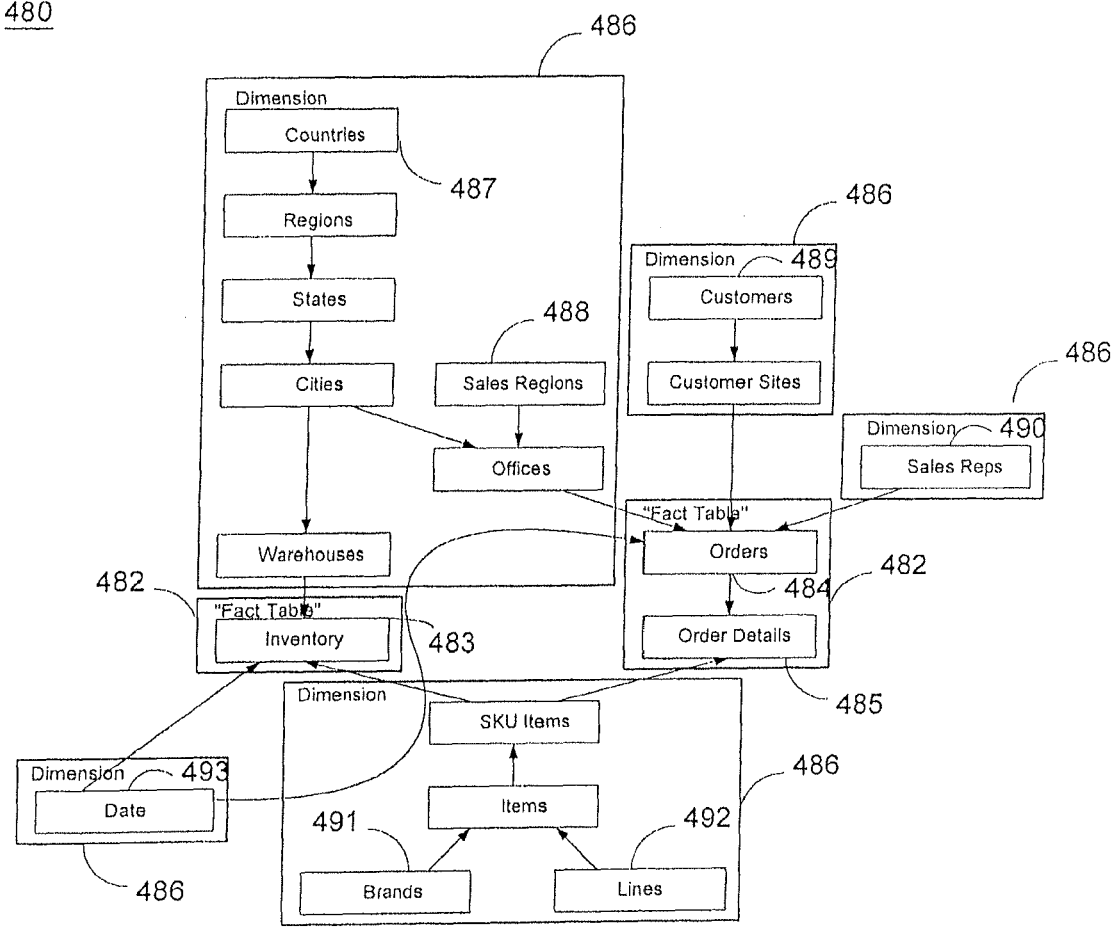
FIG. 32 is a diagram showing an example of target of the transformation.

The category dimension and level constructing transformation 115b transforms the source 470 to a target 480 as shown in FIG. 32. In this example, the transformation 115b identified two logical "fact tables" 482: one containing an entity Inventory 483, and the other containing the pair of entities Orders 484 and Order Details 485. The transformation 115b also identified five dimensions 486: geographical containing entities Countries 487 and Sales Regions 488, customers containing an entity Customers 489, sales representatives containing an entity Sales Reps 490, products containing entities Brands 491 and Lines 492, and time containing an entity Date 493.

An example of the operation of the category dimension and level constructing transformation 115b is described referring to FIGS. 33-39. The transformation 115b relies rather heavily on recursion. FIGS. 33-39 illustrates the operation progress on the sample model 470 shown in FIG. 31. The operation of the transformation 115b has five phases.

Figure 33:
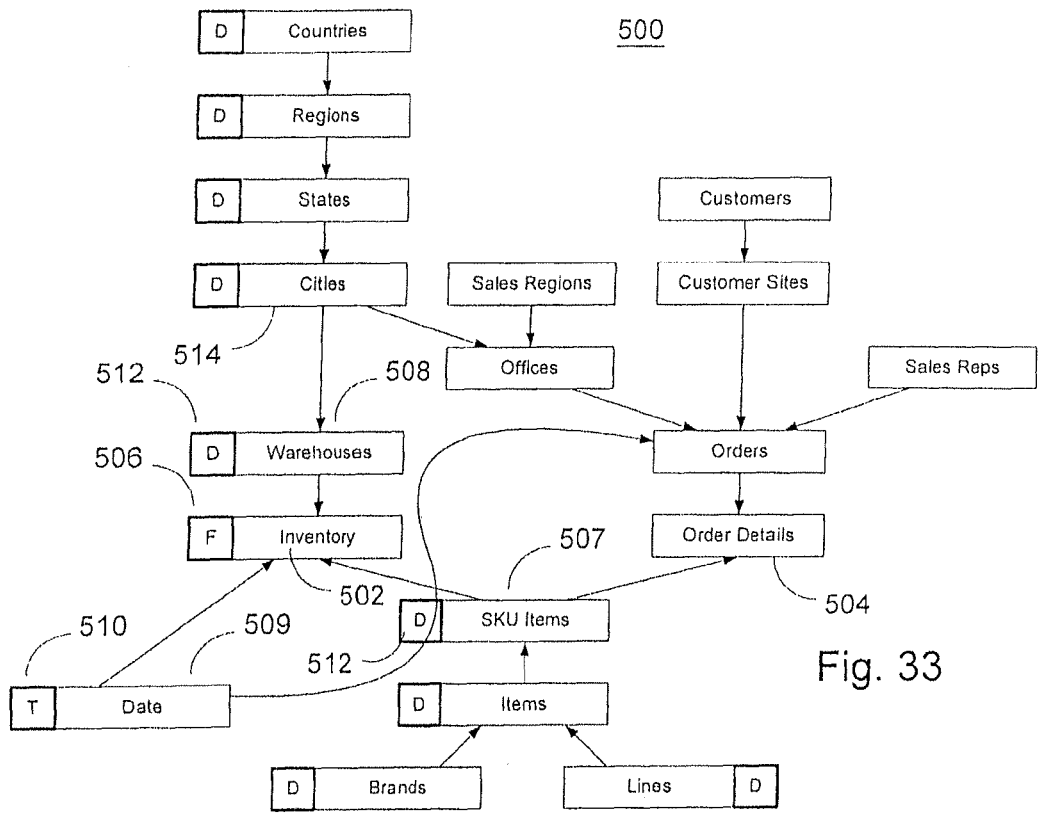
FIG. 33 is a diagram showing an example of a step of a transformation.

FIG. 33 shows a graph 500 representing the sample model 470. In FIG. 33, F indicates a fact entity, D indicates a dimension entity, and T indicates a time entity. The first phase of the category dimension and level constructing transformation 115b is to determine which entities are fact entities and which entities are dimension entities. The transformation 115b begins by processing all entities that have join relationships with cardinality {0,1}:1-{0,1}:N all terminate at the entity. For the sample model 500, the entities that satisfy this criterion are Inventory 502 and Order Details 504.

Consider the Inventory 502 node. The category dimension and level constructing transformation 115b marks this entity 502 as a fact entity 506. It then processes all entities 507-509 that are associated with the fact entity 506 via {0,1}:1-{0,1}:N join relationships in a recursive fashion. If the entity 507-509 has not been processed yet, the transformation 115b processes it. If the entity 509 has a key of type date, the transformation 115b marks the entity 509 as a Time entity 510. Otherwise, the entity 507 or 508 is marked as a dimension entity 512, and it's related entities 514 are processed recursively. After the transformation 115b completes the processing of the Inventory entity 502, the graph 500 is decorated as shown in FIG. 33.

Figure 34:
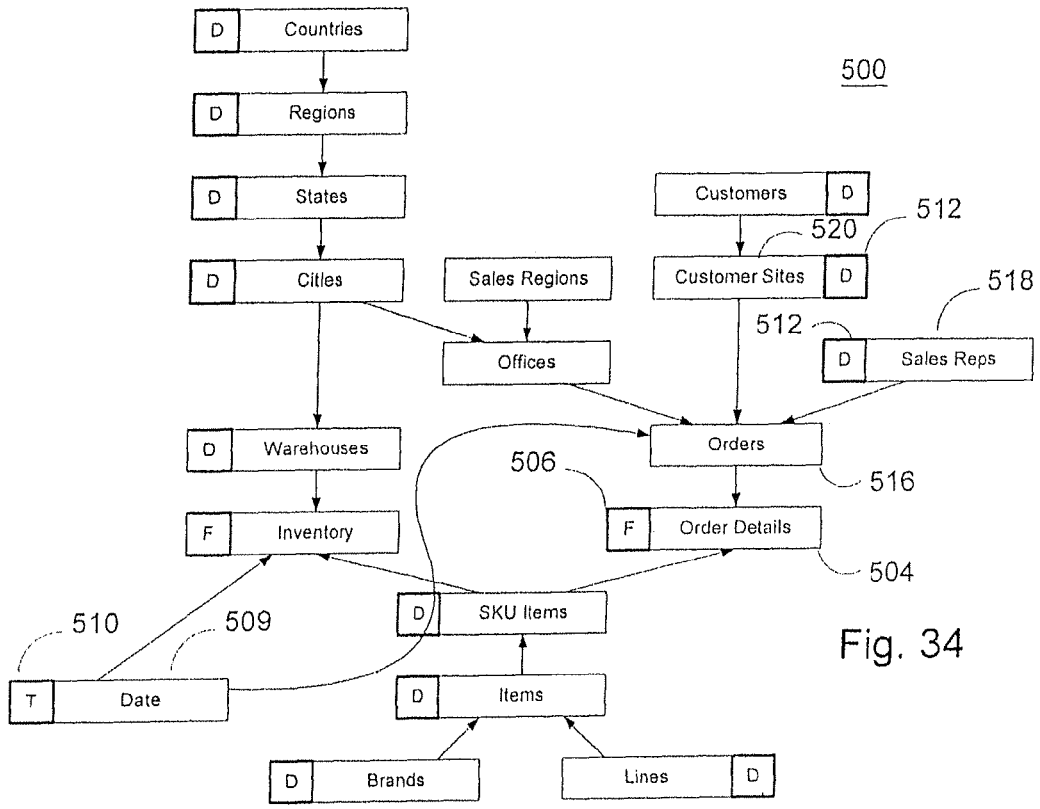
FIG. 34 is a diagram showing an example of a step of the transformation.

Referring to FIG. 34, the category dimension and level constructing transformation 115b now turns its attention to the Order Details entity 504, where some of the interesting things happen. Once again, the transformation 115b marks the Order Details entity 504 as a fact entity 506, and processes the associated entities recursively if they have not yet been processed. For the sake of explanation, say the transformation 115b is currently processing the Orders entity 516. It has processed the related entities Sales Reps 518 and Customer Sites 520, marking them as dimension entities 512. The transformation 115b is about to process the Date entity 509. FIG. 34 shows how the graph 500 has been decorated to this point.

Figure 35:
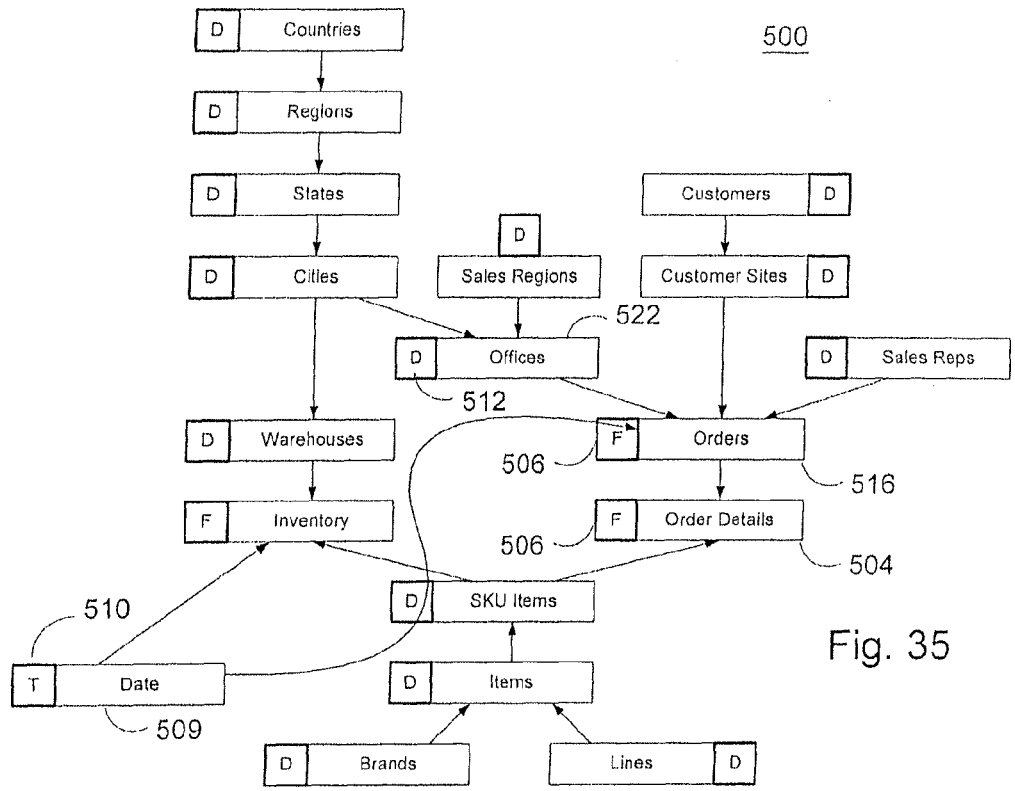
FIG. 35 is a diagram showing an example of a step of the transformation.

Referring now to FIG. 35, when attempting to process the Date entity 509, the transformation 115b notes that the Date entity 509 has already been processed, and it is a time entity 510. This forces the Orders entity 516 to be marked as a fact entity 506 instead of a dimension entity. Processing of the Offices entity 522 continues normally. The tail of the recursive process marks all intermediate entities between Orders 516 and Order Details 504 as fact entities 506. In this case, there are no such entities. FIG. 35 shows the graph 500 at the end of the first phase in processing of the transformation 115b.

Figure 36:
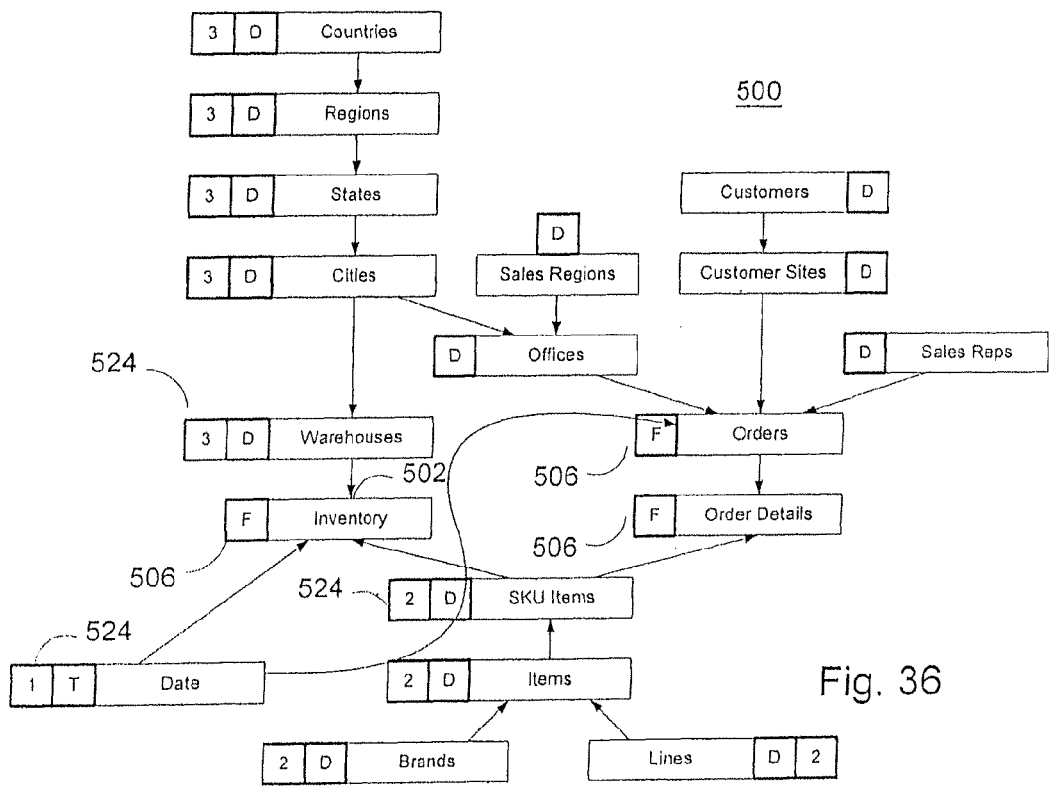
FIG. 36 is a diagram showing an example of a step of the transformation.
Figure 37:
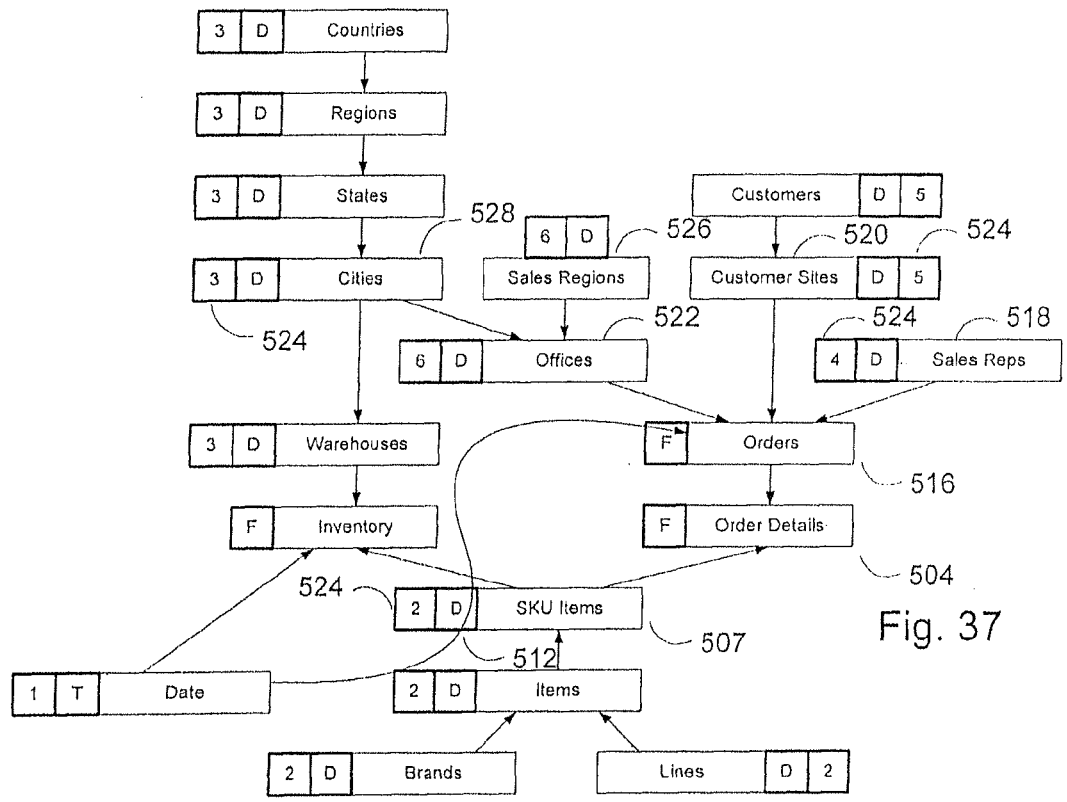
FIG. 37 is a diagram showing an example of a step of the transformation.

Referring now to FIG. 36, the second phase of the transformation 115b groups entities into groups that will eventually be dimensions. For this phase, the transformation 115b processes all of the entities tagged as fact entities 506. The transformation 115b recursively processes all associated entities of the fact entities 506, and assigns to them a dimension number 524. FIG. 37 shows the graph 500 after processing the Inventory fact entity 502.

Referring now to FIG. 37, the transformation 115b now considers the processing of the Order Details entity 504. All associated dimension entities 512, i.e., SKU Items entity 507, already has a dimension number 524 assigned to it. Accordingly, the processing of the Order Details entity 504 is complete.

When processing the Orders entity 516, the transformation 115b can process the associated entities Sales Reps 518 and Customer Sites 520. It assigns them dimension numbers 524.

During processing of the Offices entity 522, immediately after processing the Sales Regions entity 526, when the transformation 115b attempts to process the Cities entity 528, it notes that the Cities entity 528 has already been assigned a dimension number 524. In this situation, the transformation 115b merges the dimension group under construction with the existing group. This is accomplished by changing the dimension numbers 524 of those entities in the new group to the dimension number of the existing group. In this case, all entities tagged with the dimension number "6" would be re-tagged with the dimension number "3". This merge operation also completes the second phase in the transformation 115*b*.

Figure 38:
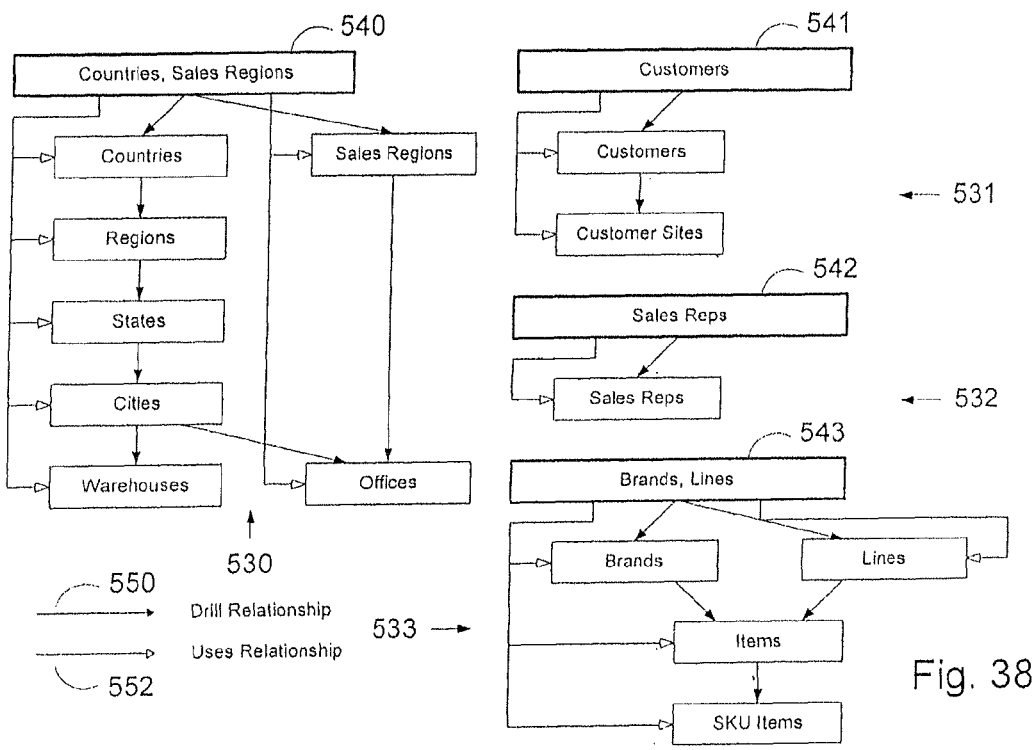
FIG. 38 is a diagram showing the dimensions constructed as the output of the transformation.

The third phase in the transformation 115*b* is the construction of dimensions and levels. Referring now to FIG. 38, each group 530-533 corresponds to a dimension 540-543. The transformation 115*b* processes each group 530-533 in turn. For each group 530-533, the transformation 115*b* finds all of the roots in the dimension. It then constructs a name for the dimension by concatenating these names together. When the dimension is constructed, the transformation 115*b* adds the dimension to the appropriate presentation folder.

For every dimension 540-543 other than the dimension based on a time entity, the fourth phase of the transformation 115*b* is the construction of the levels. Each entity in the dimension group 530-533 is used to construct the level. The entity key is used as the level source value expression. Each level is added to the dimension 540-543 as it is constructed. Then, based on the entity join relationships, drill relationships 550 are constructed between the levels. A drill relationship 550 defines navigation between levels in the metadata model 15. FIG. 38 is an illustration of each dimension, other than the time dimension, after it has been constructed.

Figure 39:
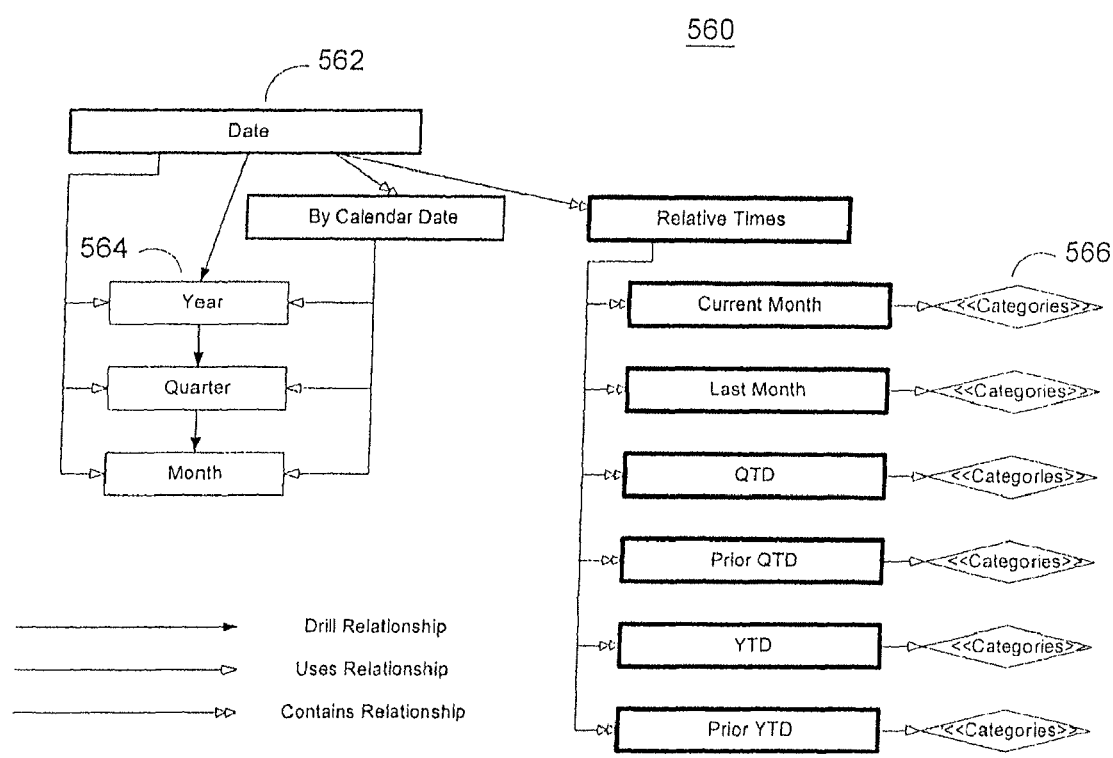
FIG. 39 is a diagram showing the dimensions constructed as the output of the transformation.

Referring to FIG. 39, when the transformation 115*b* constructs a time dimension 562, extra objects 564 are added to the model. The extra object 564 is a drill object, which coordinates settings across levels for time dimensions 562. Some examples of the type of information managed include the year start date, the beginning day of the week, and the rule for managing the construction of partial weeks. The construction of the time dimension 562 yields a structure 560 that is very similar to the dimension as produced by Transformer. FIG. 39 shows the structure 560 for the time dimension 562. The categories 566 are constructed within levels based on the data processed.

The fifth phase of the transformation 115*b* is the association of measures with levels. The association is required to determine the level of detail of data of the measure, as well as determine which dimensions are relevant to the measure. For example, a measure which tracks the number of days in a month only has the Month level. A measure such as Units from Orders is associated with all of the dimensions in the model.

This fifth phase of the transformation 115*b* is accomplished by examining each measure in the model to determine which entities are used to define the measure. All of these entities are fact entities. The measure is associated with the level of each dimension entity that this associated with the fact entity. For Units of Order Details, the associated level list is Sales Reps, Customer Sites, Offices, SKU Items, and Month. In the case of Month, the most detailed level as determined by drill relationships is associated with the measure.

Logical Cube Constructing Transformation 115*c*

The logic cube constructing transformation 115*c* constructs a set of logical cubes based on the dimensions in the business layer of the model. The transformation 115*c* is applicable when the model contains at least one measure dimension.

The logic cube constructing transformation 115*c* collects dimensions that are related to measures in a single measure dimension together to form a logical multidimensional space.

The following shows an example of the operation of the logic cube constructing transformation 115*c*:

1. For each measure dimension:
   a) Construct a logical cube that contains the measure dimension. Add the logical cube to the presentation layer.
   b) For each associated entity in the business layer:
      i) If the entity has a level:
      a) Add the dimension using the dimension to the cube (if the dimension is not already used by the cube).

Package (Presentation) Model Transformations 116

As shown in FIG. 4B, the presentation model transformations 116 include a basic package (presentation) model constructing transformation 116*a*, and package constructing transformation for Cognos Query 116*b*.

Basic Package (Presentation) Model Constructing Transformation 116*a*

The basic package (presentation) model constructing transformation 116*a* constructs a package layer 106. The package layer 106 may be similar to an existing E/R model.

Figure 40:
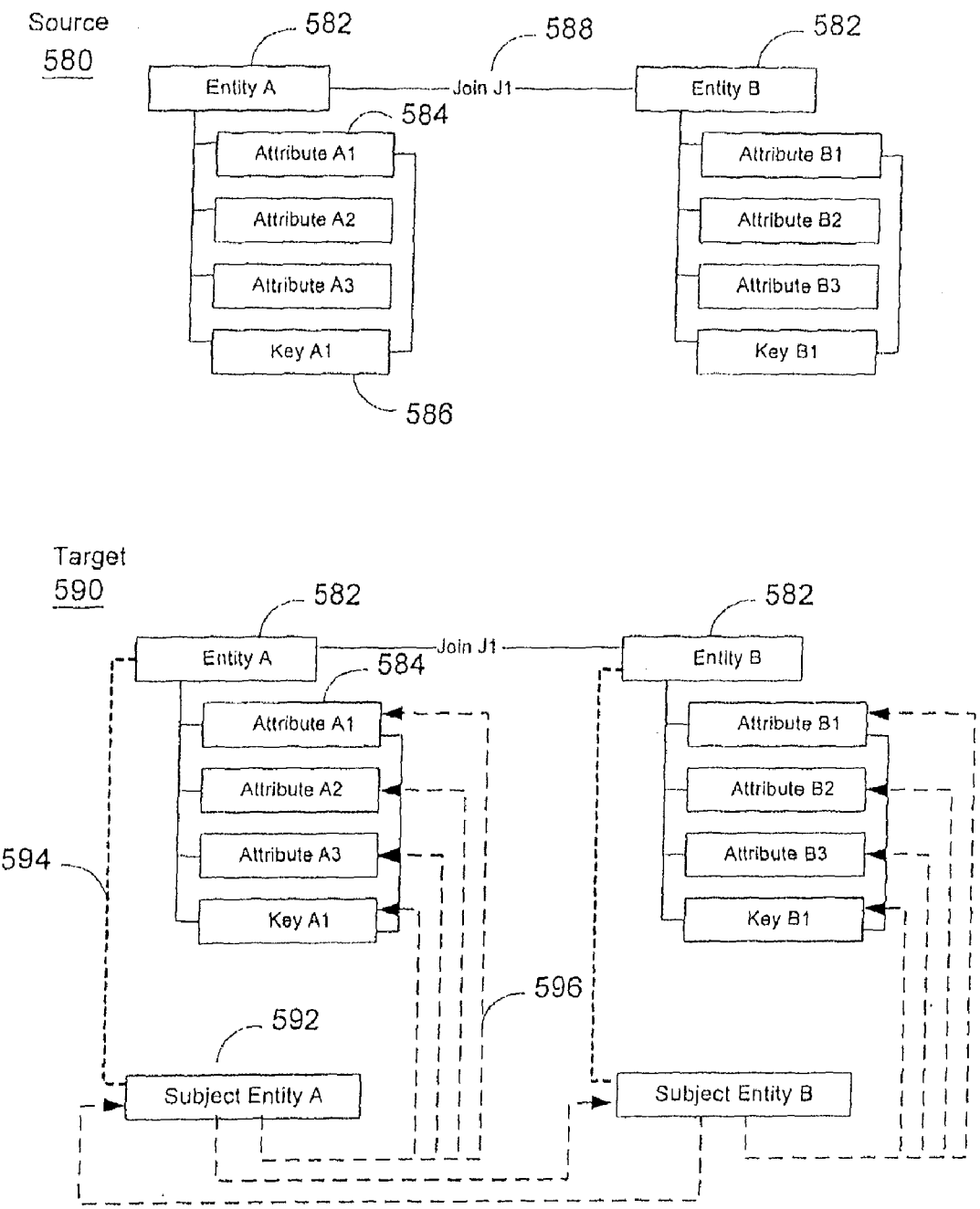
FIG. 40 is a diagram showing examples of source and target of a transformation.

The basic package model constructing transformation 116*a* may be used when the following conditions are met:
1. Business Model exists.
2. All entities except those prohibited or previously transformed are acceptable.
3. A join is acceptable if it has not been transformed yet, joins two entities that have been transformed, and the entities each have a single transformation target. FIG. 40 shows an example of a source 580 of the basic package model constructing transformation 116*a*. The source 580 has two entities 582, each having attributes 584 and a key 586. The two entities 582 are related with a join 588.

The basic package model constructing transformation 116*a* transforms the source 580 to a target 590. The transformation 116*a* builds a subject entity 592 for an entity 582, and adds a relationship 594 between the entity 582 and the subject entity 592. For each attribute 584 in the entity 582, the transformation 116*a* builds a subject item attribute 584 in the subject entity 592.

The basic package model constructing transformation 116*a* attempts, if a source object has been marked as transformed, to locate a target if the source object could contain other objects. If there are no target objects, then processing of the source object halts, but no error is written. In this case, the transformation 116*a* assumes that the lack of a target object indicates the administrator's desire to avoid transforming the object.

The following shows an example of the operation of the basic package model constructing transformation 116*a*:
1. For each non-prohibited entity:
   a) If entity has already been transformed:
      i) Attempt to locate target subject entity.
   b) Else
      i) Build subject entity.
      ii) Mark entity as transformed.
      iii) Add relationship between entity and subject entity.
   c) If subject entity built, or found:
      i) For each attribute in entity:
      a) If attribute has not been transformed yet:
         (1) Build subject item attribute in subject entity.
         (2) Add relationship between attribute and subject item attribute.
         (3) Mark attribute as transformed
2. For each non-prohibited join:
   a) Add a query path between each pair of subject entities relating to entities related to join.
   b) Build relationship between join and query path.
   c) Mark join as transformed.

Package Construction Transformation for Cognos Query (CQ) 116*b*

The package construction transformation 116*b* attempts to construct a package that conforms to the Cognos Query constraints from a generic package. Arbitrary packages are typically generated via Impromptu Catalogue Import, but they may be generated via other client applications.

The package that is created when an Impromptu catalogue is imported consists of a hierarchy of subject folders. A folder does not define any semantic information—it is simply a container for other objects. Users navigate these folders when building reports in Impromptu. A folder will not typically represent a report in the catalogue, but will contain a set of related objects from which a report could be constructed. The report semantics are determined by the order in which items are added to the report as well as the joins defined in the Impromptu catalogue.

When CQ uses the reporting system 4, it uses subject entities. A subject entity defines the additional semantics required by the CQ query engine. A subject entity is really a very simple form of query—it contains a projection list as well as the information required to construct a "where" clause. The CQ user navigates from subject entity to subject entity via paths, which consist of a chain of joins from the business model. Each path acts as a filter in the query to which the user has navigated.

Since an Impromptu catalogue import produces subject folders, and CQ uses subjects, the two applications do not share a common presentation model. The transformation 116*b* attempts to map one presentation model onto the other.

The transformation 115*b* builds and/or updates packages based on a source package. For each subject folder, it determines whether it is suitable for conversion to a subject. If it is suitable, the transformation 115*b* builds a subject, and populates the contents based on the contents of the source folder. Subject entities will be copied.

The transformation 116*b* collapses the folder hierarchy into a list.

The transformation 116*b* builds paths between the newly created subject entities based on the business model joins. Each constructed path references a single join.

Figure 41:
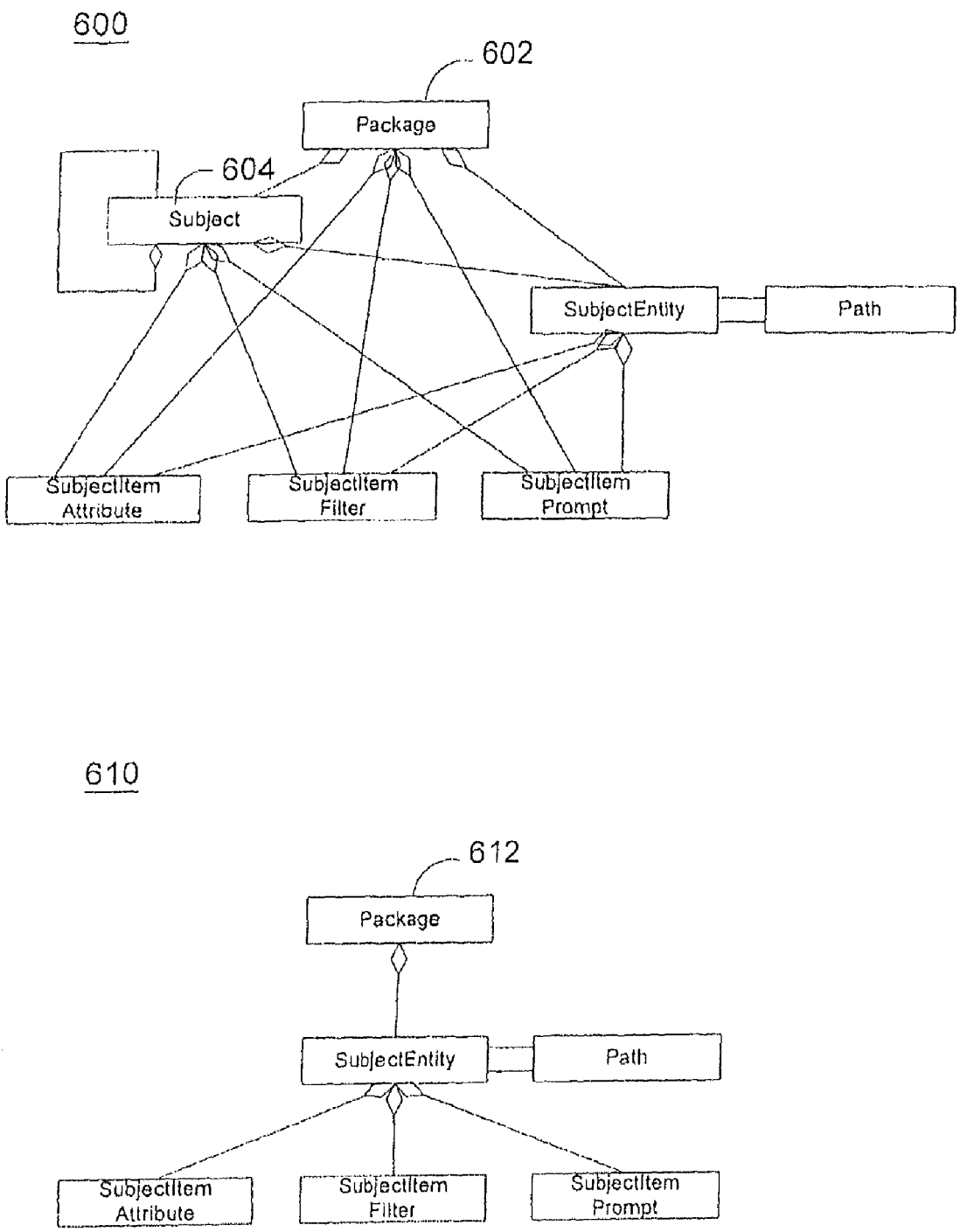
FIG. 41 is a diagram showing an example of a source model and a target model of a transformation.

FIG. 41 shows an example of a source 600. Packages 602 and subjects 604 contain a collection of subjects and subject entities, as well as a collection of subject items. A subject entity contains a collection of subject items. Subject entities are linked together with paths. There are three types of subject items: subject item attribute, subject item filter, and subject item prompt.

FIG. 41 also shows an example of a target 610. The target package 612 will be constructed for use by Cognos Query. The primary structural change will be the conversion of subjects to subject entities, and the elimination of the subject hierarchy.

The transformation 116*b* transforms each subject/subject entity in the source package 610, constructing a subject entity in the target package 612 and linking it to the other subject entities in that package 610.

Before a subject or subject entity can be transformed, it needs to satisfy the following conditions:

It contains at least one subject item attribute.

The subject item attributes reference at least one data source object, e.g., table or view.

The graph formed by all referenced entities is connected.

The graph is spanned with a minimal spanning tree which is unambiguous. A method in the query engine 25 is used to build the graph and determine the connectivity. The information that is passed to and received from the method is:

The input includes the set of entities referenced by the set of subject item attributes.

The input includes the set of business joins referenced by the set of subject item attributes.

The output includes the driver entity. This is the entity to which the target subject entity is associated.

The output includes the set of paths to the other referenced entities. These paths (actually a vector of joins) are used to construct the subject item attributes in the target subject entity.

An exception is thrown if the required output information cannot be generated. The remainder of the logic required in the transformation 116*b* is related to synchronization activities. If new objects are created in the source package 600, they are reflected in the target package 610. Transformations 20 typically do not delete objects. Also, if the user subsequently deletes objects created by this transformation 116*b*, these objects do not re-appear the next time the transformation 116*b* is executed.

An object is acceptable if:

It contains subject item attributes

The contained subject item attributes identify a set of entities that can be unambiguously connected.

The set of entities references at least one physical data source. For the purpose of the transformation 116*b*, a subject entity is always deemed acceptable The following is an example of the operation of the transformation 116*b*.

1. For each package specified in new target package list:
   a) Create a new package
   b) Create transformation relationship between two packages.
   c) Add source package and relationship ID to internal update list.
2. For each package specified in external update list:
   a) For each transformation relationship associated with the package:
      i) Add the source package and relationship ID to internal update list.
3. If internal update list is empty:
   a) Populate the internal update list by looking for packages and relevant transformation relationships in the model.
4. Sort the internal update list such that independent packages are processed before dependent packages.
5. For each package/relationship ID pair in internal update list:
   a) Process Container (for package)
   b) For each source subject in the package:
      i) Process Container.
   c) For each source subject entity in the package:
      i) Process Container.
   d) For each path in the package
      i) If not processed:
         a) Determine target subject entities in target package
         b) Create new path
         c) Mark source path as transformed
         d) Create transform relationship between source and target paths
         e) If path is related to any join relationships via transformation relationships:
            (1) Relate target path to the same join, preserving status flags.

e) Update Path Information in Target Package
   i) This logic is similar to the basic entity model construction with regards to how joins are propagated to the business model.
      a) Determine the joins that may need transformation by examining the entities related to the transformed subject entities.
      b) For each join that hasn't been processed in the context of the package:
         (1) Determine the pairs of subject entities that should have a path between them based on the join.
         (2) For each pair:
            (a) Build a path
            (b) Build a transformation relationship between the join and the path.
         (3) Mark the join as transformed.
f) Mark source package as transformed.

Process Container
1. Determine acceptability of source object.
2. If source object acceptable:
   a) If source object has already been transformed:
      i) For each target subject entity:
         a) Determine match on entity for subject entity.
         b) If match:
            (1) Process Contained Items
         c) Else
            (1) Log status. Significant change to source object has occurred that prevents automatic update. Other choice is to create a new subject entity and destroy the existing target, but this causes some issues in terms of preserving the semantics. Maybe this isn't what the user wants.
   b) Else
      i) Build target subject entity
      ii) Mark source object as transformed.
      iii) Process Contained Items.

Process Contained Items
1. For each subject item attribute in source subject:
   a) If source item not transformed:
      i) Build a new subject item attribute containing all required join path information.
      i) Mark source object as transformed.
   b) Else
      i) Update properties, if target exists.
2. For each subject item filter in source subject:
   a) If source item is not transformed:
      i) Build a new subject item filter.
      i) Mark source object as transformed.
   b) Else
      i) Update properties, if target exists.
3. For each subject item prompt in source subject:
   a) If source item is not transformed:
      i) Build a new subject item prompt.
      ii) Mark source object as transformed.
   b) Else
      i) Update properties, if target exists.

The following table shows the status flag usage.

| Object Class | Prohibit | Processed |
| --- | --- | --- |
| Package | Do not process the instance. | Assists in determining whether a subject entity should be created for a subject or subject entity in the source package. |
| Subject, SubjectEntity | Do not process the instance. | Assists in determining whether a subject entity should be created for the object in the package. Note that the processed flag is never set on a relationship for an object of this type to allow new items to be processed. |
| SubjectItemAttribute, SubjectItemFilter, SubjectItemPrompt | Do not process the instance. | Assists in determining whether a corresponding subject item should be created for the object in the subject entity. |
| RelationshipPath | Do not process the instance. | Assists in determining whether a corresponding path should be created for the path in the target package. |
| RelationshipJoin-Business | Do not process the instance. | Assists in determining whether a path should be created for the join in the target package. |

General Transformations 117

The general transformations 117 include a name mutation transformation 117a.

Name Mutation Transformation 117a

The name mutation transformation 117a acts on the business and package layers. It constructs user friendly names for objects. Subject objects include cubes, measure dimensions, category dimensions, entities, keys attributes, levels, measures and business joins.

The transformation 117a uses a dictionary for text substitution provided by the user. The transformation 117a is applicable when a name has a fragment that matches an entry in the dictionary. The match criteria can include the location of the fragment within the name. Also, the object has not been transformed.

The name mutation transformation 117a replaces the fragment of the name with associated entry from dictionary.

The name mutation transformation 117a is very open ended in nature and can be improved over time by adding additional entries to the dictionary. The effectiveness of the name mutation transformation 117a is only as good as the supplied dictionary. Users may also benefit if they could provide their own dictionaries. It is possible to construct a dictionary rich enough to translate over 75% of the names found in a physical database. With a custom dictionary, the success rate is much higher.

For example, an object has a name "CUSTNO", and a dictionary entry specifies that "NO" at the end of a name could be replaced with "Number", and "CUST" at the beginning of a name could be replaced with "Customer". In this case, the name mutation transformation 117a first transforms the fragment "NO" of the name "CUSTNO" into "Number", and the resulting text becomes "CUST Number". The name mutation transformation 117a further performs a second transformation to replace the fragment "CUST" with "Customer". Thus, the result of these transformations becomes "Customer Number". An additional operation could change the case of letters in the name. For example, "Customer Number" "Customer number" could be the result of this transformation.

The status flag usage is as follows:

| Object Class | Prohibit | Processed |
|---|---|---|
| Cubes | Do not process the instance. | Do not process the instance. |
| Measure Dimensions | | |
| Category Dimensions | | |
| Entities | | |
| Keys | | |
| Attributes | | |
| Levels | | |
| Measures | | |
| Business Joins | | |

Transformation Execution Order

The above described transformations 112-117 may be executed in many different orders. The following shows preferred orders for the execution of the transformations 112-117. While strict ordering is not necessary, better results may be possible if, for example, the data access layer 102 is complete before starting the business model transformations 114.

Operation I of the table extract constructing transformation 112c requires keys. Accordingly, depending on the data access layer contents, it may be preferable to run the data access key constructing transformation 112b before executing operation I of the table extract constructing transformation 112c. Also, operation II of the table extract constructing transformation 112c preferably runs with a completed business layer 104.

The data access cube constructing transformation 112d preferably runs after the logical cube constructing transformation 115c.

The basic business model constructing transformation 114a is preferably executed after operation I of the table extract constructing transformation 112c to avoid generation of entities which represent aggregate tables. Since these tables store aggregated data, they do not deserve representation in the business layer 104 of the metadata model 15.

The many to many join relationship fixing transformation 114b preferably runs after the basic business model constructing transformation 114a. The redundant join relationship eliminating transformation 114d preferably runs after the many to many join relationship fixing transformation 114b.

The entity coalescing transformation 114c and the subclass relationship introducing transformation 114e preferably run after the redundant join relationship eliminating transformation 114d because there will be less business joins to examine and manipulate.

The date usage identifying transformation 114h preferably runs before the subclass relationship introducing transformation 114e because the date usage identifying transformation 114h may generate multiple joins between entities as a result of multiple date attributes in an entity.

The measure identifying and measure dimensions constructing transformation 115a and the category dimension and level constructing transformation 115b are preferably executed after completion of all business layer manipulations.

The logical cube constructing transformation 115c is preferably executed after the measure identifying and measure dimensions constructing transformation 115a since the measure identifying and measure dimensions constructing transformation 115a will construct logical cubes based on measure dimensions constructed by that transformation. The logical cube constructing transformation 115c is also preferably executed after the category dimension and level constructing transformation 115b since the logical cube constructing transformation 115c will require the dimensions constructed by the category dimension and level constructing transformation 115b to construct meaningful logical cubes.

The basic package model constructing transformation 116a preferably runs after completion of the business layer 104 and the multidimensional Layers.

The data access join constructing transformation 112a, data access key constructing transformation 112b and the name mutation transformation 117a may be executed any time.

The following shows an example of preferred order of transformations:
data access join constructing transformation 112a;
data access key constructing transformation 112b;
the first part of the table extract constructing transformation 112c;
basic business model constructing transformation 114a;
many to many join relationship fixing transformation 114b
redundant join relationship eliminating transformation 114d
entity coalescing transformation 114c
entity referencing transformation 114f
attribute usage determining transformation 114g
the second part of the table extract constructing transformation 112c
measure identifying and measure dimension constructing transformation 115a
date usage identifying transformation 114h
category dimension and level constructing transformation 115b
logic cube constructing transformation 115c
basic package model constructing transformation 116a
package constructing transformation for CQ 116b
name mutation transformation 117a When one object leads to the creation of another, a new relationship is created between the two objects. These objects are provides with source and target object identifiers. These identifiers and the status flags are used to control the execution of a transformation 20 over the relationship. FIG. 7 shows a chart describes, in general terms, the execution flow over a relationship. Each specific transformation is described above.

In FIG. 7, the first column indicates if a prohibit flag is set or not; and the second column indicates if an object is processed or not. An object may be a parent or child. When the current object is a parent, the third and fourth columns are used. The third column indicates if the relationship is processed or not for the parent, and the fourth column indicates the action to be taken for the parent. When the current object is a child, the fifth and sixth columns are used. The fifth column indicates if the relationship is processed or not for the child, and the sixth column indicates the action to be taken for the child.

Some examples of the use of FIG. 7 are described below using a case where an entity is built based on a table. The table is a parent and has a column and a key as children Currently, nothing has been processed or prohibited, and no relationship has been created. In this case, the execution flow follows the second row where the "parent action" column indicates to create new target object and relationship, and to mark object and relationship as processed after processing children. Accordingly, an entity and relationship between the table and the entity are created.

Next, the execution flow follows the fourth row for the column where the "child action" column indicates to create new target object and relationship, and to mark object and relationship as processed. Accordingly, an attribute and relationship between the column and the attribute are created, and marked as processed. Similarly, a key in the entity and relationship between the key in the table and key in the entity are created and marked as processed.

As all children has been processed, the table and the relationship between the table and the entity are marked as processed according to the second row of FIG. 7. Thus, the transformation from the table to the entity is completed.

If a second column is added to the table, the object has not been processed, and the table has been processed. No relationship exists for the second column. Accordingly, the execution flow follows the eight row where the "child action" indicates to create new target object and relationship, and to mark object and relationship as processed. Thus, a second attribute and relationship between the second column and the second attribute are created and marked as processed.

If the second attribute is now deleted from the entity, the second column has been processed and the table has been processed. The relationship will be deleted when either partner is deleted. In this case, the column is marked as processed. Accordingly, the execution flow follows the last row where the "child action" indicates to do nothing. Thus, recreation of the deleted second attribute is avoided.

A prohibit flag may be set by a user. For example, when a data access object is important in the data access layer 102, but the user does not want it represented in the business layer 104. In this case, the prohibit flag is used to prevent a partner business model object from being built for the data access object in the model.

The transformations of the present invention may be implemented by any hardware, software or a combination of hardware and software having the above described functions. The entire or a part of software code may be stored in a computer readable memory. Also, a computer data signal representing the software code may be transmitted via a communication network. The computer data signal may be embedded in a carrier wave. Such a computer readable memory and a computer data signal are also within the scope of the present invention, as well as the hardware, software and the combination thereof.

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A computer system comprising:
a storage device that stores a metadata model, wherein the metadata model includes a lower layer and a higher layer, wherein the higher layer and the lower layer each includes one or more model objects, wherein the model objects of the lower layer have a lower degree of abstraction than the model objects of the higher layer, wherein the lower layer provides access to a plurality of different data sources, and wherein the higher layer provides each of a plurality of different business intelligence tools with an interface by which to access each of the plurality of different data sources, and wherein each of the plurality of different business intelligence tools is designed to interface only with a corresponding subset of the plurality of different data sources; and
a metadata model transformer configured within a computer to transform the metadata model using a lower-to-higher transformation that obtains information from one of the model objects in the lower layer of the metadata model, abstracts the information by adding business rules for representing a business concept and creates a new model object in the higher layer corresponding to the one of the model objects in the lower layer based on the information abstracted by the abstraction, wherein the new model object in the higher layer provides a representation of the business concept.

2. The computer system as claimed in claim 1, wherein the metadata model transformer further performs a lower layer transformation to obtain additional information from another one of the model objects in the lower layer, modify the obtained additional information and transform the other one of the model objects in the lower layer based on the modified information.

3. The computer system as claimed in claim 1, wherein the metadata model transformer further performs a lower layer transformation to obtain additional information from another one of the model objects in the lower layer, determine a specific feature included in the obtained additional information and create a new model object in the lower layer based on the specific feature.

4. The computer system as claimed in claim 1, wherein the metadata model transformer performs a lower layer transformation to obtain relationship information between multiple ones of the model objects in the lower layer and create a new model object in the lower layer based on the relationship information.

5. The computer system as claimed in claim 1, wherein the metadata model transformer uses a higher layer transformation to obtain additional information from one of the model objects in the higher layer, modify the obtained additional information and transform the model object in the higher layer based on the modified information.

6. The computer system as claimed in claim 1, wherein the metadata model transformer further performs a higher layer transformation to obtain additional information of one of the model objects in the higher layer, determine a specific feature included in the obtained additional information and create another new model object in the higher layer based on the specific feature.

7. The computer system as claimed in claim 1, wherein the metadata model transformer further performs a higher layer transformation to obtain relationship information between multiple ones of the model objects in the higher layer and create another new model object in the higher layer based on the relationship information.

8. The computer system as claimed in claim 1, wherein the metadata model transformer further performs a higher layer transformation to select a subset of the model objects in the higher layer and create another new model object in the higher layer based on the selected subset of the model objects in the higher layer.

9. A method for transforming in a computer system a metadata model for containing model objects, the method comprising:
obtaining information from a model object in a lower layer of a metadata model stored in a storage device, wherein the metadata model includes the lower layer and a higher layer, wherein each of the lower layer and the higher layer includes one or more model objects, wherein the lower layer includes one or more model objects having a lower degree of abstraction than the model objects of the higher layer, wherein the lower layer provides access to a plurality of different data sources, and wherein the higher layer provides each of a plurality of different business intelligence tools with an interface by which to access each of the plurality of different data sources, and wherein each of the plurality of different business intelligence tools is designed to interface only with a corresponding subset of the plurality of different data sources;
abstracting, with one or more computers of the computer system, the information by adding business rules for representing a business concept;
creating, with the one or more computers, a new model object in the higher layer corresponding to the model object in the lower layer based on the information abstracted, wherein the new model object in the higher layer provides a representation of the business concept; and
storing the metadata model having the lower layer and the higher layer in a storage device.

10. The method as claimed in claim 9 further comprising:
obtaining additional information from another one of the model objects in the lower layer;
modifying the obtained additional information; and
transforming the other one of the model objects in the lower layer based on the modified information.

11. The method as claimed in claim 9 further comprising:
obtaining additional information from another one of the model objects in the lower layer;
determining a specific feature included in the obtained additional information; and
creating a new model object in the lower layer based on the specific feature.

12. The method as claimed in claim 9 further comprising:
obtaining relationship information between multiple one of the model objects in the lower layer; and
creating a new model object in the lower layer based on the relationship information.

13. The method as claimed in claim 9 further comprising:
obtaining additional information from one of the model objects in the higher layer;
modifying the obtained additional information; and
transforming the other one of the model objects in the higher layer based on the modified information.

14. The method as claimed in claim 9 further comprising:
obtaining additional information of one of the model objects in the higher layer;
determining a specific feature included in the obtained additional information; and
creating another new model object in the higher layer based on the specific feature.

15. The method as claimed in claim 9 further comprising:
obtaining relationship information between multiple ones of the model objects in the higher layer; and
creating another new model object in the higher layer based on the relationship information.

16. The method as claimed in claim 9 further comprising:
selecting a subset of the model objects in the higher layer; and
creating another new model object in the higher layer based on the selected subset of the model objects in the higher layer.

17. A computer readable memory for storing code which identifies instructions for transforming, in a computer system, a metadata model for containing model objects, the instructions comprising:
instructions to obtain information from a model object in a lower layer of a metadata model, wherein the metadata model includes the lower layer and a higher layer, wherein each of the lower layer and the higher layer includes one or more model objects, wherein the lower layer includes one or more model objects having a lower degree of abstraction than the model objects of the higher layer, wherein the lower layer provides access to a plurality of different data sources, and wherein the higher layer provides each of a plurality of different business intelligence tools with an interface by which to access each of the plurality of different data sources, and wherein each of the plurality of different business intelligence tools is designed to interface only with a corresponding subset of the plurality of different data sources;
instructions to abstract the information by adding business rules for representing a business concept;
instructions to create a new model object in the higher layer corresponding to the model object in the lower layer based on the information abstracted, wherein the new model object in the higher layer provides a representation of the business concept; and
instructions to store the metadata model having the lower layer and the higher layer in a storage device.

18. The computer readable memory of claim 17, wherein the code identifies additional instructions, these additional instructions comprising:
instructions to obtain additional information from another one of the model objects in the lower layer;
instructions to modify the obtained additional information; and
instructions to transform the other one of the model objects in the lower layer based on the modified information.

19. The computer readable memory of claim 17, wherein the code identifies additional instructions, these additional instructions comprising:
- instructions to obtain additional information from another one of the model objects in the lower layer;
- instructions to determine a specific feature included in the obtained additional information; and
- instructions to create a new model object in the lower layer based on the specific feature.

20. The computer readable memory of claim 17, wherein the code identifies additional instructions, these additional instructions comprising:
- instructions to obtain relationship information between multiple one of the model objects in the lower layer; and
- instructions to create a new model object in the lower layer based on the relationship information.

* * * * *